(12) United States Patent
Ishida et al.

(10) Patent No.: US 8,771,046 B2
(45) Date of Patent: Jul. 8, 2014

(54) ELECTRIC CHARGING APPARATUS AND GAME APPARATUS

(75) Inventors: Tetsuo Ishida, Minato-ku (JP); Shoki Kogure, Minato-ku (JP); Takashi Sakuma, Minato-ku (JP); Satoru Atsuchi, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 13/634,052

(22) PCT Filed: Mar. 11, 2011

(86) PCT No.: PCT/JP2011/055739
§ 371 (c)(1),
(2), (4) Date: Sep. 11, 2012

(87) PCT Pub. No.: WO2011/111812
PCT Pub. Date: Sep. 15, 2011

(65) Prior Publication Data
US 2013/0005418 A1    Jan. 3, 2013

(30) Foreign Application Priority Data

Mar. 12, 2010 (JP) .................................. 2010-055597
Mar. 12, 2010 (JP) .................................. 2010-055599

(51) Int. Cl.
*G06F 17/00* (2006.01)
(52) U.S. Cl.
USPC ............................................................ 463/6
(58) Field of Classification Search
USPC ..................... 463/6–10, 16, 20, 25
See application file for complete search history.

(56) References Cited

U.S. PATENT DOCUMENTS

| | | | |
|---|---|---|---|
| 5,469,036 A | 11/1995 | Eto | |
| 5,525,888 A * | 6/1996 | Toya | 320/111 |
| 7,659,696 B2 * | 2/2010 | Zeiler et al. | 320/115 |
| 7,888,909 B2 * | 2/2011 | Larsen et al. | 320/115 |

(Continued)

FOREIGN PATENT DOCUMENTS

| JP | 59-108282 A | 6/1984 |
|---|---|---|
| JP | 6-277358 A | 10/1994 |

(Continued)

OTHER PUBLICATIONS

International Search Report for PCT/JP2011/055739 dated Jun. 14, 2011.

(Continued)

*Primary Examiner* — Ronald Laneau
(74) *Attorney, Agent, or Firm* — Sughrue Mion, PLLC

(57) ABSTRACT

An electric charging apparatus (5) has a charge mechanism for charging a power supply device inside plural power supply assemblies (30) respectively attached to plural pieces of traveling equipment (10). Furthermore, the electric charging apparatus (5) has an electric power source assembly swapping mechanism (200). The electric power source assembly swapping mechanism (200) dismounts the first electric power source assembly (30) from the traveling equipment (10) and moves it to the charge mechanism, and moves it to mount the second electric power source assembly (30) on traveling equipment from charge mechanism. In addition, the electric power source assembly swapping mechanism (200) dismounts the second electric power source assembly (30) from traveling equipment (10) and moves it to the charge mechanism, and moves it to mount the first electric power source assembly (30) on traveling equipment (10) from charge mechanism.

17 Claims, 46 Drawing Sheets

(56) References Cited

U.S. PATENT DOCUMENTS

| | | | |
|---|---|---|---|
| 7,956,576 B2 * | 6/2011 | Neu et al. | 320/114 |
| 8,013,572 B2 * | 9/2011 | Rodgers | 320/114 |
| 2007/0214897 A1 | 9/2007 | Ogawa | |
| 2009/0078059 A1 | 3/2009 | Ogawa | |
| 2010/0231207 A1 | 9/2010 | Ogawa | |

FOREIGN PATENT DOCUMENTS

| | | |
|---|---|---|
| JP | 10-033827 B2 | 2/1998 |
| JP | 11-244520 A | 9/1999 |
| JP | 2000-333308 A | 11/2000 |
| JP | 2002-85817 A | 3/2002 |
| JP | 2002-172275 A | 6/2002 |
| JP | 2003-170747 A | 6/2003 |
| JP | 3448273 B2 | 9/2003 |
| JP | 2005-156474 A | 6/2005 |
| JP | 2005-164448 A | 6/2005 |
| JP | 3765624 B2 | 4/2006 |
| JP | 2007-218892 A | 8/2007 |
| JP | 3993607 B2 | 10/2007 |
| JP | 2009-243140 A | 10/2009 |
| WO | 2006/106714 A1 | 10/2006 |

OTHER PUBLICATIONS

Japanese Office Action dated Aug. 21, 2012, issued in JP Application No. 2010-055599.

* cited by examiner

ELECTRIC CHARGING APPARATUS AND GAME APPARATUS

CROSS REFERENCE TO RELATED APPLICATIONS

This application is a National Stage of International Application No. PCT/JP2011/055739 filed Mar. 11, 2011, claiming priority based on Japanese Patent Application Nos. 2010-055597 filed Mar. 12, 2010 and 2010-055599 filed Mar. 12, 2010, the contents of all of which are incorporated herein by reference in their entirety.

TECHNICAL FIELD

The present invention relates to an electric charging apparatus and relates to a game apparatus.

BACKGROUND ART

There is disclosed in Patent Document 1 an automatic traveling car that is used in a horse racing game. This automatic traveling car travels underneath a floor panel of a non-magnetic material and pulls a carriage placed on the floor panel by magnetic force. A model horse and a model jockey are attached on the carriage.

CITATION

Patent Document

Patent Document 1 Japanese Patent Publication No. 3993607

SUMMARY OF INVENTION

Technical Problem

In Patent Document 1, a wiring pattern for electricity supply is formed on the bottom side of the floor panel of the non-magnetic material. Plural pins that are in contact with the wiring pattern for electricity supply are arranged on an automatic traveling car, and the automatic traveling car obtains electricity for rotating a motor for driving a wheel through these pins from the wiring pattern for electricity supply.

However, with such a conventional electricity supply method, abrasion might occur due to the mutual frictional contact between the wiring pattern for electricity supply and the pins while an automatic traveling car is traveling, and a malfunction might occur in the electricity supply to the automatic traveling car due to the abrasion. In addition, with the traveling of the automatic traveling car, debris material accumulates between the wiring pattern for electricity supply and the pins, and the resulting contact defectiveness might obstruct electricity supply.

Accordingly, the present invention provides a game apparatus that is capable of reducing potential malfunction in the electricity supply to traveling equipment.

Solution to Problem

An electric charging apparatus according to the present invention has: a charge mechanism for charging a first power supply device inside a first electric power source assembly mounted on traveling equipment and for charging a second power supply device inside a second electric power source assembly mounted on the traveling equipment; and an electric power source assembly swapping mechanism that dismounts and moves the first electric power source assembly from the traveling equipment to the charge mechanism, that moves the second electric power source assembly from the charge mechanism, to be mounted on the traveling equipment, and that dismounts and moves the second electric power source assembly from the traveling equipment to the charge mechanism, and that moves the first electric power source assembly from the charge mechanism, to be mounted on the traveling equipment.

According to this configuration, because electricity is not supplied to traveling equipment by the frictional contact with the floor panel, the potential malfunctioning in electricity supply is reduced. With this configuration, it is possible to make the traveling equipment run with the second power supply device while charging the first power supply device by the first charge mechanism. It is possible to make the traveling equipment run with the first power supply device while charging the second power supply device by the second charge mechanism. Therefore, a time period for which traveling equipment cannot run due to the charging of the power supply device can be minimized.

Preferably, the charge mechanism has: a first port for accommodating the first electric power source assembly; a second port for accommodating the second electric power source assembly; charge means for charging a first power supply device inside the first electric power source assembly accommodated in the first port and a second power supply device inside the second electric power source assembly accommodated in the second port, the electric power source assembly swapping mechanism dismounts the first electric power source assembly from traveling equipment and moves the first electric power source assembly to the first port, so that the first power supply device is chargeable by the charge means, moves, from the second port, the second electric power source assembly for which the second power supply device has been charged by the charge means, to be mounted on the traveling equipment, dismounts the second electric power source assembly from the traveling equipment and moves the second electric power source assembly to the second port, so that the second power supply device is chargeable by the charge means, and moves, from the first port, the first electric power source assembly for which the first power supply device has been charged by the charge means, to be mounted on the traveling equipment.

According to this configuration, while the first electric power source assembly is placed in the first port, it is possible to run the traveling equipment with the second power supply device while charging the first power supply device with the first electric charger. While the second electric power source assembly is placed in the second port, it is possible to run the traveling equipment with the first power supply device while charging the second power supply device with the second electric charger.

The above charge means may have a first electric charger for charging the first power supply device inside the first electric power source assembly placed in the first port and a second electric charger for charging a second power supply device inside the second electric power source assembly placed in the second port. Alternatively, the charge means may have an electric charger which is movable in a transverse direction between the first port and the second port and which can charge the first and the second power supply devices.

Preferably, the charge mechanism has: plural first ports for accommodating plural first power supply assemblies respectively; plural first electric chargers for charging first power supply devices inside plural first power supply assemblies accommodated in the plural first ports; plural second ports for accommodating plural second power supply assemblies respectively; and plural second electric chargers for charging second power supply devices inside plural first power supply assemblies accommodated in the plural second ports, and the electric power source assembly swapping mechanism has plural bars movable back-and-forth in back-and-forth directions parallel to one another and plural electric power source assembly adherence units respectively mounted on each of the plural bars, each of the plural bars carries a corresponding one of the electric power source assembly adherence units forward so as to pass one of the first ports, and each of the electric power source assembly adherence units adheres to the first electric power source assembly mounted on one of plural pieces of traveling equipment, to dismount the first electric power source assembly from the traveling equipment, and each of the bars carries the first electric power source assembly adhered to by the electric power source assembly adherence unit backward to the first port so that the first power supply device is chargeable by the first electric charger; each of the plural bars carries a corresponding one of the electric power source assembly adherence units forward so as to pass one of the second ports, and each of the electric power source assembly adherence units adheres to the second electric power source assembly for which the second power supply device has been charged by the second electric charger, and each of the bars carries the second electric power source assembly adhered to by the electric power source assembly adherence unit forward so that the second first electric power source assembly is mounted on the plural pieces of traveling equipment from the second port; each of the plural bars carries a corresponding one of the electric power source assembly adherence units forward so as to pass one of the second ports, and each of the electric power source assembly adherence units adheres to the second electric power source assembly mounted on one of the plural pieces of traveling equipment, to dismount the second electric power source assembly from the traveling equipment, and each of the bars carries the second electric power source assembly adhered to by the electric power source assembly adherence unit backward to the second port so that the second power supply device is chargeable by the second electric charger; and each of the plural bars carries a corresponding one of the electric power source assembly adherence units forward so as to pass one of the first ports, and each of the electric power source assembly adherence units adheres to the first electric power source assembly for which the first power supply device has been charged by the first electric charger, and each of the bars carries the first electric power source assembly adhered to by the electric power source assembly adherence unit forward so that the first electric power source assembly is mounted on the plural pieces of traveling equipment from the first port.

According to this configuration, each bar and each electric power source assembly adherence unit are used for mounting and dismounting of both of the first electric power source assembly and the second electric power source assembly. Therefore, the number of parts can be reduced.

Preferably, the plural first ports and the plural second ports are arranged in a transverse direction perpendicular to the back-and-forth direction of the plural bars, the electric charging apparatus additionally has: a transverse direction carrying mechanism for carrying, in the transverse direction, a first set having the plural first ports and the plural second ports and a second set having the plural bars so that the first set and the second set move relatively in the transverse direction, so that each of the plural bars can carry a corresponding one of the electric power source assembly adherence units into one of the first ports and one of the second ports.

With this configuration, by moving the first set or the second set transversely, in a state in which traveling equipment stops in the fixed position, an electric power source assembly adherence unit attached to a bar passes the first port and can attach or detach the first electric power source assembly to or from the traveling equipment, and the same electric power source assembly adherence unit can pass the second port and can attach or detach the second electric power source assembly to or from traveling equipment. Thus, each bar and each electric power source assembly adherence unit are used for mounting and dismounting of both of the first electric power source assembly and the second electric power source assembly. Therefore, the number of parts can be reduced in comparison with a case in which a bar and an electric power source assembly adherence unit for the first power supply assemblies and a bar and an electric power source assembly adherence unit for the second power supply assemblies are provided.

Preferably, each of the electric power source assembly adherence units is an adherence unit that can adhere to, by magnetic force, a ferromagnet or a magnet provided in the first electric power source assembly and a ferromagnet or a magnet provided in the second electric power source assembly.

According to this configuration, the electric power source assembly adherence unit can easily adhere to an electric power source assembly by magnetic force.

Preferably, each of the electric power source assembly adherence units is a magnet chuck having a magnet and a yoke containing the magnet in a turnable manner, the electric power source assembly swapping mechanism has plural cranks respectively rotating the magnet of the magnetic chuck, and the crank has a first link extending parallel to the bar and moving relatively to the bar and a second link connected to the magnet and rotating the magnet with the movement of the first link.

According to this configuration, it is possible to control magnetic force acting the outside from a magnet chuck by rotating a magnet by a crank. Therefore, it is possible to mechanically enable or release the adherence to the electric power source assembly by the magnet chuck.

Preferably, the electric charging apparatus has a traveling equipment locking mechanism that locks each of the plural pieces of traveling equipment when the electric charging apparatus mounts and dismounts the plural first electric power source assemblies to and from the plural pieces of traveling equipment and when the electric charging apparatus mounts and dismounts the plural second electric power source assemblies to and from the plural pieces of traveling equipment.

According to this configuration, because the traveling equipment locking mechanism locks traveling equipment, the traveling equipment is stable when the electric power source assembly is attached to and detached from the traveling equipment.

Preferably, the electric charging apparatus has a traveling equipment locking mechanism which locks each of the plural pieces of traveling equipment when the electric charging apparatus mounts and dismounts the plural first electric power source assemblies to and from the plural pieces of traveling equipment and when the electric charging apparatus mounts and dismounts the plural second electric power source assemblies to and from the plural pieces of traveling equipment, and the traveling equipment locking mechanism locks and releases the plural pieces of traveling equipment, when the transverse direction carrying mechanism moves the plural first ports and the plural second ports in the transverse direction, in conjunction with the transverse movement of the first port and the second port.

According to this configuration, because the traveling equipment locking mechanism operates in conjunction with the transverse movement of the first port and the second port, the traveling equipment locking mechanism requires no exclusive drive source.

Preferably, the traveling equipment locking mechanism has plural pairs of a first roller and a second roller, and each pair of the first roller and the second roller sandwiches one of the plural pieces of the traveling equipment, and the first and the second roller rotate when the traveling equipment moves in a direction in which the bar moves backward and do not rotate when the traveling equipment moves in a direction in which the bar moves forward.

According to this configuration, because the first roller and the second roller are allowed to rotate in only a single direction, traveling equipment does not advance accidentally even if the electric power source assembly adherence unit advances to dismount the electric power source assembly from the traveling equipment and approaches the electric power source assembly to push the electric power source assembly.

A game apparatus according to the present invention has the electric charging apparatus and plural pieces of the traveling equipment.

According to this game apparatus, because electricity is not supplied to traveling equipment by the frictional contact with the floor panel, it is possible to reduce the probability of malfunctioning in electricity supply to the traveling equipment. With this configuration, it is possible to make the traveling equipment run with the second power supply device while charging the first power supply device by the first charge mechanism. It is possible to make the traveling equipment run with the first power supply device while charging the second power supply device by the second charge mechanism. Therefore, a time period for which traveling equipment cannot run due to the charging of the power supply device can be minimized.

In another aspect, a game apparatus of the present invention has traveling equipment; a first floor panel underneath which the traveling equipment runs; a second floor panel on top of which the traveling equipment runs, the second floor panel being placed beneath the first floor panel; a model attracted to the traveling equipment and running on the first floor panel, and the traveling equipment has a power supply device placed inside the traveling equipment; and a traveling mechanism that can run with the power supply device.

According to this configuration, because the power supply device is arranged in the traveling equipment, no electricity needs to be supplied from outside. Because electricity is not supplied to traveling equipment by the frictional contact with the floor panel, it is possible to reduce the probability of malfunctioning in electricity supply to the traveling equipment.

It is preferable that the power supply device be chargeable. In this case, the traveling equipment can be driven repeatedly.

Preferably, the game apparatus additionally has an electric charge mechanism for charging the power supply device of the traveling equipment, the traveling equipment having an electric power source assembly retaining mechanism for retaining, in a detachable manner, an electric power source assembly containing the power supply device, and the electric charging apparatus has a charge mechanism for, while the electric power source assembly is retained by each piece of the traveling equipment, charging another electric power source assembly; and a swapping mechanism for swapping the electric power source assembly for the another electric power source assembly.

With this configuration, while charging an electric power source assembly by the charge mechanism, it is possible to make traveling equipment run with another power supply assembly. Therefore, a time period for which traveling equipment cannot run due to the charging of the power supply device can be minimized.

Preferably, the game apparatus has plural pieces of the traveling equipment running on the second floor panel; and plural pieces of the models attracted to the traveling equipment and running on the first floor panel, the charge mechanism can charge first power supply devices inside plural first power supply assemblies respectively mounted on the plural pieces of traveling equipment and can charge second power supply devices inside plural second power supply assemblies respectively mounted on the plural pieces of traveling equipment, the swapping mechanism dismounts and moves the plural first power supply assemblies from the plural pieces of traveling equipment to the charge mechanism, moves the plural second power supply assemblies from the charge mechanism, to be mounted on the plural pieces of traveling equipment, dismounts and moves the plural second power supply assemblies from the plural pieces of traveling equipment to the charge mechanism, and moves the plural first power supply assemblies from the charge mechanism, to be mounted on the plural pieces of traveling equipment.

According to this configuration, it is possible to make the traveling equipment run with the second power supply device while charging the first power supply device by the first charge mechanism, and it is possible to make the traveling equipment run with the first power supply device while charging the second power supply device by the second charge mechanism. Therefore, a time period for which traveling equipment cannot run due to the charging of the power supply device can be minimized.

Preferably, the game apparatus has plural pieces of the traveling equipment running on the second floor panel; plural pieces of the models attracted to some of the plural pieces of traveling equipment and running on the first floor panel; and a start gate model or a part attracted to one of other pieces of the plural pieces of traveling equipment and running on the first floor panel, the start gate model surrounding a position where the plural pieces of models start running, and the part supporting a mark representing the running start position.

In this configuration, plural models can be pulled by some pieces of traveling equipment and a start gate model or a part supporting a mark representing a running start position can be pulled by another or other plural pieces of traveling equipment of the same type. Therefore, no drive mechanism of an exclusive type for moving a large-sized start gate model that can surround plural model assemblies or for moving a part supporting a mark representing a running start position is necessary.

The start gate model surrounds plural positions where plural models start running as a whole. The start gate model may have, but does not necessarily have, plural doors, plural bars, or plural tapes behind which plural models respectively wait before a run. In addition, the start gate model may have, but does not necessarily have a top connecting plural sidewalls or another connection part. "A mark representing a running start position" includes, for example, at least one bar or at least one tape behind which plural models waiting before run. "A part supporting a mark" includes at least one pillar or at least one tower supporting such a bar or a tape.

Preferably, the first floor panel has plural floor panel members combinable adjacent to one another; each of the floor panel members has an edge that is adjacent to another floor panel member; when the floor panel member is assembled with another adjacent floor panel member, the top surface of the floor panel member and the top surface of the another adjacent floor panel member become flush, and the bottom surface of the floor panel member and the bottom surface of the another adjacent floor panel member become flush.

In this configuration, because the first floor panel can be disassembled into plural floor panel members, it is convenient, for example, when transporting the game apparatus or the first floor panel. In addition, it is easy to remove a floor panel member from the game apparatus, to check the condition underneath. In addition, when a floor panel member is damaged, it is not necessary to change the entire first floor panel and only the damaged floor panel member need be replaced. Furthermore, when a floor panel member is assembled with another floor panel member to which the floor panel member is adjacent, the top surface of plural floor panel members forms a plane and the lower surface forms a plane. In other words, the top surface of the joints between floor panel members forms a plane, and the lower surface forms a plane, too. Therefore, the movement of models is not obstructed. In addition, the movement of traveling equipment traveling underneath the first floor panel is not obstructed.

Preferably, on the top surface of an edge of the floor part panel, plural convex portions projecting along a surface identical to the upper surface and plural concave portions are formed; and the convex portions of one of the floor panel members are fit into the concave portions of the other floor panel member without protruding from the top surface, and the convex portions of the other floor panel member are fit into the concave portions of the one of the floor panel members without protruding from the top surface.

In this configuration, after one of the floor panel members is installed at a position where it should be arranged, it is possible to easily install the other floor panel member at a position where it should be arranged. In particular, the mutual positioning of plural floor panel members is easy by fitting the plural convex portions and the plural concave portions. In addition, it is easy to disassemble the first floor panel by separating one of the floor panel members from the other.

Preferably, the traveling mechanism of the traveling equipment has a drive wheel rotating in contact with the bottom surface of the first floor panel, thereby causing the traveling equipment to run. If drive wheels of the traveling equipment rotate in contact with the top surface of the second floor panel underneath traveling equipment and if debris or other materials are adhered or accumulated on the top surface of the second floor panel, the traveling motion of traveling equipment might be obstructed for reasons such as the mutual friction between drive wheels of the traveling equipment and the second floor panel being reduced. However, the debris or other materials are unlikely to be adhered or accumulated on the bottom surface of the first floor panel that is above the traveling equipment. The drive wheels of the traveling equipment rotate in contact with the bottom surface of the first floor panel that is on the traveling equipment, whereby it is possible to reduce the probability of the traveling motion of traveling equipment being obstructed.

DESCRIPTION OF EMBODIMENTS

In the following, description will be given of an embodiment according to the present invention with reference to the attached drawings.

Game Apparatus Overview

Figure 1:
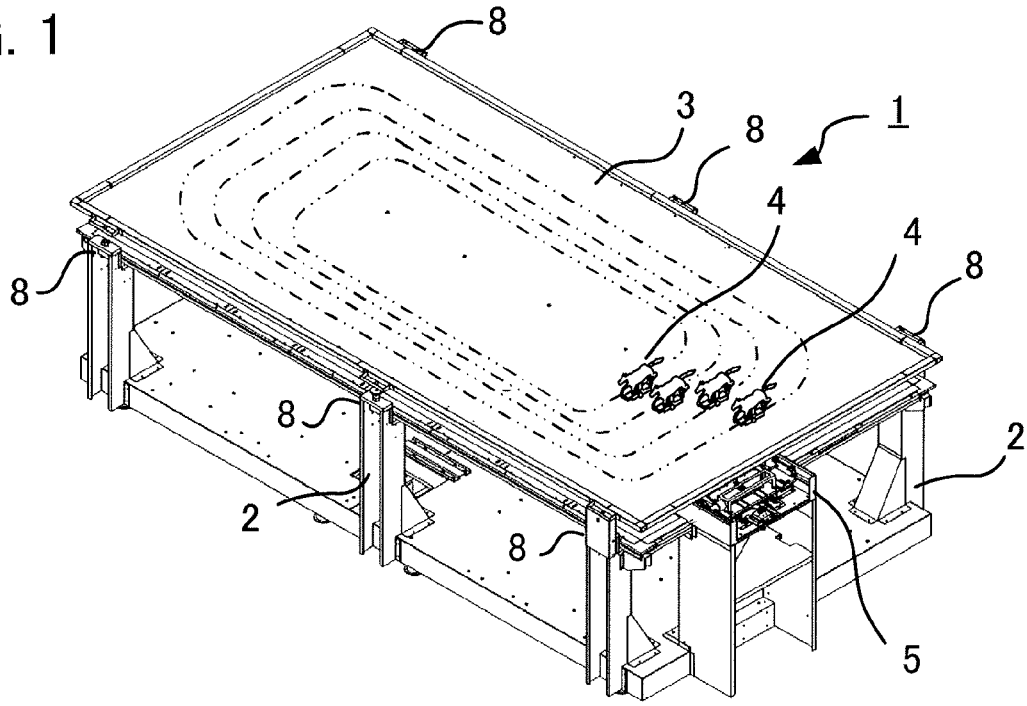
FIG. 1 is a perspective view showing a game apparatus according to an embodiment of the present invention.

As shown in FIG. 1, a game apparatus 1 according to an embodiment of the present invention has plural pillars 2, a floor panel 3 (a first floor panel) horizontally supported by pillars 2, and plural horse models 4 (four in the embodiment of the figures) running on floor panel 3. Although not shown in FIG. 1, each of the horse models 4 is pulled by magnetic force by traveling equipment lying underneath floor panel 3 and runs on floor panel 3. A horse racing game is executed with this game apparatus 1. In the horse racing game, horse model 4 runs in an oval or in an approximate quadrangle as indicated by virtual lines in FIG. 1. In addition, although not shown, horse models 4 may be driven to run in lines intersecting with one another.

Figure 2:
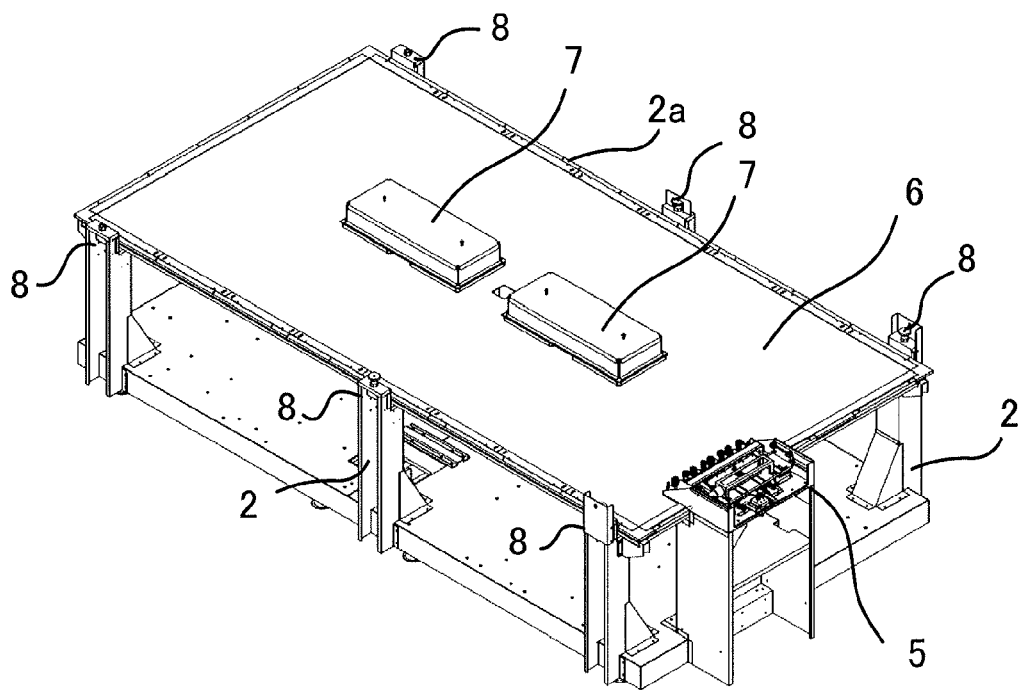
FIG. 2 is a perspective view of the game apparatus from which a floor panel and model horses have been dismounted.

FIG. 2 is a perspective view of game apparatus 1 from which floor panel 3 and horse models 4 are removed. A second floor panel 6 on which traveling equipment runs is supported horizontally by a frame 2a fixed to column 2. Mounted on frame 2a is an electric charging apparatus 5 for charging traveling equipment. Two cuboid blocks 7 are placed on second floor panel 6. Floor panel 3 is supported by multiple brackets 8 and blocks 7 at the top end of column 2.

Figure 3:
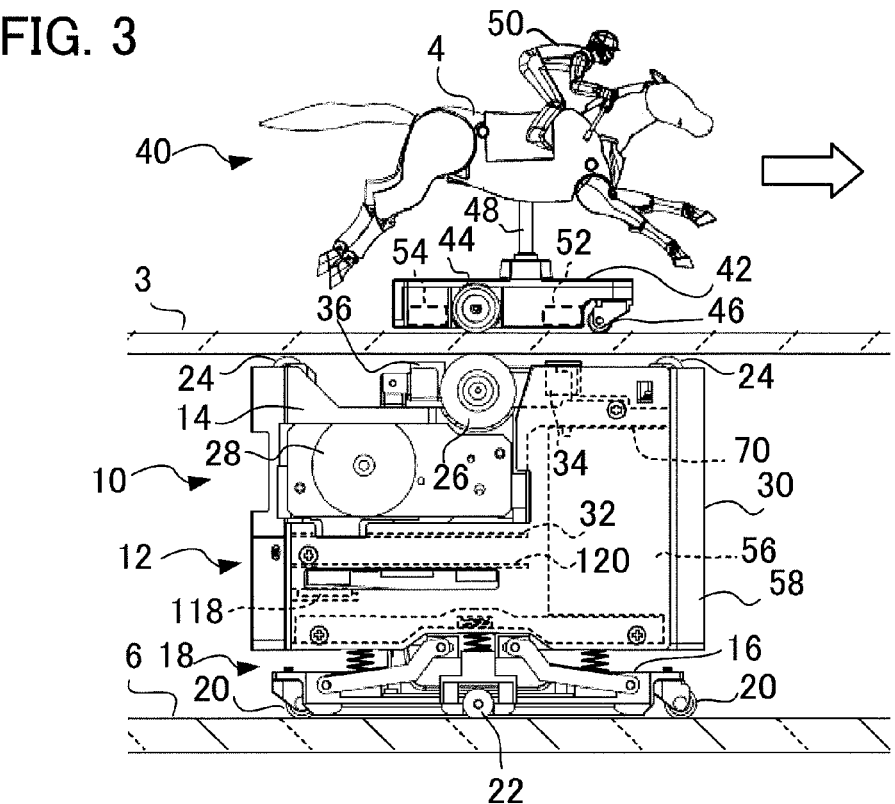
FIG. 3 is a front view showing a model horse and traveling equipment in the game apparatus.

As shown in FIG. 3, traveling equipment 10 is located in the space between floor panel 3 and second floor panel 6. Four pieces of traveling equipment 10 corresponding to four horse models 4 are provided for game apparatus 1 of the embodiment. However, FIG. 3 shows only one piece of traveling equipment 10 for simplification of explanation.

Traveling Equipment

Description will be given of the details of traveling equipment 10 with reference to FIGS. 3 to 13. Traveling equipment 10 has a main body 12 that can travel and an electric power source assembly 30 attached to main body 12. Main body 12 includes an upper part 14 and a lower part 16, and upper part 14 and lower part 16 are connected together by suspension 18. As best shown in the bottom view of FIG. 10, a pair of casters 20 is attached to both ends of lower part 16 in the longitudinal direction, whereas a pair of wheels 22 is attached to both ends of lower part 16 in the transverse direction. Traveling equipment 10 can run on second floor panel 6 by the action of casters 20 and wheels 22.

Figure 9:
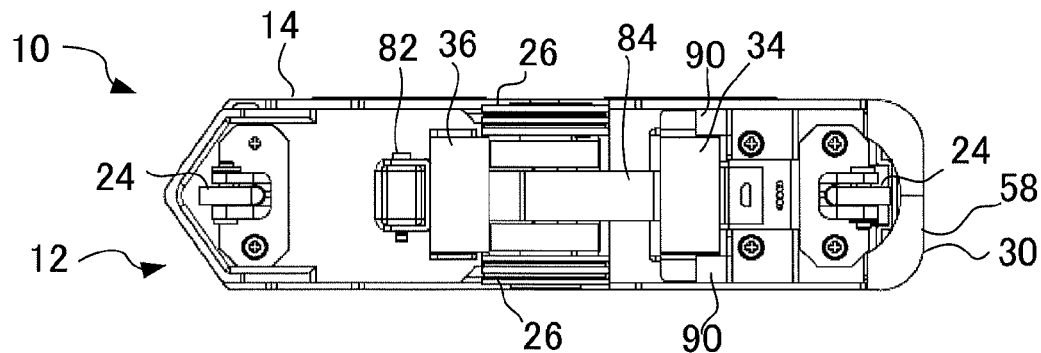
FIG. 9 is a plane view of the traveling equipment.

As best shown in the plane view of FIG. 9, a pair of casters 24 is attached to both ends of upper part 14 in the longitudinal direction and a pair of drive wheels 26 (traveling mechanism)

is attached to both ends of upper part 14 in the transverse direction. These drive wheels 26 are rotated respectively by different wheel motors 28 (traveling mechanism) fixed to upper part 14. The rotation of wheel motor 28 is transmitted to a drive wheel 26 corresponding to wheel motor 28 via a gear train (not shown). In substitution for the gear train, another suitable driving force transmission mechanism such as a belt-pulley mechanism and a chain-sprocket mechanism may be used.

As shown in FIG. 3, upper part 14 of main body 12 retains an electric power source assembly 30 inside of which at least one rechargeable power supply device is disposed. Fixed inside upper part 14 is a drive circuit board 32 on which a drive circuit is formed, the drive circuit receiving electricity from the power supply device of electric power source assembly 30 and drive wheel motor 28, thereby rotating drive wheel 26.

The entire traveling equipment 10 is attracted upward, i.e., toward floor panel 3, by magnetic force exerted between model puller 34,36 (electric power source assembly locking mechanism) (described later) and pulled section 52,54 of model assembly 40. As a result, the wheels of casters 24 and drive wheels 26 are in contact with floor panel 3 above. When drive wheels 26 rotate, by frictional contact between drive wheels 26 and floor panel 3, traveling equipment 10 travels in the direction indicated by the arrow in FIG. 3. Thus, wheel motors 28 and drive wheels 26 constitute a traveling mechanism that can travel by electric power source assembly 30. However, instead of drive wheels 26, it is possible to use other suitable traveling means, for example, caterpillars, arms with link mechanisms, or legs with link mechanisms.

Because different wheel motors 28 rotate both drive wheels 26, respectively, it is possible to rotate both drive wheels 26 at a different rotational speed, whereby traveling equipment 10 can make a turn while advancing by the difference in speed of drive wheels 26. Casters 20 and 24 facilitate the change in the direction of traveling equipment 10. The shaft of each wheel motor 28 can rotate in both directions, so that traveling equipment 10 can move forward and rearward. When both drive wheels 26 are rotated in opposite directions, the traveling equipment 10 can pivot about a vertical axis on the spot.

A model assembly 40 is disposed on floor panel 3. Model assembly 40 includes a carriage 42, a pair of wheels 44 rotatably attached to carriage 42, a caster 46 rotatably attached to carriage 42, a mast 48 standing on carriage 42, and a model horse 4 mounted on mast 48. A model jockey 50 is mounted on model horse 4. Arranged inside carriage 42 are two pulled sections 52 and 54. Pulled sections 52 and 54 are ferromagnets or magnets, preferably, permanent magnets.

On the other hand, model pullers 34 and 36 are mounted on upper part 14 of main body 12 of traveling equipment 10. Model pullers 34 and 36 are ferromagnets or magnets, preferably, permanent magnets. Floor panel 3 is made of a non-magnetic material, so that model puller 34 of traveling equipment 10 and pulled section 52 of model assembly 40 pull each other by the magnetic force, whereas model puller 36 of traveling equipment 10 and pulled section 54 of model assembly 40 pull each other by magnetic force. Therefore, when traveling equipment 10 runs, model pullers 34 and 36 pull model assembly 40 so that model assembly 40 travels together with traveling equipment 10. In a preferred embodiment, model pullers 34 and 36 and pulled sections 52 and 54 are permanent magnets, but other options may be used.

As has been described above, traveling equipment 10 runs under floor panel 3, whereas model assembly 40 corresponding to traveling equipment 10 pulled by traveling equipment 10 runs on floor panel 3 as indicated by the arrow in FIG. 3.

Figure 5:
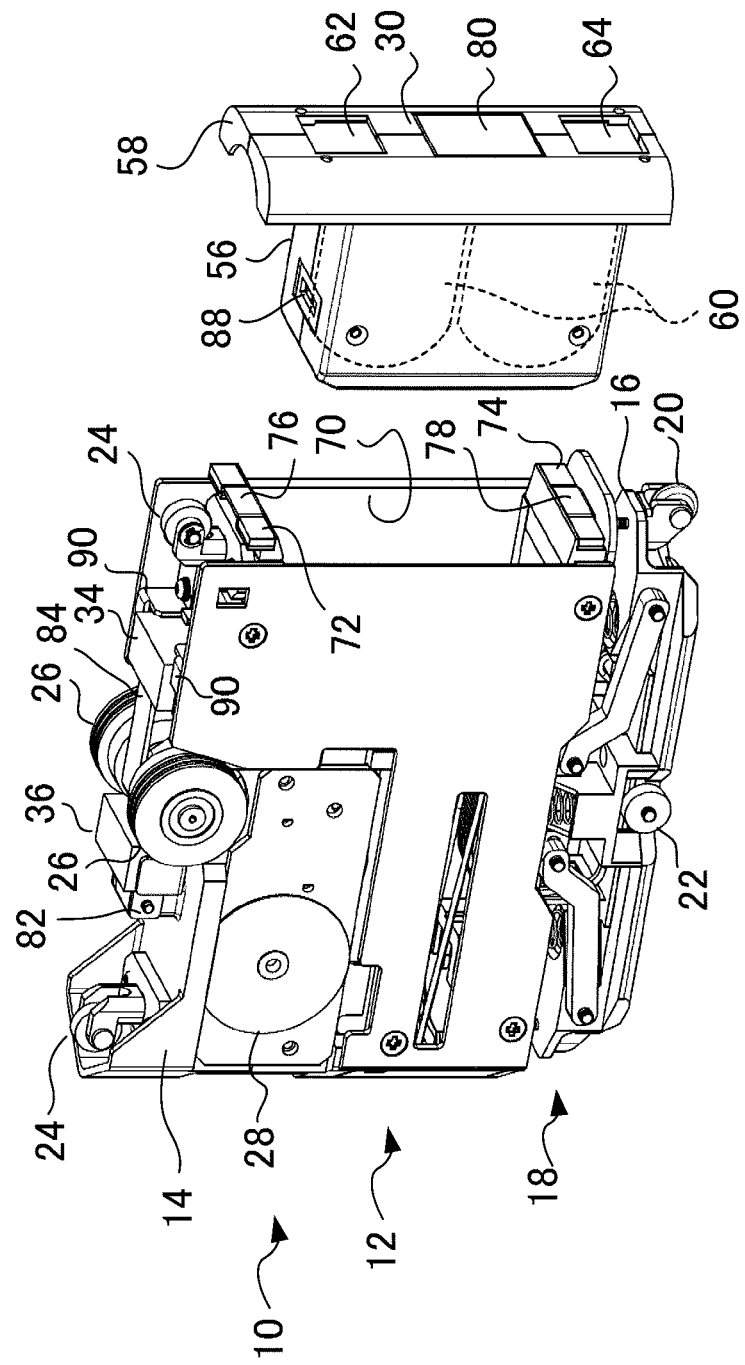
FIG. 5 is a perspective view showing the traveling equipment and an electric power source assembly retained therein.
Figure 11:
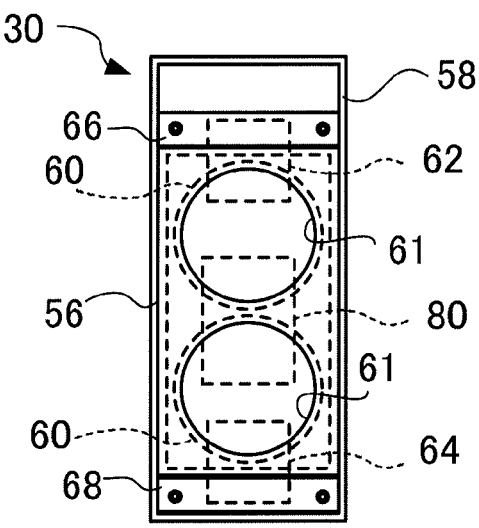
FIG. 11 is a left side view of the electric power source assembly.

As shown in FIGS. 5 and 11, electric power source assembly 30 has an approximately cuboid shaped housing 56, and a cover panel 58 attached to housing 56. Arranged inside housing 56 is at least one (two in the figures of the illustrated embodiment) power supply device 60. Each power supply device 60 is a rechargeable power supply device, and is, for example, a capacitor or a secondary battery. As shown in FIG. 11, a through-hole 61 is formed to housing 56, and power supply device 60 can been seen from the outside through through-hole 61.

Although the wiring in electric power source assembly 30 is not shown, a pair of charged electrodes 62 and 64 formed of a conductive material is exposed on an exterior surface (a surface that is the opposite side of a surface attached to housing 56) of cover panel 58, so that electric charging apparatus 5 (FIG. 1 or 2) charges these power supply devices 60. One of charged electrodes 62 and 64 is an anode, and the other is a cathode. When multiple power supply devices 60 are in housing 56, these charged electrodes 62 and 64 are used in common for multiple power supply devices 60.

As shown in FIG. 11, power supply electrode 66,68 (a second adherence unit) formed of a conductive material is attached on an interior surface (a surface attached to housing 56) cover panel 58. Power supply electrode 66 is located in the upper part of housing 56, and power supply electrode 68 is located in the lower part of housing 56. One of power supply electrodes 66 and 68 is an anode, and the other is a cathode. When multiple power supply devices 60 are in housing 56, these power supply electrodes 66 and 68 are used in common for multiple power supply devices 60.

As shown in FIG. 5, in upper part 14 of main body 12 of traveling equipment 10, there is provided an electric power source assembly compartment 70 into which housing 56 of electric power source assembly 30 is fitted. First adherence units 72 and 74 (electric power source assembly retaining mechanism) of ferromagnets or magnets are arranged to the upper part and the lower part of electric power source assembly compartment 70, and are fixed to upper part 14 of main body 12. In addition, power supplied electrodes 76 and 78 formed of a conductive material are arranged to the upper part and the lower part of electric power source assembly compartment 70, and are fixed to upper part 14 of main body 12.

Power supply electrode 66,68 (FIG. 11) of electric power source assembly 30 is a second adherence unit of a ferromagnet or a magnet. First adherence unit 72,74 fixes, in a detachable manner, power supply electrodes (second adherence units) 66 and 68 provided in electric power source assembly 30. Housing 56 of electric power source assembly 30 is inserted in electric power source assembly compartment 70 of main body 12, and power supply electrode 66,68 is adhered to first adherence unit 72,74, whereby electric power source assembly 30 is retained in main body 12. When first adherence unit 72,74 adheres to power supply electrode 66,68, power supplied electrode 76,78 comes in contact with power supply electrode 66,68. Although the wiring in main body 12 is not shown, when power supplied electrode 76,78 comes in contact with power supply electrode 66,68, the drive circuit of drive circuit board 32 (FIG. 3) receives electricity from power supply device 60 of electric power source assembly 30 and drives wheel motors 28 to make traveling equipment 10 run.

With this configuration, first adherence unit 72,74 of traveling equipment 10 adheres to power supply electrode 66,68 provided in electric power source assembly 30 in a readily detachable manner by means of magnetic force. When electric power source assembly 30 is retained in first adherence unit 72,74 of traveling equipment 10, power supplied electrode 76,78 of traveling equipment 10 comes in contact with power supply electrode 66,68 of power supply device 60 provided in electric power source assembly 30. As a result, main body 12 of traveling equipment 10 receives electricity from power supply device 60 and is made able to run. According to this configuration, because electricity is not supplied to traveling equipment 10 by the frictional contact with the floor panel, possible malfunctioning in electricity supply to traveling equipment 10 can be reduced.

In a preferred embodiment, first adherence unit 72,74 is a permanent magnet, and power supplied electrode 76,78 is formed of a material higher in conductivity, and power supply electrode 66,68 as the second adherence unit is formed of a material having ferromagnetism and high conductivity, e.g., iron or steel. In the illustrated embodiment, because power supply electrode 66,68 serves as the second adherence unit, the number of parts can be reduced in comparison with a case in which the second adherence unit and power supply electrode 66,68 are provided separately. In addition, because an electrode is established in the adherence unit, the possible poor contact of the electrode can be reduced.

However, other options can be used. For example, first adherence unit 72,74 may be ferromagnets, and power supplied electrode 76,78 which is a second adherence unit may be magnets. The second adherence unit and power supply electrode 66,68 may be provided separately in electric power source assembly 30.

Figure 4:
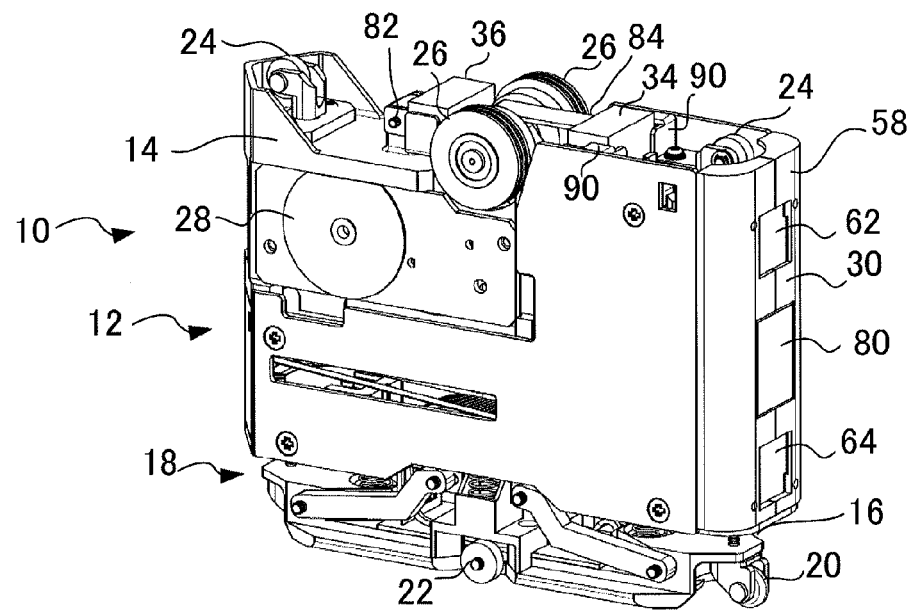
FIG. 4 is a perspective view showing the traveling equipment.
Figure 8:
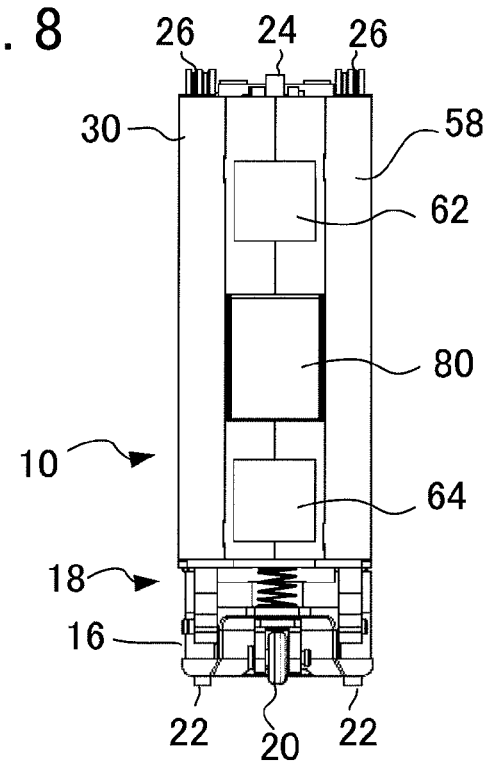
FIG. 8 is a right side view of the traveling equipment.

As shown in FIGS. 4, 5, and 8, a third adherence unit 80 that is a ferromagnet or a magnet is exposed between a pair of charged electrodes 62 and 64 of cover panel 58 on an exterior surface thereof (a surface that is the opposite side of a surface attached to housing 56). The third adherence unit 80 is adhered to electric charging apparatus 5 (FIG. 1 or 2) outside by magnetic force in a detachable manner. When third adherence unit 80 of electric power source assembly 30 is adhered to electric charging apparatus 5 and is pulled by electric charging apparatus 5, electric power source assembly 30 separates from traveling equipment 10 to be retained in electric charging apparatus 5. In this configuration, electric power source assembly 30 can be easily detached from traveling equipment 10 by magnetic force by outside electric charging apparatus 5. When outside electric charging apparatus 5 retains electric power source assembly 30, outside electric charging apparatus 5 can charge power supply device 60 by charged electrode 62,64.

Figure 12:
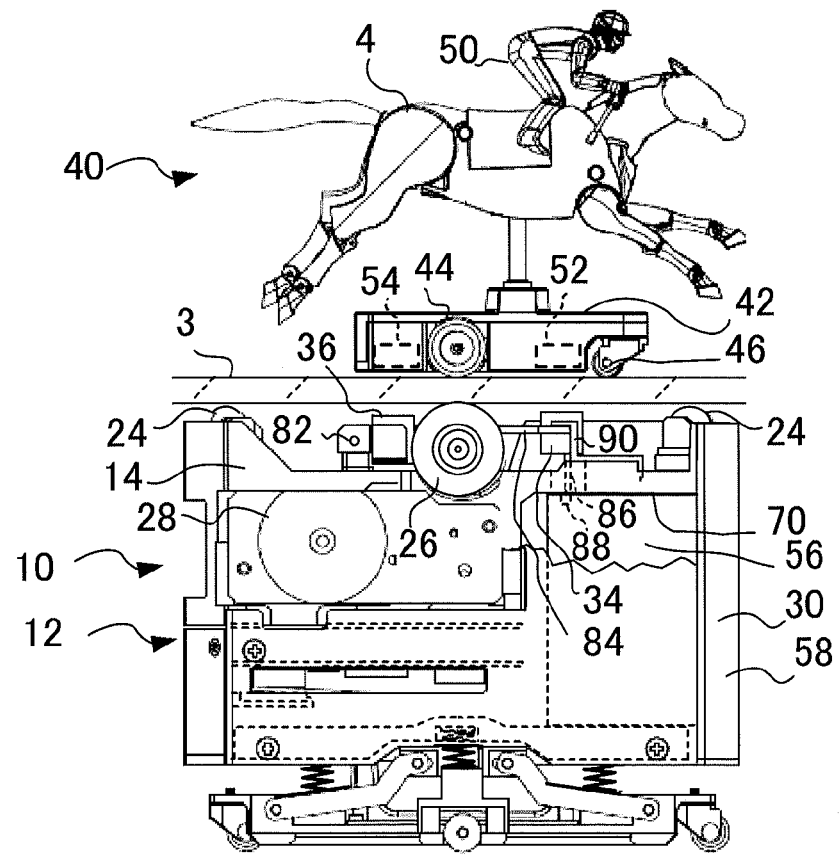
FIG. 12 is a partially broken front view of the traveling equipment.
Figure 13:
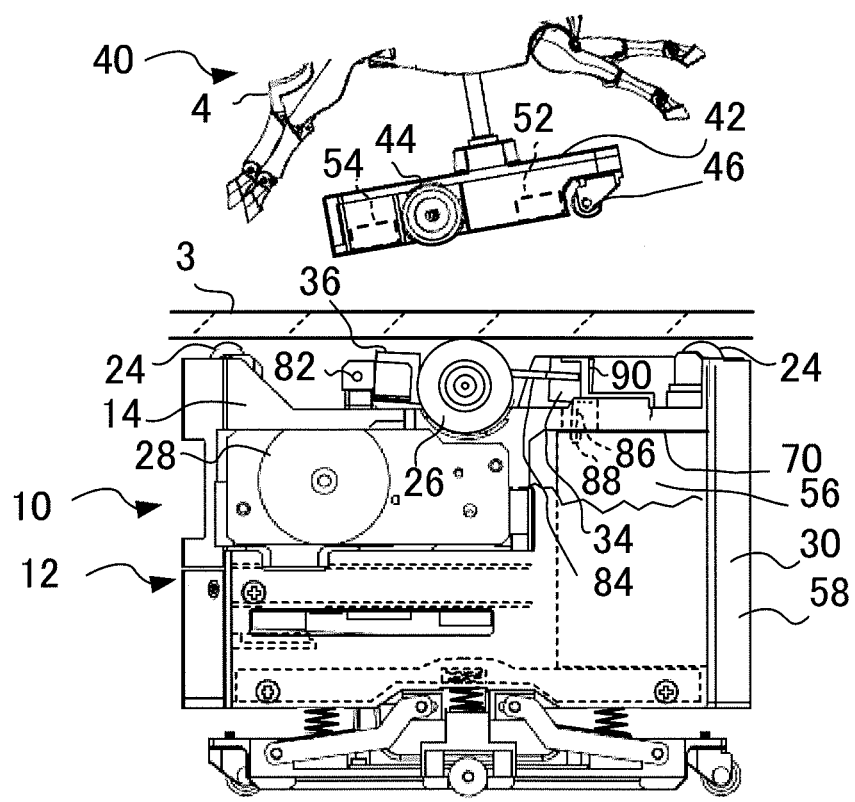
FIG. 13 is a partially broken front view of the traveling equipment, from which the horse model is apart.

FIGS. 12 and 13 show a partially broken view of traveling equipment 10. As shown in FIGS. 12 and 13, traveling equipment 10 has an electric power source assembly locking mechanism that can lock electric power source assembly 30 fitted in electric power source assembly compartment 70. The electric power source assembly locking mechanism has a pin 82 (electric power source assembly locking mechanism) attached to upper part 14 of main body 12 of traveling equipment 10, a lever 84 (electric power source assembly locking mechanism, release mechanism) rotatable around pin 82 as a center, model pullers 34 and 36 being the above-described ferromagnets or magnets and fixed to lever 84, and a lock piece 86 (electric power source assembly locking mechanism) extending downwardly from model puller 34. By rotating lever 84 around pin 82, model pullers 34 and 36 fixed to the lever and lock piece 86 move around pin 82.

As best shown in FIG. 5, a lock hole 88 is formed on the top surface of housing 56 of electric power source assembly 30. As shown in FIG. 12, when model assembly 40 is right above traveling equipment 10, and when pulled sections 52 and 54 sandwich floor panel 3 and are at positions close to model pullers 34 and 36, model pullers 34 and 36 are lifted by magnetic force acting on pulled sections 52 and 54 and on model pullers 34 and 36. At this moment, lock piece 86 is not engaged with lock hole 88, and therefore, electric power source assembly 30 can be pulled out from electric power source assembly compartment 70 of main body 12 against magnetic force exerting between electric power source assembly 30 and main body 12.

On the other hand, as shown in FIG. 13, when model assembly 40 is separated from model pullers 34 and 36, especially from traveling equipment 10, magnetic force exerting between pulled sections 52 and 54 and model pullers 34 and 36 weakens or disappears, and as a result, model pullers 34 and 36 fall by gravity. Because, at this moment, the bottom end of lock piece 86 is inserted in lock hole 88, electric power source assembly 30 cannot be pulled out from electric power source assembly compartment 70 of main body 12.

Thus, when model assembly 40 is separated from model puller 34,36 (FIG. 13), the electric power source assembly locking mechanism locks electric power source assembly 30. Therefore, when a person carries traveling equipment 10 separated from model assembly 40 for repair, electric power source assembly 30 does not come off electric power source assembly compartment 70 accidentally, so that electric power source assembly 30 does not fall off main body 12, nor does main body 12 fall off electric power source assembly 30. On the other hand, when model assembly 40 is at the position that model puller 34,36 and pulled section 52,54 attract each other (FIG. 12), the electric power source assembly locking mechanism releases a lock to electric power source assembly 30, and electric power source assembly 30 can be pulled out from electric power source assembly compartment 70 of main body 12.

As best shown in FIGS. 4 and 5, lever 84 of the electric power source assembly locking mechanism is located between both drive wheels 26. Lever 84 or model puller 34 can be picked up by hand to rotate lever 84 (release mechanism) by manual operation. Therefore, even in a case in which model assembly 40 separates from model puller 34,36 and in which the electric power source assembly locking mechanism locks electric power source assembly 30, a lock to electric power source assembly 30 by the electric power source assembly locking mechanism can be released manually in a situation in which it is necessary to separate electric power source assembly 30, for example, for repair of traveling equipment 10.

As best shown in FIGS. 4, 5, and 9, a pair of rotation stoppers 90 for preventing the excessive rotation of lever 84 is fixed in upper part 14 of main body 12. On both sides of model puller 34 is a stopper piece fixed as a part of lever 84, and when lever 84 rotates counterclockwise in FIG. 12, the stopper piece hits rotation stopper 90. Therefore, rotation stopper 90 controls the excessive rotation of lever 84 and consequently, the excessive lift of model puller 34,36, thereby preventing contact between model puller 34,36 and floor panel 3, and also preventing magnetic force exerting between model puller 34,36 and pulled section 52,54 becoming excessive.

Control System of Game Apparatus

Figure 14:
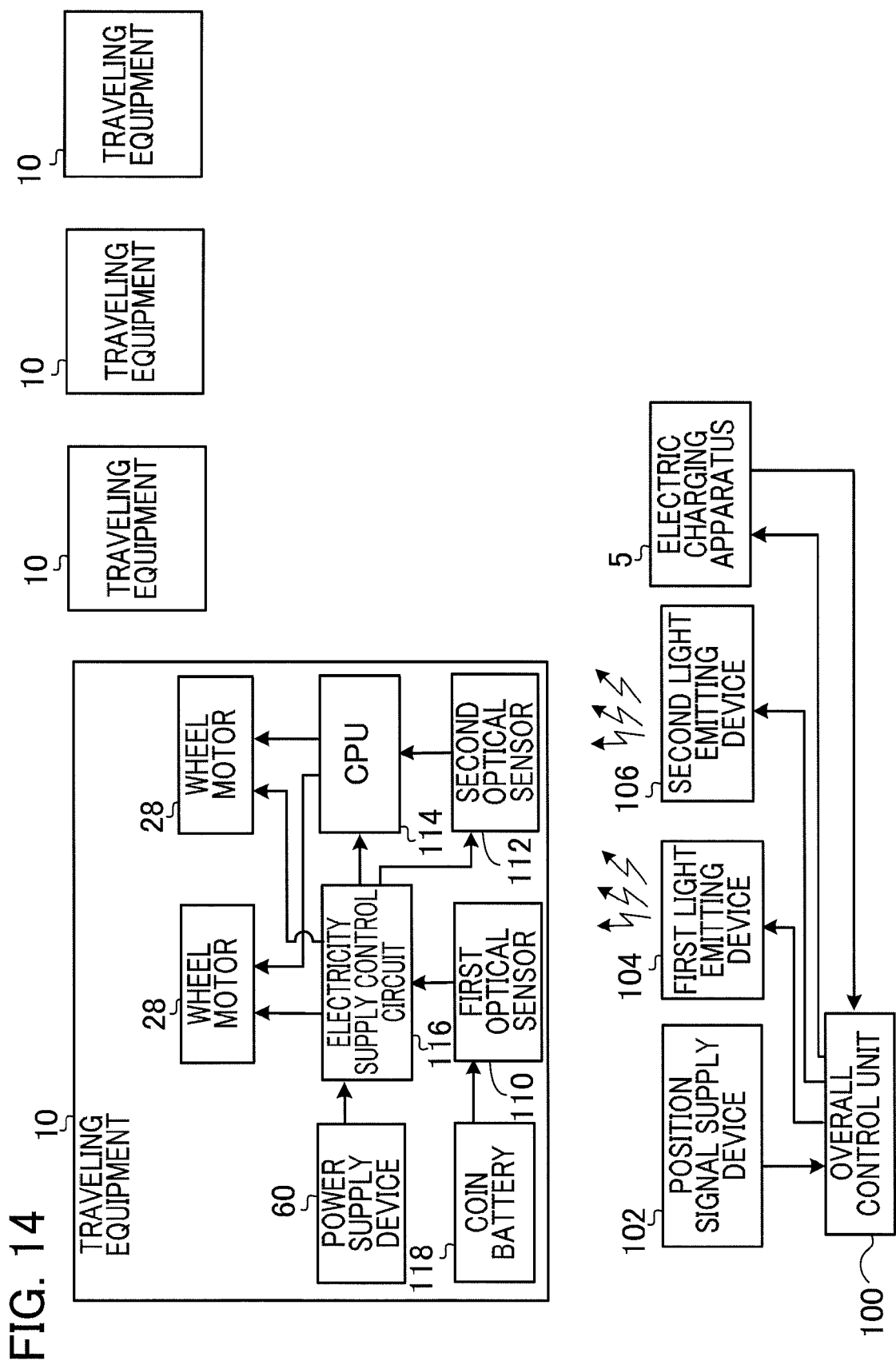
FIG. 14 is a block diagram showing an overview of a control system of the game apparatus.

With reference to FIG. 14, the outline of a control system of the game apparatus will be described. The control system of the game apparatus includes an overall control device 100, a position signal supply device 102, a first light emitting device 104, and a second light emitting device 106. Overall control device 100 is a computer that controls the overall game apparatus including the multiple pieces of traveling equipment 10 and electric charging apparatus 5. In the illustrated embodiment, a single overall control device 100 is used, but it is possible to separately provide a control device for receiving signals from position signal supply device 102 and for controlling first light emitting device 104 and second light emitting device 106, and another control device for receiving signals from electric charging apparatus 5 and for controlling electric charging apparatus 5.

Position signal supply device 102 supplies a signal showing a position of each piece of traveling equipment 10 (preferably, a direction of each piece of traveling equipment 10 in addition to the position) to overall control device 100. Position signal supply device 102 may be any suitable type of a device capable of outputting a position signal. For example, a device for identifying the position of traveling equipment 10 by image analysis can be used.

For example, position signal supply device 102 may use electromagnetic coupling used with a pressure distribution sensing device described in International Public Bulletin WO06/106714, Japanese Patent Laid-Open No. 2007-218892, Japanese Patent Laid-Open No. 2005-164448, Japanese Patent Laid-Open No. 2005-156474 for position identification of traveling equipment 10. Description will be given of an example of position signal supply device 102 that identifies a position using the electromagnetic coupling with reference to FIG. 15.

Figure 15:
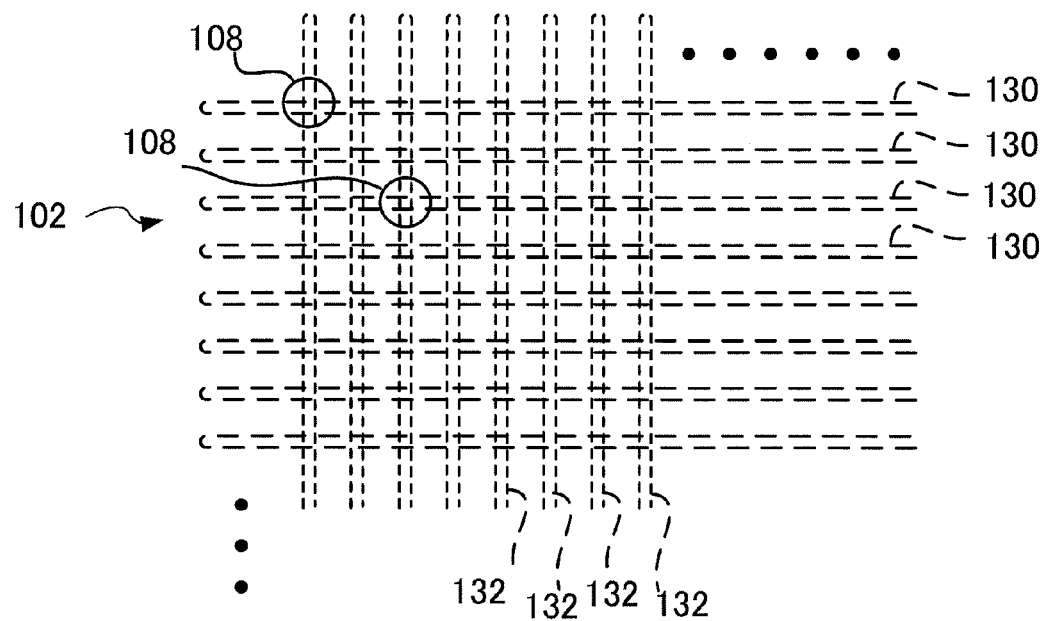
FIG. 15 is a schematic view showing an example of a position signal supply device of the game apparatus.
Figure 16:
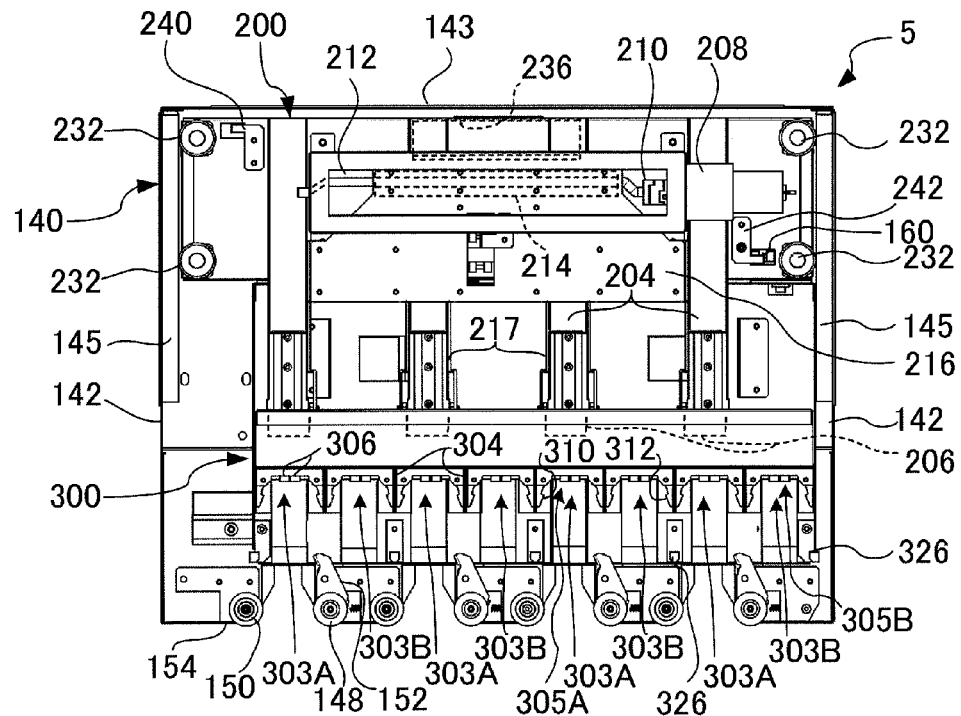
FIG. 16 is a plane view showing an electric charging apparatus of the game apparatus.
Figure 17:
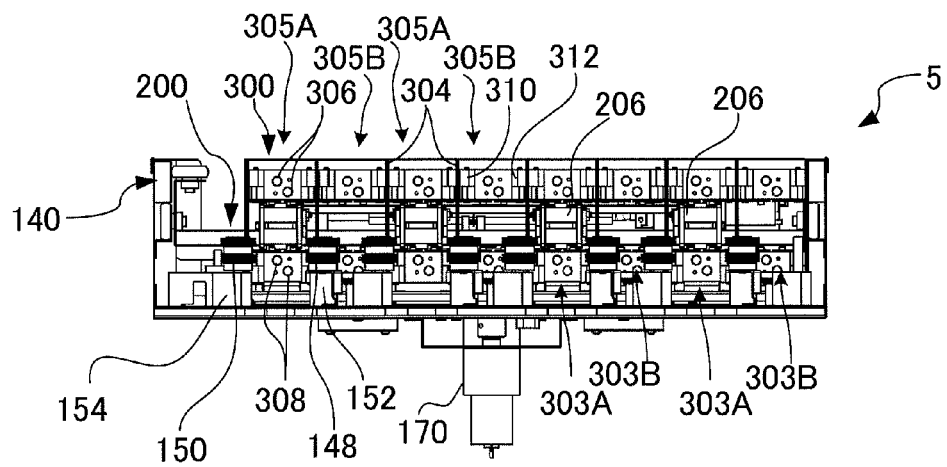
FIG. 17 is a front view showing the electric charging apparatus.

As shown in FIG. 15, this position signal supply device 102 has multiple first loop conducting wires 130 and multiple second loop conducting wires 132. Each of first loop conducting wire 130 has two conducting wire parts parallel to each other, and these conducting wire parts are connected together in one end (the left edge of the figure). The right-side end of first loop conducting wire 130 is connected to a current supply source (not shown), and an electric current flows in first loop conducting wire 130. These first loop conducting wires 130 are arranged parallel to one another and are arranged in the same layer.

Each of second loop conducting wires 132 has two conducting wire parts parallel to each other, and these conducting wire parts are connected together in one end (the upper end of the figure). The bottom end of second loop conducting wire 132 is connected to a current measurement device (not shown). These second loop conducting wires 132 are arranged parallel to one another and are arranged in the same layer.

When viewed from a direction perpendicular to the plane of the page of FIG. 15, the parallel conducting wire parts of second loop conducting wire 132 are at right angles to the parallel conducting wire parts of first loop conducting wire 130. However, although not shown, the layer in which second loop conducting wires 132 are arranged is different from the layer in which first loop conducting wires 130 are arranged. These layers are located in parallel, and provided therebetween is the layer of the non-conductive material.

When an electric current flows in first loop conducting wire 130, an electric current flows through second loop conducting wire 132 as well by the action of electromagnetic coupling. The electric current flowing through second loop conducting wire 132 is different in a case in which a detected piece 108 formed of a conductive material is placed at the intersection of first loop conducting wire 130 and second loop conducting wire 132 from a case that is otherwise. Therefore, the position of detected piece 108 is identified by monitoring an electric current flowing in second loop conducting wire 132. If two detected pieces 108 are provided for each piece of traveling equipment 10, the angle of each piece of traveling equipment 10 is identified.

Figure 10:
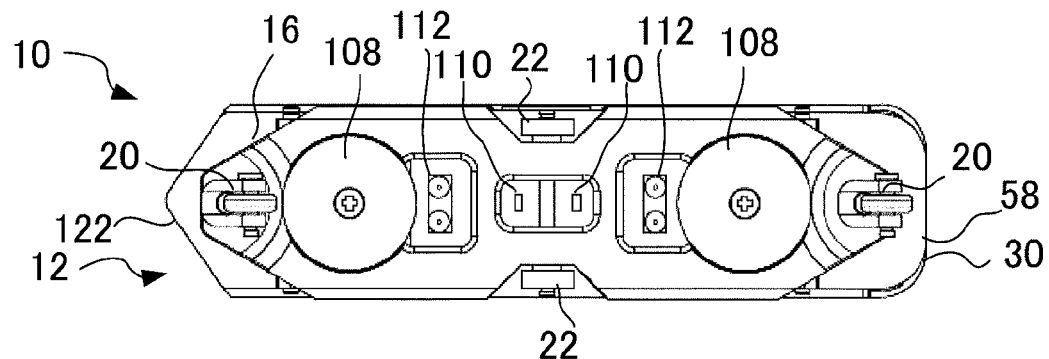
FIG. 10 is a bottom view of the traveling equipment.

As shown in the bottom plan view of FIG. 10, a pair of disciform detected pieces 108 formed of a conductive material is fixed in the bottom surface of lower part 16 of main body 12 of traveling equipment 10. Therefore, position signal supply device 102 supplies, to overall control device 100, a signal indicating the positions of two detected pieces 108 for each piece of traveling equipment 10. Using a signal from position signal supply device 102, overall control device 100 can identify the position and angle of each piece of traveling equipment 10 by identifying the positions of two detected pieces 108 of each piece of traveling equipment 10. In addition, moving multiple pieces of traveling equipment 10 at different times and measuring an electric current flowing through second loop conducting wires 132 enable the identification of the positions of two detected pieces 108 of each moved piece of traveling equipment 10. This position signal supply device 102 can be mounted on second floor panel 6.

Because upper part 14 and lower part 16 of main body 12 of traveling equipment 10 are connected together by suspension 18 as described above, downward force is imparted to lower part 14. Therefore, detected piece 108 is pressed against second floor panel 6, and thus against position signal supply device 102.

First light emitting device 104 emits light (e.g., visible light) within a wavelength region in order to activate all pieces of traveling equipment 10 simultaneously. In accordance with a computer program, overall control device 100 causes first light emitting device 104 to emit the light.

After activation of pieces of traveling equipment 10, second light emitting device 106 sends traveling control signals for controlling the travel of each piece of traveling equipment 10 by means of emitting light (e.g., infrared light) within a wavelength region which is different from that of the light emitted by first light emitting device 104. In accordance with the computer program, overall control device 100 supplies traveling control signals for controlling multiple pieces of traveling equipment 10 to second light emitting device 106, and second light emitting device 106 emits the light in accordance with the traveling control signals. An identifier for identifying traveling equipment 10 to be controlled is attached to each traveling control signal, so that each piece of traveling equipment 10 can recognize the traveling control signal that is destined for traveling equipment 10 itself. In substitution of light emitting device 104,106, a communication device that uses other wireless communication schemes using other radio waves may be utilized.

Preferably, second floor panel 6 (FIGS. 1 through 3) with high optical transparency may be used, whereas first light emitting device 104 and second light emitting device 106 may be located beneath second floor panel 6. However, if the optical transparency of second floor panel 6 is low, first light emitting device 104 and second light emitting device 106 may be located between floor panel 3 and second floor panel 6.

As shown in the bottom view of FIG. 10, two first optical sensors 110 and two second optical sensors 112 are exposed at the bottom surface of lower part 16 of main body 12 of traveling equipment 10. The first optical sensor 110 is, for example, a visible light sensor, which outputs a light-reception signal upon receiving the light emitted from first light emitting device 104. Second optical sensor 112 is, for example, an infrared sensor, which outputs a traveling control signal transmitted by the light emitted from second light emitting device 106. In the illustrated embodiment, two first optical sensors 110 and two second optical sensors 112 are provided in order to ensure that if there is failure in the arrival of light to a sensor of each pair, the remaining sensor can receive light. However, a single first optical sensor 110 and a single second optical sensor 112 may be provided. At least three first optical sensors 110 and at least three second optical sensors 112 may also be provided.

As shown in FIG. 14, each piece of traveling equipment 10 further includes a CPU (central processing unit) 114, an electricity supply control circuit 116, and a coin battery 118. Coin battery 118 continuously supplies electricity to first optical sensor 110 so that first optical sensor 110 can output a light-reception signal. Upon receiving the light-reception signal from first optical sensor 110 caused by the light emission of first light emitting device 104, electricity supply control circuit 116 enables electric supply from power supply device 60 in electric power source assembly 30 to CPU 114, to second optical sensor 112, and to both wheel motors 28.

After start of the electric supply from power supply device 60 to these elements, second optical sensor 112 transmits traveling control signals sent from second light emitting device 106 to CPU 114. CPU 114 of each piece of traveling equipment 10 selects a traveling control signal for traveling equipment 10 to which the CPU 114 belongs from among traveling control signals for multiple pieces of traveling equipment 10, and controls both wheel motors 28 in accordance with the traveling control signal.

The traveling control signal designates the rotational speed or rotational angle for each of wheel motors 28. As a result, for each piece of traveling equipment 10, the rotational speed of each of drive wheels 26 is controlled. If the rotational speeds of both drive wheels 26 are the same, traveling equipment 10 travels in a straight line. Otherwise, traveling equipment 10 travels in a curved line.

Figure 6:
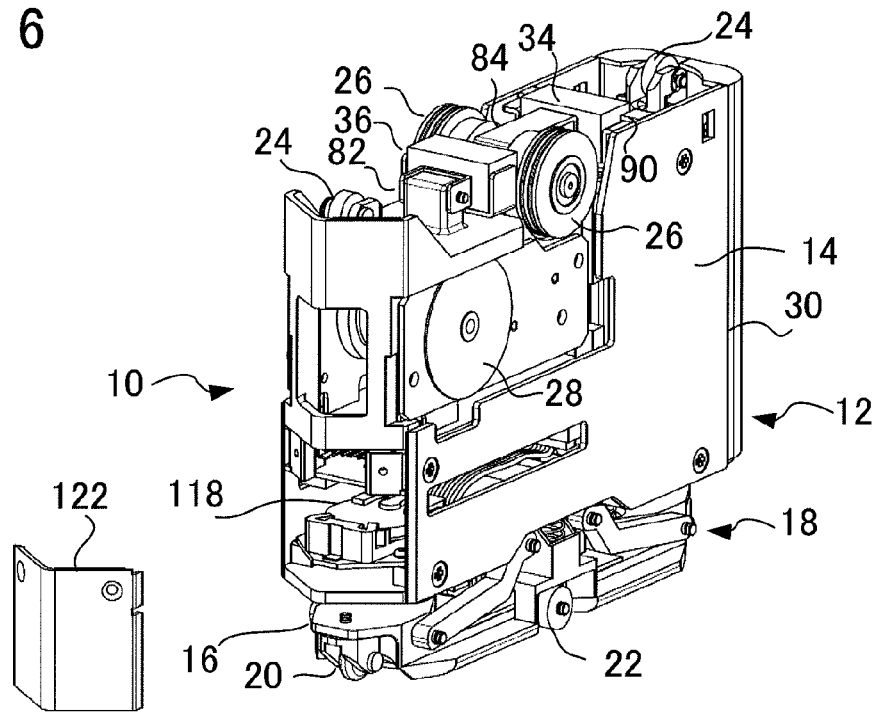
FIG. 6 is a perspective view of the traveling equipment when viewed from another direction.
Figure 7:
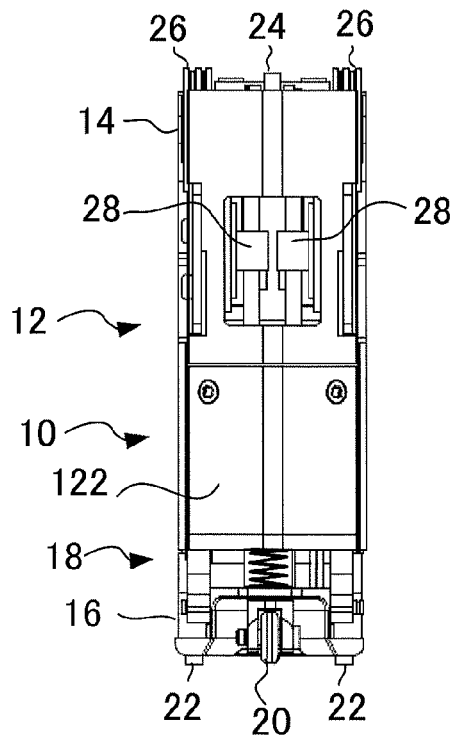
FIG. 7 is a left side view of the traveling equipment.

CPU 114 is mounted on drive circuit board 32 shown in FIG. 3, and electricity supply control circuit 116 is mounted on electricity supply control circuit board 120 shown in FIG. 3. FIG. 6 shows a state in which a panel 122 has been removed from upper part 14 of main body 12 of traveling equipment 10. Coin battery 118 can be attached to and detached from main body 12 by removing panel 122.

Electric Charging Apparatus

Description is next given of electric charging apparatus 5 of game apparatus 1 according to an embodiment with reference to FIGS. 16 to 35. Electric charging apparatus 5 has a main base 140, an electric power source assembly swapping mechanism 200, and an electric power source assembly holder 300. Electric power source assembly holder 300 has a charge mechanism, and the charge mechanism charges four power supply assemblies 30 at a time while different electric power source assemblies 30 are retained in each of four pieces of traveling equipment 10. Electric power source assembly swapping mechanism 200 swaps the four power supply assemblies 30 for different four power supply assemblies 30.

Figure 19:
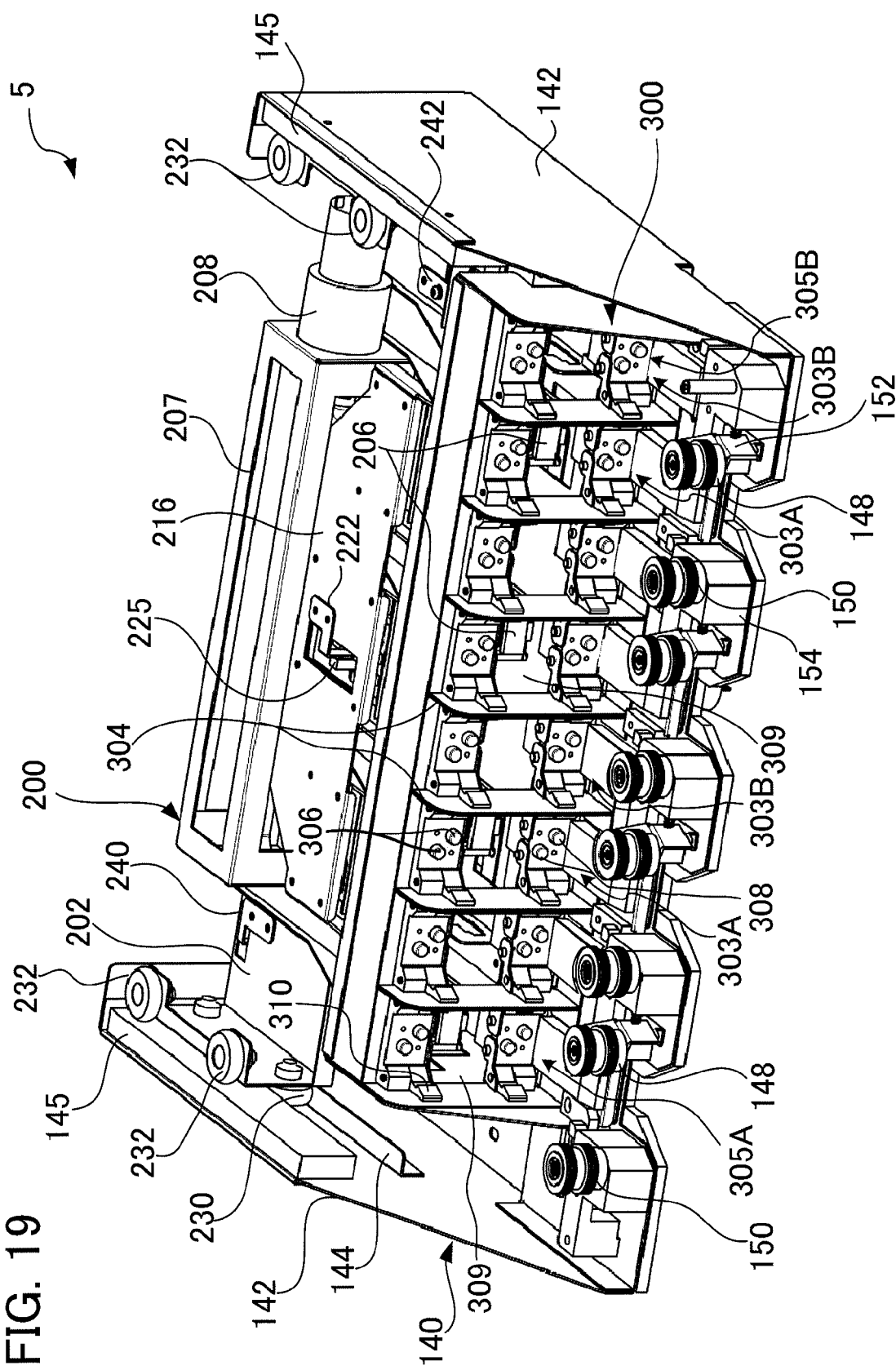
FIG. 19 is a perspective view showing the electric charging apparatus.
Figure 20:
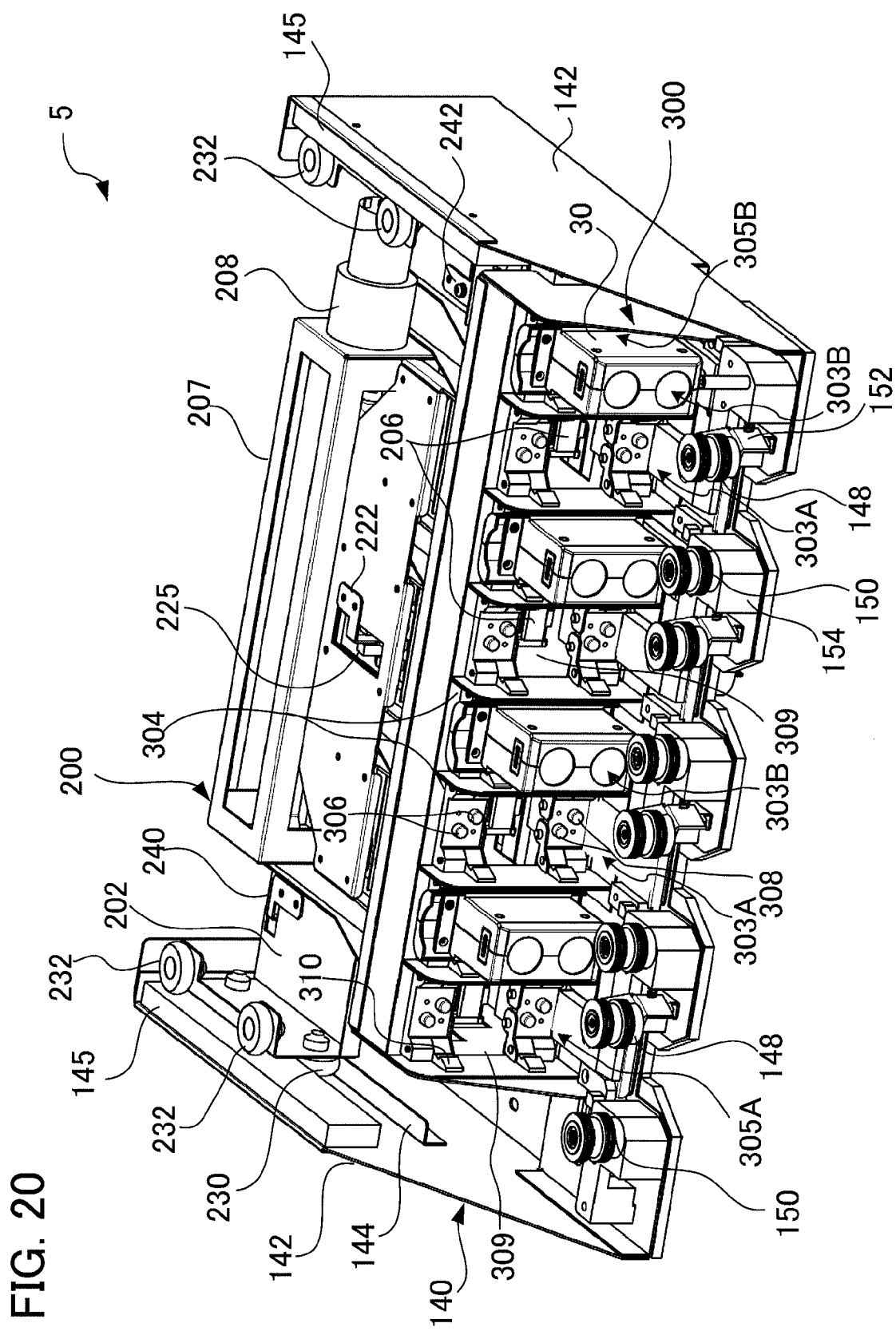
FIG. 20 is a front view showing the electric charging apparatus with plural above power supply assemblies attached thereto.
Figure 21:
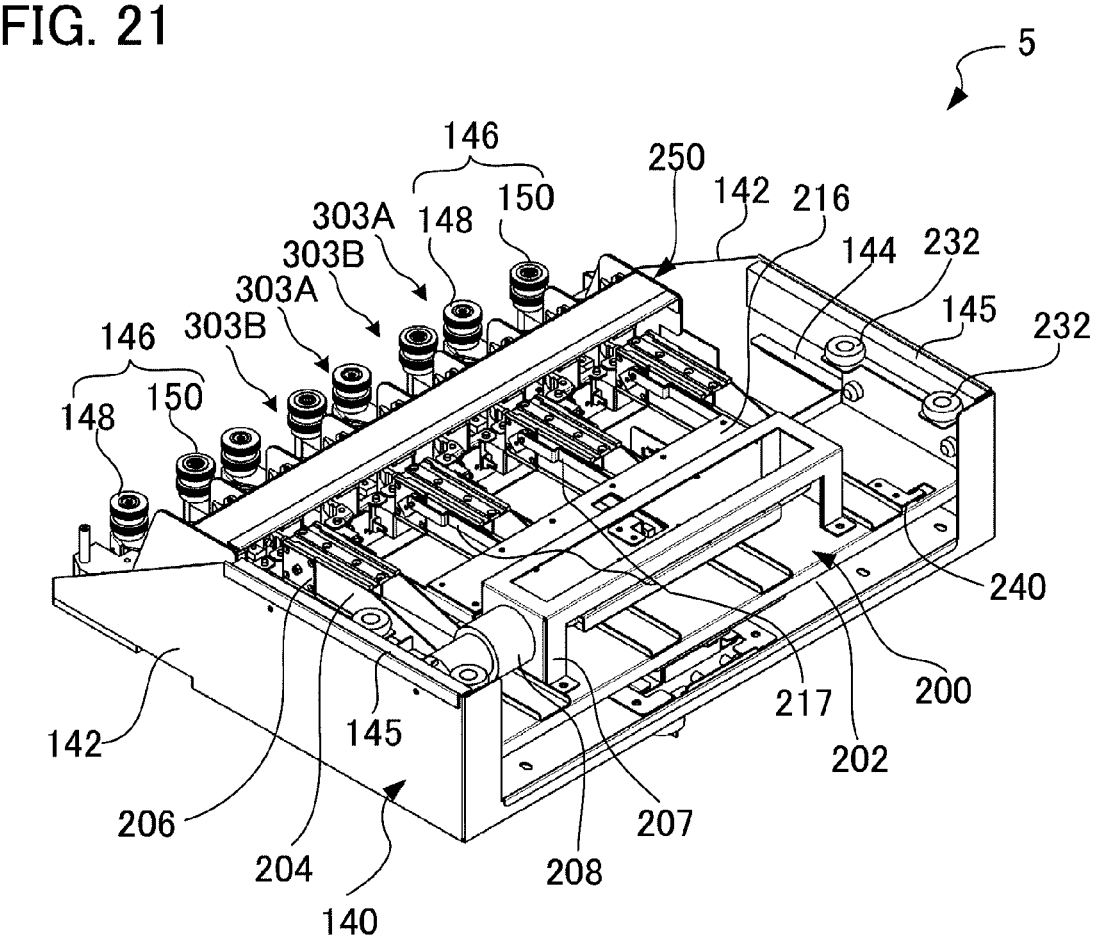
FIG. 21 is a perspective view of the electric charging apparatus when viewed from another direction.
Figure 22:
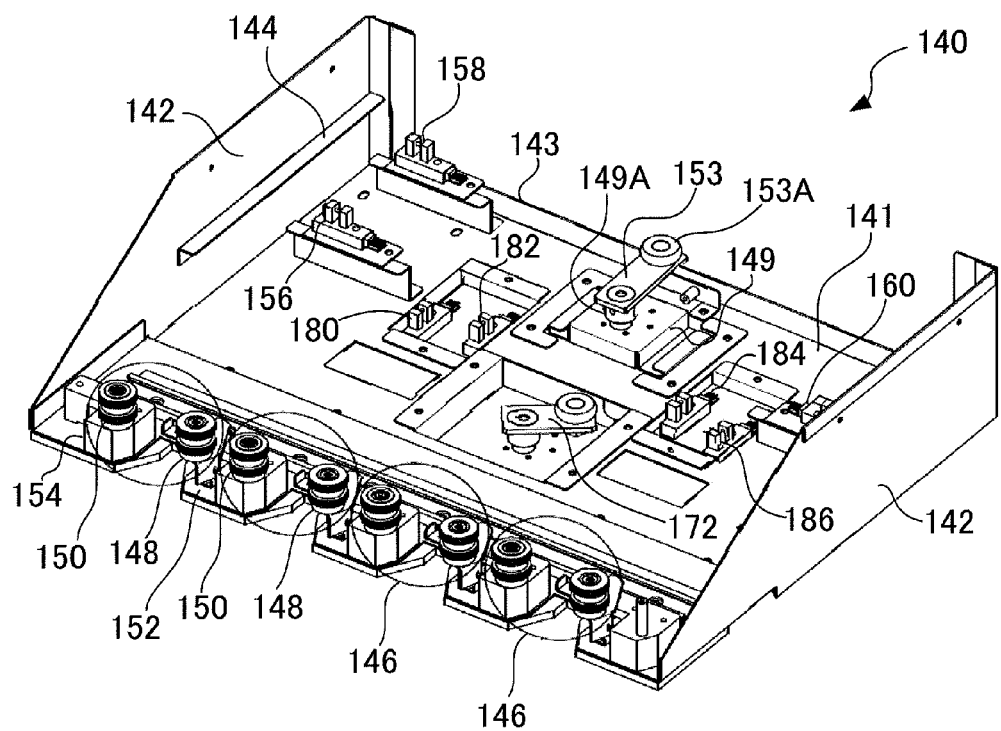
FIG. 22 is a perspective view showing a main base of the electric charging apparatus.

As best shown in FIG. 22, main base 140 has a bottom wall 141, a pair of sidewalls 142 parallel to each other, and a rear wall 143. As shown in FIGS. 19 to 21, a guide rail 144,145 is attached to each of sidewall 142 of main base 140. These guide rails 144 and 145 extend in front and back directions parallel to each other. Electric power source assembly swapping mechanism 200 is supported by main base 140 in a movable manner in front and back directions (forward and rearward directions), and guide rail 144,145 guides the movement to the front and back directions of electric power source assembly swapping mechanism 200.

As shown in FIGS. 23 to 26, electric power source assembly swapping mechanism 200 has a base board 202, four bars 204 fixed to base board 202, and four electric power source assembly adherence units 206 respectively attached to the front edge of these bars 204. Each of the electric power source assembly adherence units 206 is an adherence unit that can adhere to the third adherence unit 80 (FIGS. 4, 5 and 8) provided on electric power source assembly 30 of traveling equipment 10 by magnetic force. Although other options can be also adopted, in the illustrated preferable embodiment, the third adherence unit 80 of electric power source assembly 30 is a ferromagnet, and electric power source assembly adherence unit 206 is a magnet chuck.

Figure 27:
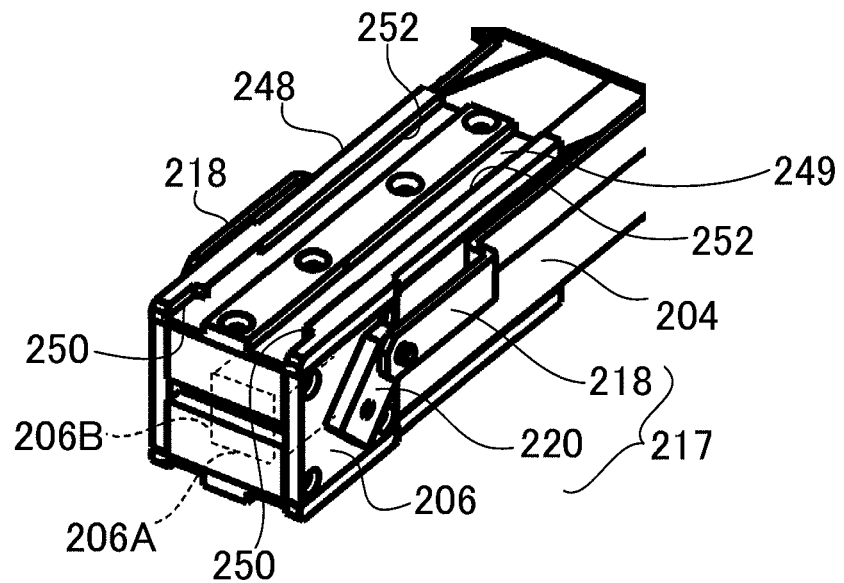
FIG. 27 is a perspective view showing a bar of the electric power source assembly swapping mechanism and an electric power source assembly adherence unit.
Figure 28:
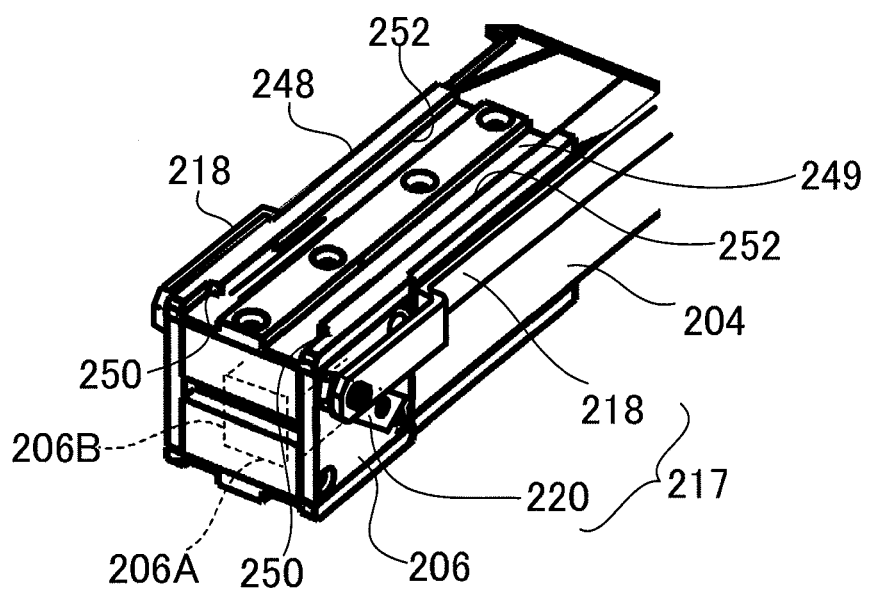
FIG. 28 is another perspective view showing a bar of the electric power source assembly swapping mechanism and the electric power source assembly adherence unit.

As shown in FIGS. 27 and 28, electric power source assembly adherence unit 206 being a magnet chuck has a permanent magnet 206A and a yoke 206B having magnet 206A therein in a rotatable manner. Magnet 206A is rotated by a crank. Each crank extends in parallel with bar 204 and has a crank 217 that moves relative to bar 204. Crank 217 has a first link 218 and a second link 220 coupled with magnet 206A and for rotating magnet 206A with movement of first link 218.

In a state in which crank 217 is in a back position as shown in FIG. 27, magnetic force of magnet 206A does not act on the outside. In a state in which crank 217 is in a front position as shown in FIG. 28, magnet 206A rotates 90 degrees from the state of FIG. 27, and the magnetic force of magnet 206A acts on the outside. According to this configuration, the magnetic force of the magnet chuck can be controlled by rotating magnet 206A by crank 217. Therefore, the adherence to electric power source assembly 30 with the magnet chuck can be mechanically enabled or disenabled.

In FIGS. 27 and 28, two cranks 217 are provided on both sides of a single bar 204. However, only a single crank 217 may be provided on a single bar 204. In the illustrated embodiments, a single crank 217 is provided on the most left bar 204 and on the most right bar 204 as best shown in FIG. 24, and two cranks 217 are provided on two bars 204 at center.

Figure 23:
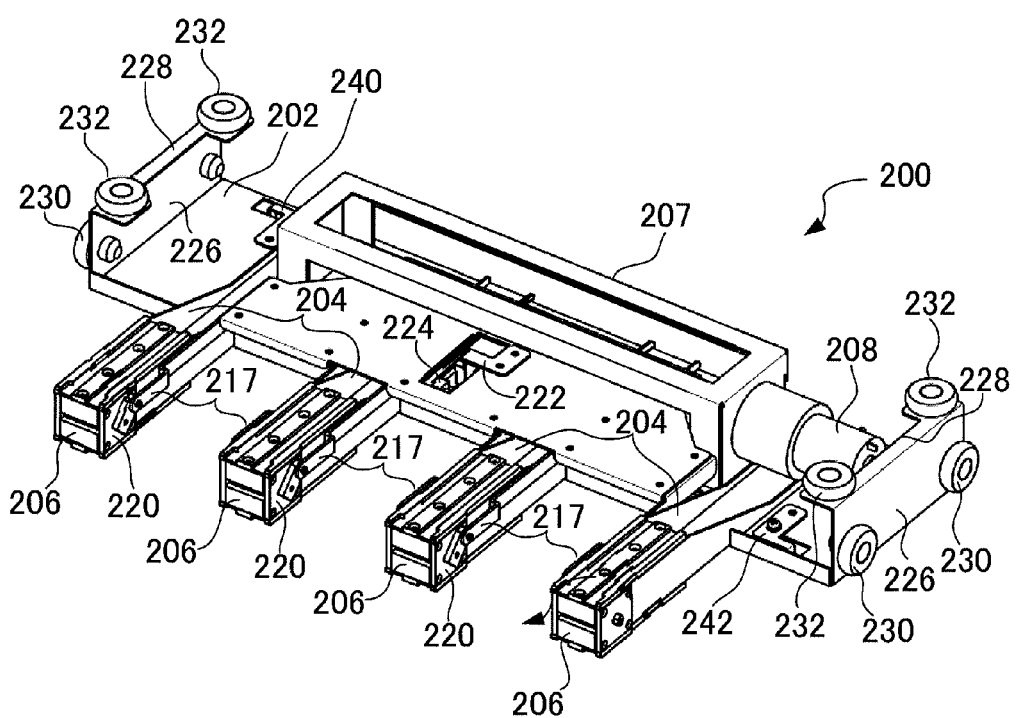
FIG. 23 is a perspective view showing an electric power source assembly swapping mechanism of the electric charging apparatus.
Figure 24:
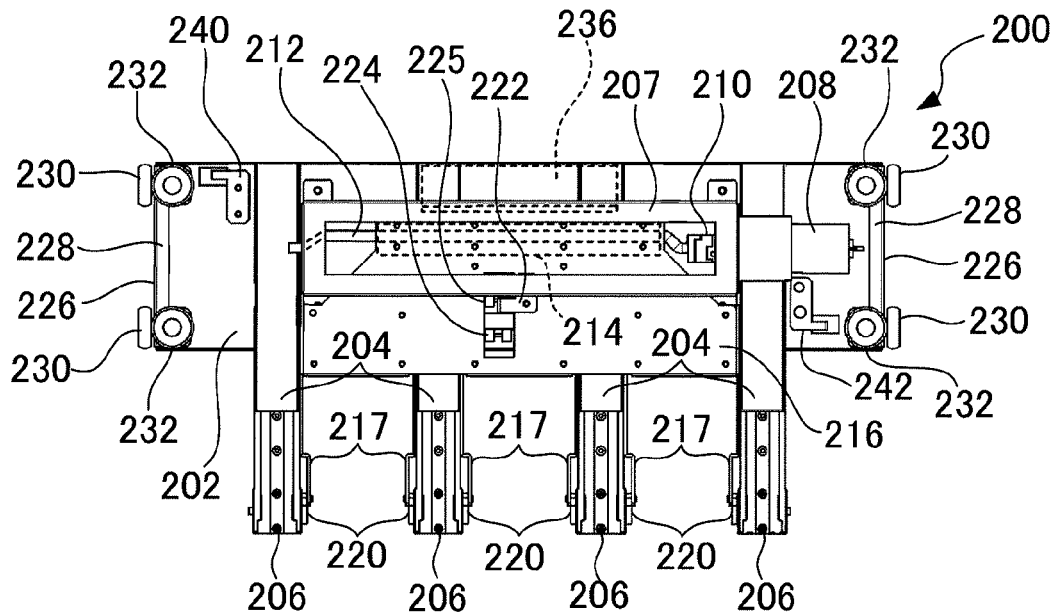
FIG. 24 is a plane view showing the electric power source assembly swapping mechanism.
Figure 25:
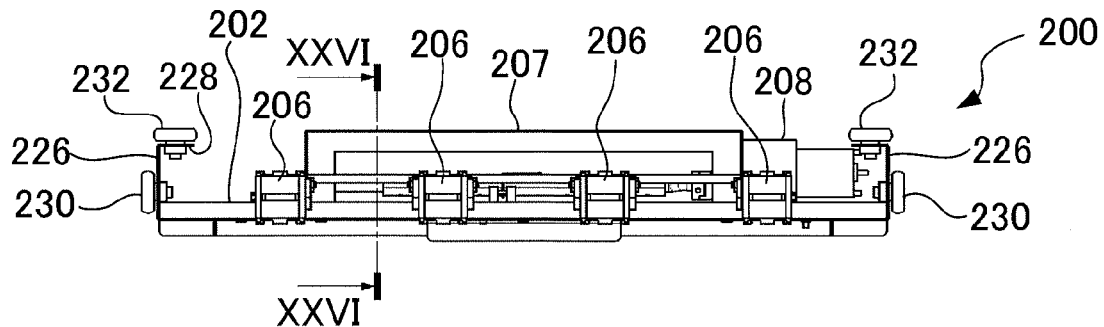
FIG. 25 is a front view showing the electric power source assembly swapping mechanism.
Figure 26:
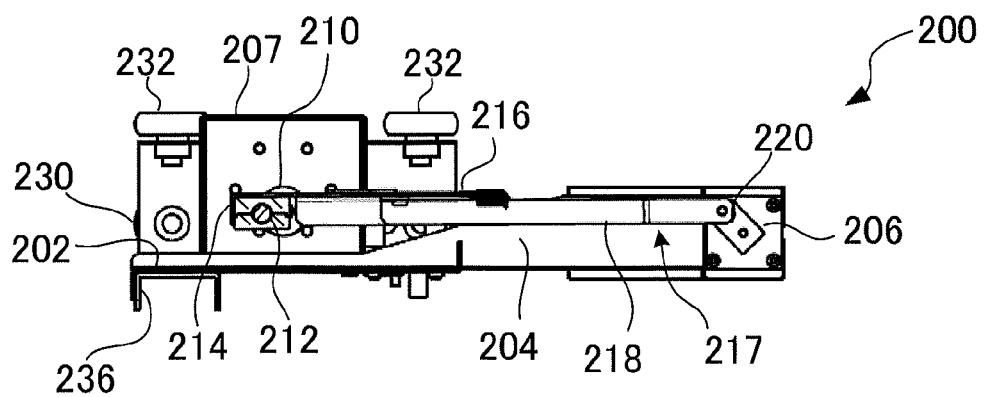
FIG. 26 is a cross section viewed along an XXVI-XXVI line of FIG. 25.

As shown in FIGS. 23 to 26, a motor base 207 is fixed to base board 202 of electric power source assembly swapping mechanism 200, and attached to motor base 207 is a crank motor 208 for driving crank 217 and for enabling and disabling magnetic force of electric power source assembly adherence unit 206. A coupling 210 shown in FIG. 24 is attached to a rotation axis of crank motor 208, and a crankshaft 212 is attached to coupling 210. Crankshaft 212 is coupled with a crank connector bracket 216 through a bearing 214. The base end of each first link 218 of crank 217 is coupled with crank connector bracket 216. Therefore, when the rotation axis of crank motor 208 rotates, crankshaft 212 rotates, and first link 218 moves together with crank connector bracket 216 back and forth relative to base board 202, whereby magnetic force acting on the outside from electric power source assembly adherence unit 206 is enabled and disenabled.

As shown in FIG. 24, a detected piece 222 is fixed to crank connector bracket 216 of electric power source assembly swapping mechanism 200, the detected piece being used for determining whether magnetic force of electric power source assembly adherence unit 206 is enabled or disenabled. On the other hand, a sensor 224,225 capable of detecting detected piece 222 is attached to base board 202 of electric power source assembly swapping mechanism 200. Each sensor 224, 225 is, for example, a photointerrupter.

When detected piece 222 moves forward together with crank 217 and crank connector bracket 216, detected piece 222 arrives at sensor 224 and is detected. Detecting detected piece 222 with sensor 224 is referred to as sensor 224 being turned on. The on signal of sensor 224 indicates that magnetic force of electric power source assembly adherence unit 206 is effective. In other words, sensor 224 is a magnetic force enabled detection sensor for electric power source assembly adherence units.

When detected piece 222 moves backward together with crank 217 and crank connector bracket 216, detected piece 222 arrives at sensor 225 and is detected. Detecting detected piece 222 with sensor 225 is referred to as sensor 225 being turned on. The on signal of sensor 225 shows that magnetic force of electric power source assembly adherence unit 206 is disenabled. In other words, sensor 225 is a magnetic force disenabled detection sensor 225 for electric power source assembly adherence units.

The signals from various sensors including sensor 224,225 in electric charging apparatus 5 are transmitted to overall control device 100, for use therein to control electric charging apparatus 5.

As shown in FIGS. 19 to 21, the entire electric power source assembly swapping mechanism 200 is supported in a movable manner in back and forth relative to main base 140. As shown in FIG. 23, side plates 226 are attached to the both ends of base board 202, and attached on the top of each side plate 226 is a top board 228. Rollers 230 are attached in a rotatable manner to each of side plates 226, and rollers 232 are attached in a rotatable manner to each of top boards 228. As shown in FIGS. 19 and 20, roller 230 is placed between guide rails 144 and 145 of main base 140, and rolls over guide rail 144. Roller 232 rolls in contact with guide rail 145.

Figure 18:
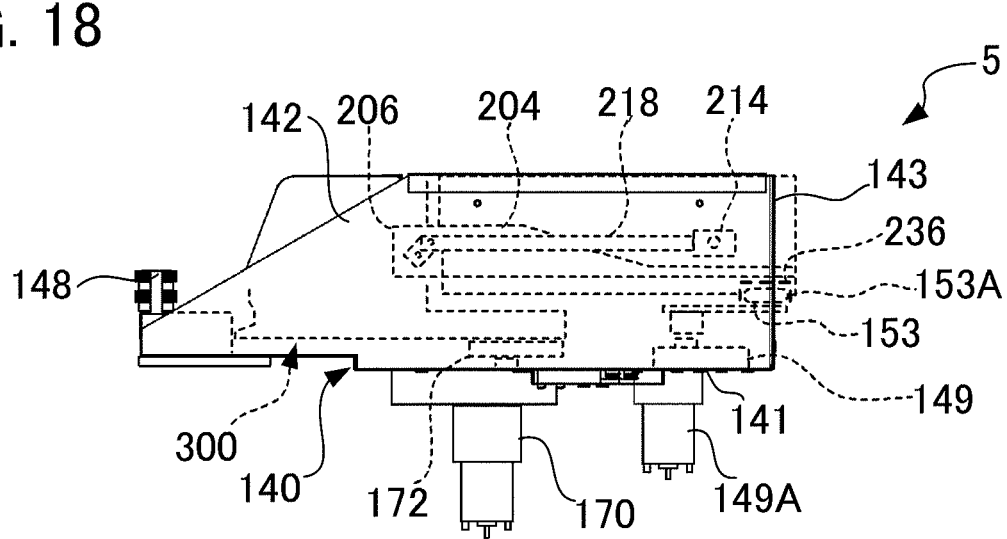
FIG. 18 is a right side view showing the electric charging apparatus.

As shown in FIGS. 18 and 22, a motor base 149 is fixed in a bottom wall 141 of main base 140, and attached to motor base 149 is a swapping mechanism motor 149A for moving back-and-forth electric power source assembly swapping mechanism 200. The base end of a rotor 153 is attached to a rotation axis of swapping mechanism motor 149A, and a roller 153A is attached on the tip of rotor 153. A box-shaped bracket 236 is fixed to the bottom surface of base board 202 of electric power source assembly swapping mechanism 200, and roller 153A is placed inside bracket 236. Therefore, when the rotation axis of swapping mechanism motor 149A rotates, rotor 153 rotates, and the whole electric power source assembly swapping mechanism 200 moves, relative to main base 140, back-and-forth together with bracket 236.

As shown in FIGS. 23 and 24, detected pieces 240 and 242 used for determining the position in the front-and-back direction of electric power source assembly swapping mechanism 200 are fixed to base board 202 of electric power source assembly swapping mechanism 200. On the other hand, as shown in FIG. 22, attached to bottom wall 141 of main base 140 are sensors 156,158 which can detect detected piece 240 and a sensor 160 which can detect detected piece 242. Each sensor 156,158,160 is, for example, a photo interrupter.

When base board 202 of electric power source assembly swapping mechanism 200 advances to the front limit position, detected piece 240 arrives at sensor 156 and is detected. Detecting detected piece 240 by sensor 156 is referred to as sensor 156 being turned on. The on signal of sensor 156 shows that base board 202 is at the front limit position. In other words, sensor 156 is a front limit position detection sensor for the electric power source assembly swapping mechanism.

When base board 202 of electric power source assembly swapping mechanism 200 is retracted at the backward limit position, detected piece 242 arrives at sensor 160 and is detected. Detecting detected piece 242 by sensor 160 is referred to as sensor 160 being turned on. The on signal of sensor 160 indicates that base board 202 is at the backward limit position. In other words, sensor 160 is a backward limit position detection sensor for the electric power source assembly swapping mechanism.

When base board 202 of electric power source assembly swapping mechanism 200 is at a predetermined position between the front limit position and the backward limit position, detected piece 240 is detected by sensor 158. Detecting detected piece 240 by sensor 158 is referred to as sensor 158 being turned on. The on signal of sensor 158 as of when sensor 158 passes detected piece 240 on the way that base board 202 moves backward at the backward limit position from the front limit position indicates that electric power source assembly 30 adhered to by electric power source assembly adherence unit 206 is retained in a port (described later) for electric charge. As described later, the on signal of sensor 158 of this time is used as a trigger for disenabling magnetic force of electric power source assembly adherence unit 206. In other words, sensor 158 is an electric power source assembly chargeable position detection sensor.

Figure 29:
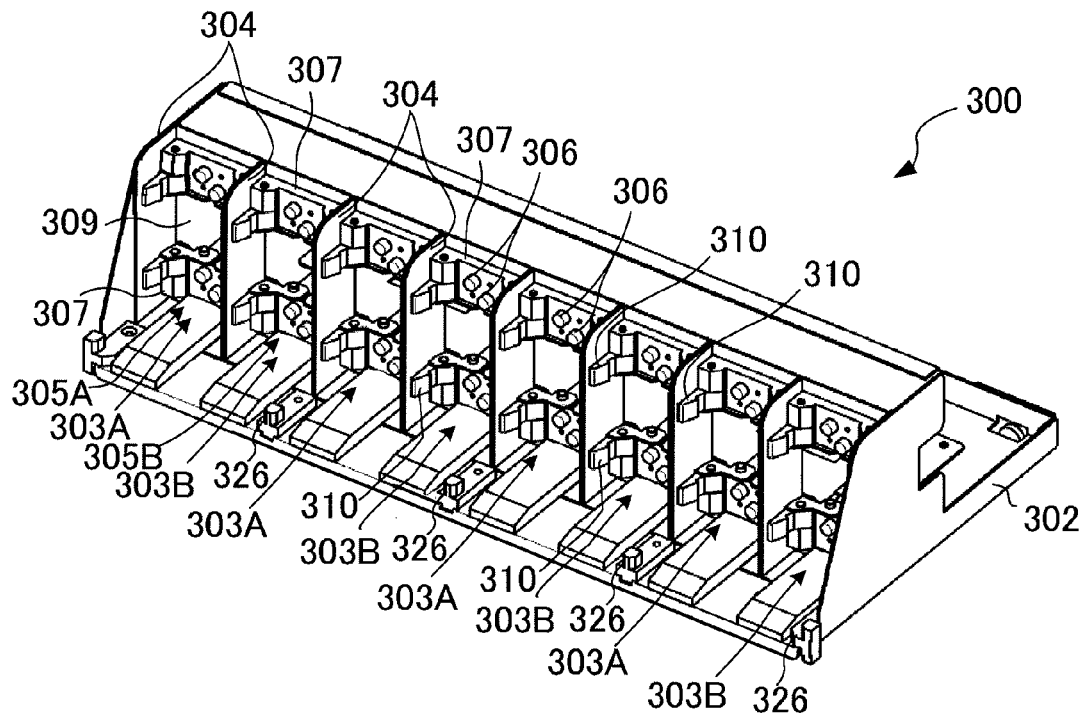
FIG. 29 is a perspective view showing an electric power source assembly holder of the electric charging apparatus.

As shown in FIG. 29, electric power source assembly holder 300 has a base frame 302 and nine walls 304 supported by base frame 302. In ports 303A and 303B that are spaces between these walls 304, eight power supply assemblies 30 can be retained. As described later, eight electric chargers for charging electric power source assembly 30 are placed in each port 303A,303B.

Eight ports 303A,303B are categorized into four first ports 303A and four second ports 303B. First ports 303A and second ports 303B are placed in alternate positions transversely. Each of ports 303A and 303B can retain electric power source assembly 30, but as shown in FIG. 20, electric power source assemblies 30 retained and charged in first ports 303A are separated from first port s 303A and attached to pieces of traveling equipment 10 when electric power source assemblies 30 are retained respectively in second ports 303B and these power supply assemblies 30 are charged. On the other hand, electric power source assemblies 30 retained and charged in second ports 303B are separated from second ports 303B and attached to pieces of traveling equipment 10 when electric power source assemblies 30 are retained respectively in first ports 303A and these power supply assemblies 30 are charged.

Charge electrode 306,308 for charging power supply device 60 (refer to FIGS. 5 and 11) in electric power source assembly 30 is located in each port 303A,303B. Charge electrode 306 is designed to contact charged electrode 62 of electric power source assembly 30, and charge electrode 308 to contact charged electrode 64 of electric power source assembly 30. For example, charge electrode 306 is an anode, and charge electrode 308 is a cathode. However, charge electrode 306 may be a cathode, and charge electrode 308 may be an anode. Each port is provided with two upper charge electrodes 306 and two lower charge electrodes 308. Therefore, even if one of charge electrodes 306 and one of charge electrodes 308 break down, the power supply device can be charged by the other charge electrode. However, each port may be provided with a single upper charge electrode 306 and a single lower charge electrode 308.

Upper charge electrodes 306 and lower charge electrodes 308 of each port are provided on a single electric charger charging a single electric power source assembly 30. An electric charger corresponding to first port 303A is called a first electric charger 305A, and an electric charger corresponding to second port 303B is called a second electric charger 305B. Four first electric chargers 305A charge electric power source assemblies 30 when these electric power source assemblies 30 are retained in first ports 303A. Four second electric chargers 305B charge electric power source assemblies 30 when these electric power source assemblies 30 are retained in second ports 303B.

Figure 30:
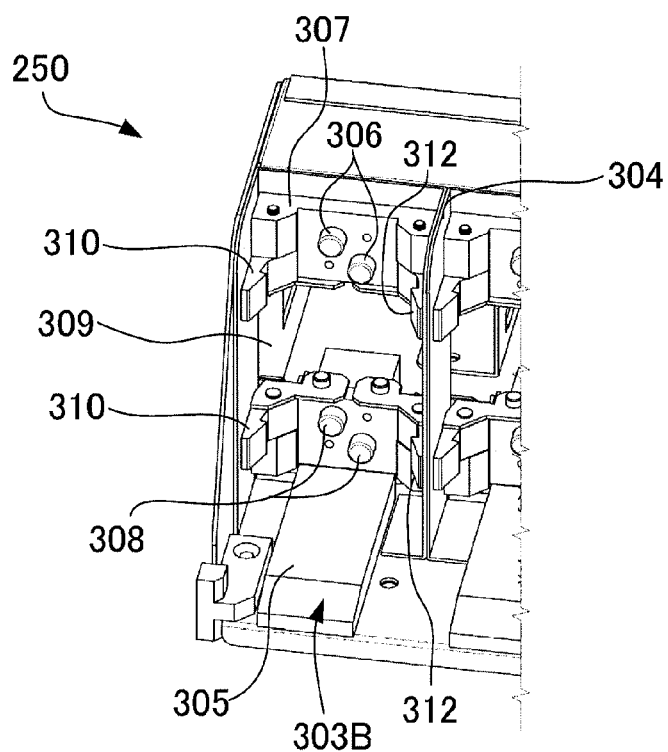
FIG. 30 is a perspective view in which the electric power source assembly holder is enlarged.

As best shown in FIG. 30, upper charge electrodes 306 in each port are attached to an upper electrode supporting member 307, and lower charge electrodes 308 in each port are attached to an lower electrode supporting member 307. Provided on each electrode supporting member 307 are right and left electric power source assembly lock levers 310 and 312 for locking electric power source assembly 30 in port 303A or 303B. A cavity is provided between upper electric power source assembly lock levers 310 and 312 and lower electric power source assembly lock levers 310 and 312. This cavity is a window 309 through which electric power source assembly adherence unit 206 enters when electric power source assembly swapping mechanism 200 advances as described above.

Description will be given of the details of electric power source assembly lock levers 310 and 312 with reference to FIGS. 31 and 32. Electric power source assembly lock levers 310 and 312 are almost L-shaped and can rotate around rotation axes 318 and 320, respectively. A pawl 310A is formed in the front edge of an arm extending to the front of electric power source assembly lock lever 310, and a projection 314 is fixed to the other arm extending transversely. Pawl 312A is formed in the front edge of one arm of electric power source assembly lock lever 312, and a projection 316 is fixed to the other arm. These electric power source assembly lock levers 310 and 312 are arranged in the linear symmetry.

A spring 311 is arranged between an arm extending to the front of electric power source assembly lock lever 310,312 and wall 304 adjacent thereto. Spring 311 imparts electric power source assembly lock lever 310,312 a force for pressing pawl 310A,312A closer. Accordingly, pawls 310A and 312A are hooked on cover panel 58 of electric power source assembly 30 as shown in FIG. 31, whereby electric power source assembly 30 is locked to electric power source assembly lock levers 310 and 312 and are immovably retained in port 303A or 303B. In a state shown in FIG. 31, charge electrode 306 touches charged electrode 62 of electric power source assembly 30, and charge electrode 308 touches charged electrode 64 of electric power source assembly 30, and the electric charger charges power supply device 60 in electric power source assembly 30.

On the other hand, a long board 248 is fixed to bar 204 of electric power source assembly swapping mechanism 200 and to electric power source assembly adherence unit 206. A groove 249 extending in the longitudinal direction of long board 248 is formed in the center thereof. This groove 249 has a wide width delimited by both ends 250 in the front end part, and has a narrow width delimited by both ends 252 in the back part.

Figure 31:
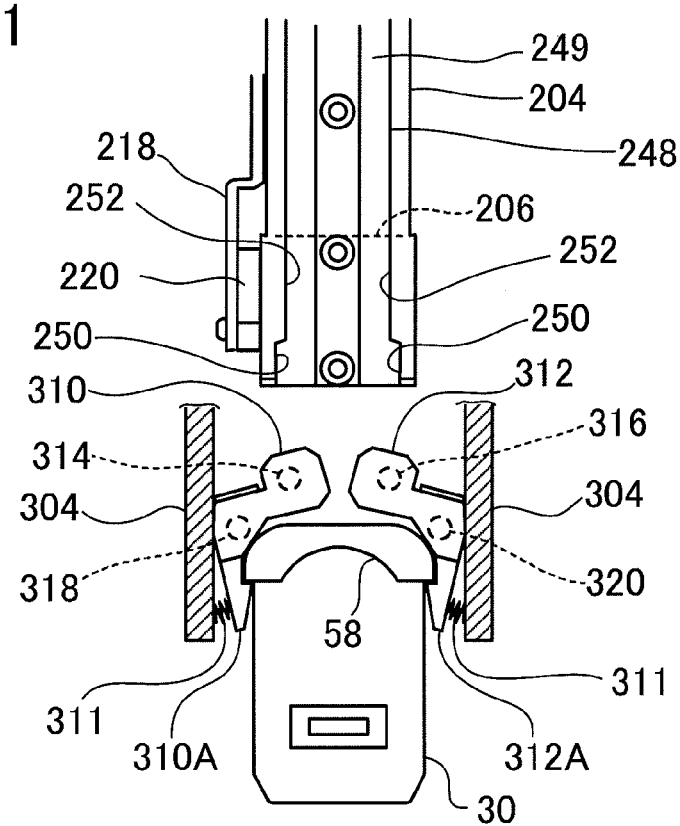
FIG. 31 is a plane view showing the electric power source assembly holder holding the electric power source assembly.

When bar 204 advances together with electric power source assembly adherence unit 206 from a state shown in FIG. 31, projections 314 and 316 are first accepted by the front end of groove 249 having a wide width (delimited by both ends 250). Then, as shown in FIG. 32, projections 314 and 316 are accepted by the back part of groove 249 having a narrow width (delimited by both ends 252), whereby electric power source assembly lock levers 310 and 312 rotate, against the force of spring 311, so that pawls 310A and 312A are spaced apart. In other words, the lock of electric power source assembly lock levers 310 and 312 is released, and as a result, electric power source assembly 30 can move apart from port 303A or 303B. In removing electric power source assembly 30 from electric power source assembly lock levers 310 and 312 in this way, the magnetic force of electric power source assembly adherence unit 206 is enabled so that electric power source assembly 30 does not fall off electric charging apparatus 5.

Figure 32:
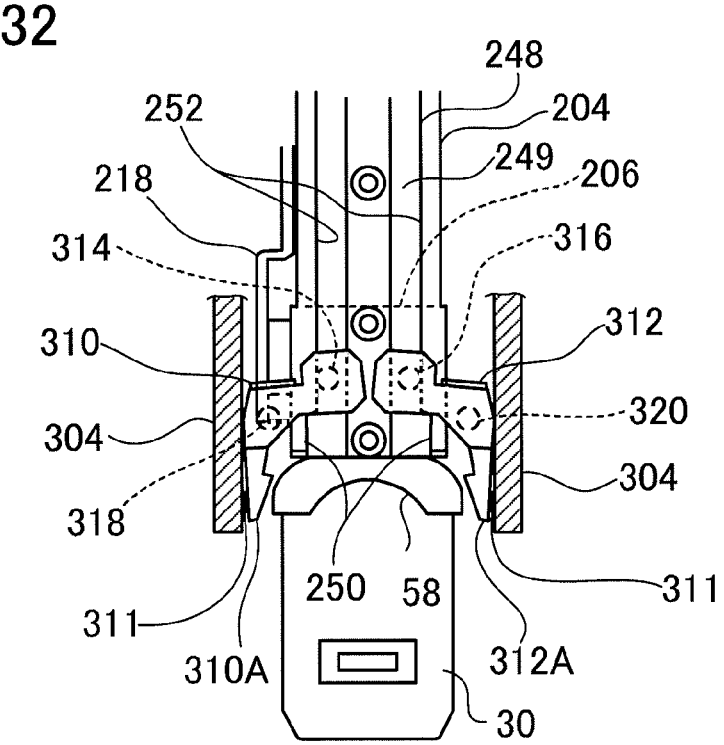
FIG. 32 is a plane view showing the electric power source assembly holder having released the electric power source assembly.

FIGS. 31 and 32 show upper electric power source assembly lock levers 310 and 312 and long board 248 for causing the levers into action. Although not shown in detail, a long board similar to long board 248 is fixed to bar 204 and to the bottom surface of electric power source assembly adherence unit 206, and this long board causes lower electric power source assembly lock levers 310 and 312 into action.

When electric power source assembly 30 enters port 303A, 303B, cover panel 58 of electric power source assembly 30 pushes pawls 310A,312A of electric power source assembly lock levers 310 and 312, to broaden the distance therebetween. As a result, pawls 310A and 312A are hooked on cover panel 58 of electric power source assembly 30 as shown in FIG. 31, and electric power source assembly 30 is thereby locked to electric power source assembly lock levers 310,312.

Electric power source assembly holder 300 is supported in a transversely movable manner in relation to main base 140. By the transverse movement of electric power source assembly holder 300 for which first port 303A and second port 303B are arranged next to each other, each bar 204 of electric power source assembly swapping mechanism 200 can have corresponding electric power source assembly adherence unit 206 to enter one of first ports 303A and one of second ports 303B through the above window 309. With this configuration, by moving plural first ports 303A and plural second ports 303B transversely, electric power source assembly adherence unit 206 attached to a bar can pass first port 303A to make first electric power source assembly 30 attached to and detached from traveling equipment 10 in a state in which traveling equipment 10 is stopped in the fixed position, and the same electric power source assembly adherence unit 206 can pass second port 303B to make second electric power source assembly 30 attached to and detached from traveling equipment 10. Thus, each bar and each electric power source assembly adherence unit are used for mounting and dismounting both of first electric power source assembly 30 and second electric power source assembly 30. Therefore, the number of the parts can be reduced in comparison with a case providing a bar and an electric power source assembly adherence unit for the first power supply assemblies, and a bar and an electric power source assembly adherence unit for the second power supply assemblies.

As shown in FIGS. 18 and 22, a holder motor 170 (transversal movement mechanism) is attached to a bottom wall 141 of main base 140, and a rotor 172 is attached to an axis of holder motor 170. Although not shown, base frame 302 of electric power source assembly holder 300 (charge mechanism) has a part that engages with rotor 172. When an axis of holder motor 170 rotates, rotor 172 rotates, and the whole electric power source assembly holder 300 moves transversely relative to main base 140.

As shown in FIG. 22, main base 140 includes four roller sets 146 (traveling equipment locking mechanism) to lock traveling equipment 10. Each roller set 146 has a movable roller 148 (first roller) supported by a lever 152 in a rotatable manner and a fixation roller 150 (second roller) supported by a fixed roller stage 154 in a rotatable manner.

Figure 33:
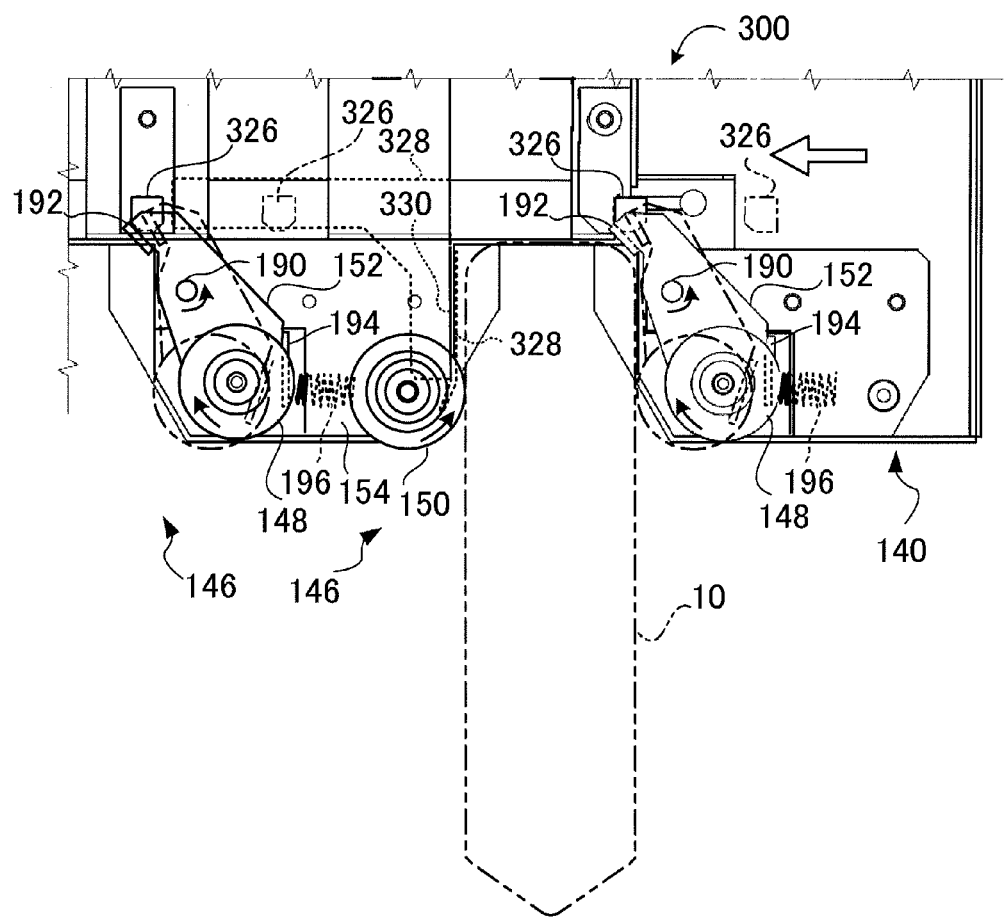
FIG. 33 is a plane view showing the traveling equipment locking mechanism of the electric charging apparatus that locks the traveling equipment.
Figure 34:
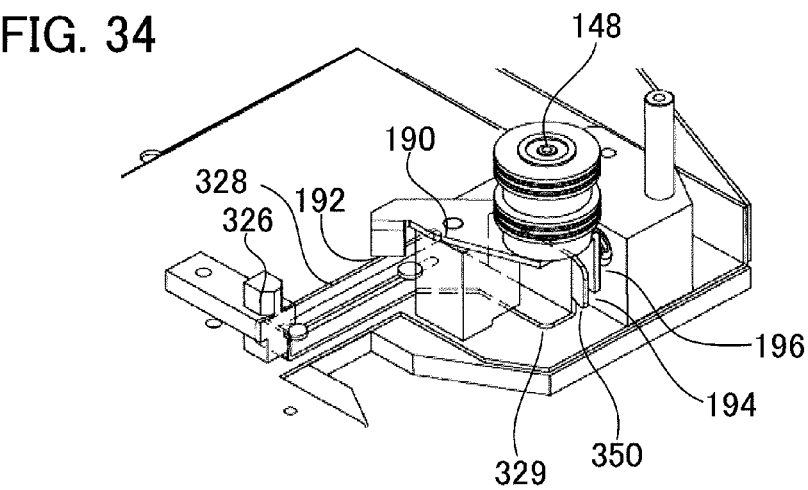
FIG. 34 is a perspective view showing a portion of the traveling equipment locking mechanism.
Figure 35:
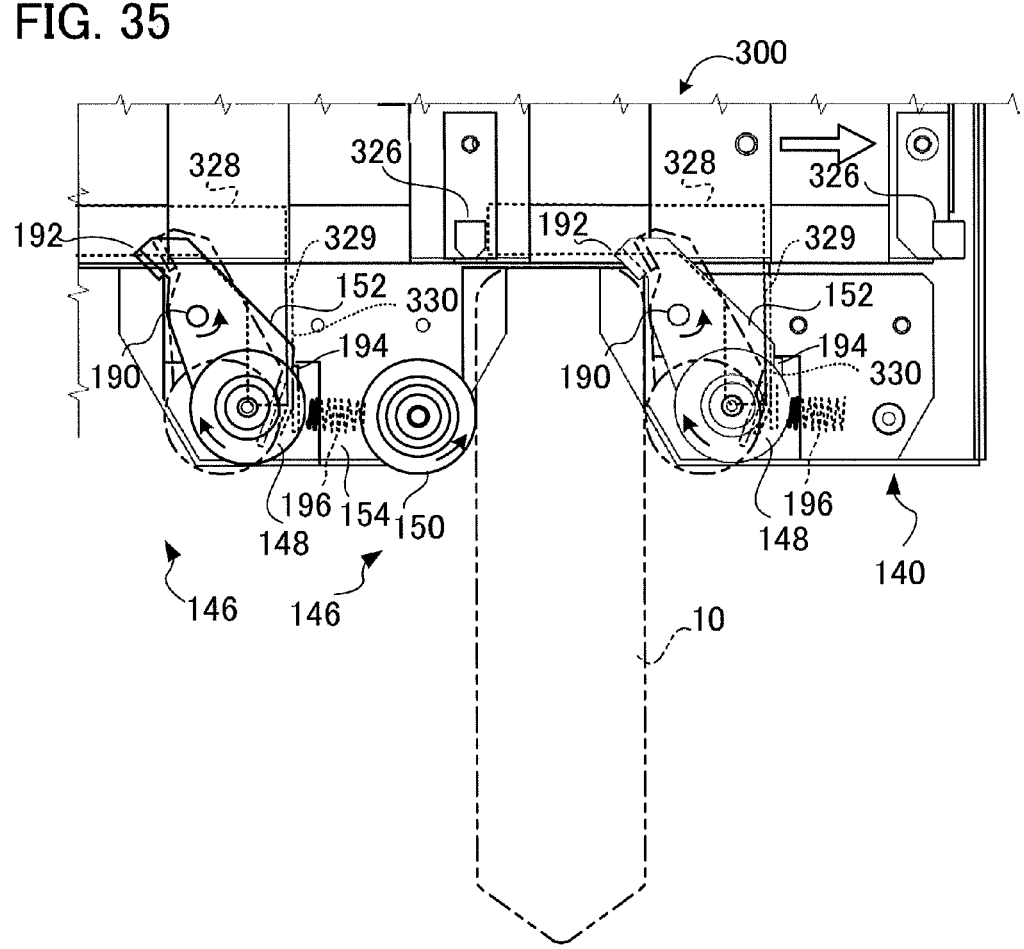
FIG. 35 is a plane view showing the traveling equipment locking mechanism that locks the traveling equipment at a time differing from FIG. 33.

With reference to FIGS. 33 to 35, description will be given of the details of roller set 146. As shown in FIGS. 33 and 34, lever 152 that supports movable roller 148 is rotatable around a central axis 190 as the center. Attached to one end of lever 152 is a movable roller 148 mounted in a rotatable manner, and formed on the other end is a first bent-up piece 192. In addition, in the proximity of movable roller 148, a second bent-up piece 194 is formed in one end of lever 152, with second bent-up piece 194 being pushed with a spring 196, and lever 152 is always imparted a force in the clockwise direction of the figure.

On the other hand, a projection 326 is fixed to electric power source assembly holder 300. In FIG. 33, the solid line indicates a state in which electric power source assembly holder 300 is at the left limit position relative to main base 140. Lever 152, movable roller 148, and projection 326 shown in a virtual line show the angle position of lever 152, and the positions of movable roller 148 and projection 326 when electric power source assembly holder 300 is to the right of the left limit position and is to the left of the right limit position.

Because the force of spring 196 is imparted to lever 152, movable roller 148 is at the left side position, such as shown by a virtual line, when electric power source assembly holder 300 is to the right of the left limit position and is to the left of the right side limit position. Therefore, in one roller set 146, the distance between movable roller 148 and fixed roller 150 is narrowed, and traveling equipment 10 can be sandwiched therebetween. Thus, each roller set 146 has rollers 148 and 150 pinching plural pieces of traveling equipment 10.

Preferably, movable roller 148 rotates only in the clockwise direction of FIG. 33, and fixed roller 150 rotates only in the counterclockwise direction of FIG. 33. Therefore, rollers 148 and 150 are designed to rotate when traveling equipment 10 moves to a direction toward electric power source assembly holder 300 (direction in which a bar moves backward), and not to rotate when traveling equipment 10 moves to the direction (direction in which the bar moves forward) increasing distance from electric power source assembly holder 300. Such a one-way rotation is accomplished by providing, for example, a one-way bearing or a one-way clutch for roller 148,150. Because roller 148,150 is allowed to rotate only in a single direction, traveling equipment 10 does not advance accidentally even if electric power source assembly adherence unit 206 advances to remove electric power source assembly 30 from traveling equipment 10 and approaches electric power source assembly 30 to push electric power source assembly 30.

When electric power source assembly holder 300 moves to the left limit position (the state shown in the solid line of FIG. 33) from the right position (projection 326 is shown in FIG. 33 in a virtual line) relative to main base 140, projection 326 pushes first bent-up piece 192 to the left to cause lever 152 to rotate in the counterclockwise direction. As a result, movable roller 148 moves to the right side position as shown by a solid line. Therefore, in one roller set 146, the distance between movable roller 148 and fixed roller 150 broadens, and traveling equipment 10 can be freed between them.

In addition, as shown in FIGS. 33 to 35, one side of an L-shape board 328 is fixed to electric power source assembly holder 300. A projection 330 is formed on an arm 329 that is another side of board 328.

In FIG. 35, the solid line shows a state in which electric power source assembly holder 300 is at the right limit position relative to main base 140. Lever 152 and movable roller 148 shown in virtual lines show the angle position of lever 152 and the position of movable roller 148 when electric power source assembly holder 300 is to the left of the right limit position and to the right of the left limit position.

Because the force of spring 196 is imparted to lever 152, movable roller 148 is at the left side position as shown in a virtual line when electric power source assembly holder 300 is to the left of the right limit position and is to the right of the left limit position. Therefore, in one roller set 146, the distance between movable roller 148 and fixed roller 150 is narrowed, and traveling equipment 10 can be sandwiched therebetween.

When electric power source assembly holder 300 moves from the left position to the right limit position (the state of the solid line of FIG. 35) relative to main base 140, projection 330 of board 328 pushes second bent-up piece 194 to the right to turn lever 152 in the counterclockwise direction. As a result, movable roller 148 moves to the position of the right side as shown by a solid line. Therefore, in one roller set 146, the distance between movable roller 148 and fixed roller 150 broadens, and traveling equipment 10 can be freed therebetween.

Thus, the traveling equipment locking mechanism using roller set 146 locks plural pieces of traveling equipment 10 each when attaching and detaching electric power source assembly 30 to and from traveling equipment 10 and when attaching and detaching other pieces of power supply assemblies 30 to and from plural pieces of traveling equipment 10. According to this configuration, because the traveling equipment locking mechanism locks traveling equipment 10, traveling equipment 10 is stable when attaching and detaching electric power source assembly 30 to and from traveling equipment 10.

In addition, when holder motor 170, which is a transversal movement mechanism, moves plural first ports 303A and plural second ports 303B transversely, the traveling equipment locking mechanism locks and releases plural pieces of traveling equipment 10 in conjunction with ports 303A and 303B. Thus, because the traveling equipment locking mechanism operates in conjunction with port 303A,303B, the traveling equipment locking mechanism requires no exclusive drive source.

As shown in FIG. 22, sensors 180, 182, 184, and 186 for determining the position of the transverse direction of electric power source assembly holder 300 are attached to bottom wall 141 of main base 140. Although not shown, fixed to electric power source assembly holder 300 are plural detected pieces to be detected by sensors 180, 182, 184, and 186. Each of these sensors 180, 182, 184, and 186 is, for example, a photointerrupter.

When electric power source assembly holder 300 arrives at the right limit position (a position of FIG. 35), the detected piece arrives at sensor 180, and is detected. Sensor 180 detecting the detected piece is called sensor 180 being turned on. The on signal of sensor 180 indicates that electric power source assembly holder 300 is at the right limit position and further that the lock of roller set 146 has been released. In other words, sensor 180 is a right limit position detection sensor of the electric power source assembly holder.

When electric power source assembly holder 300 arrives at the left limit position (position of FIG. 33), a detected piece arrives at sensor 186 and is detected. Sensor 186 detecting a detected piece is referred to as sensor 186 being turned on. The on signal of sensor 186 indicates that electric power source assembly holder 300 is at the left limit position and further that the lock of roller set 146 has been released. In other words, sensor 186 is a left limit position detection sensor of the electric power source assembly holder.

Figure 45:
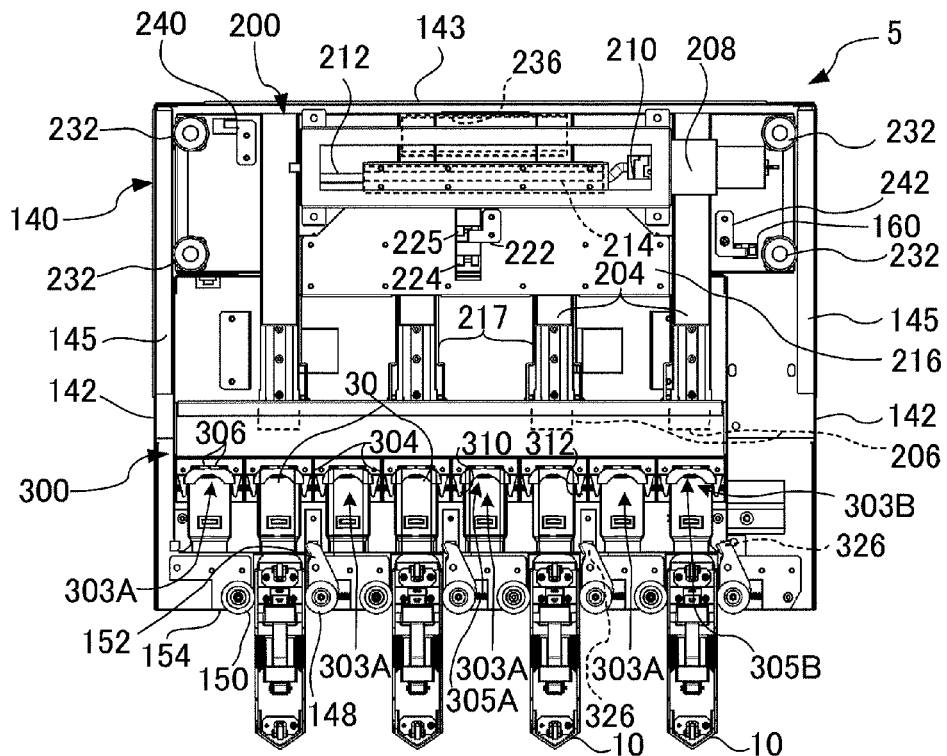
FIG. 45 is a plane view showing the electric charging apparatus of a stage after FIG. 44.
Figure 46:
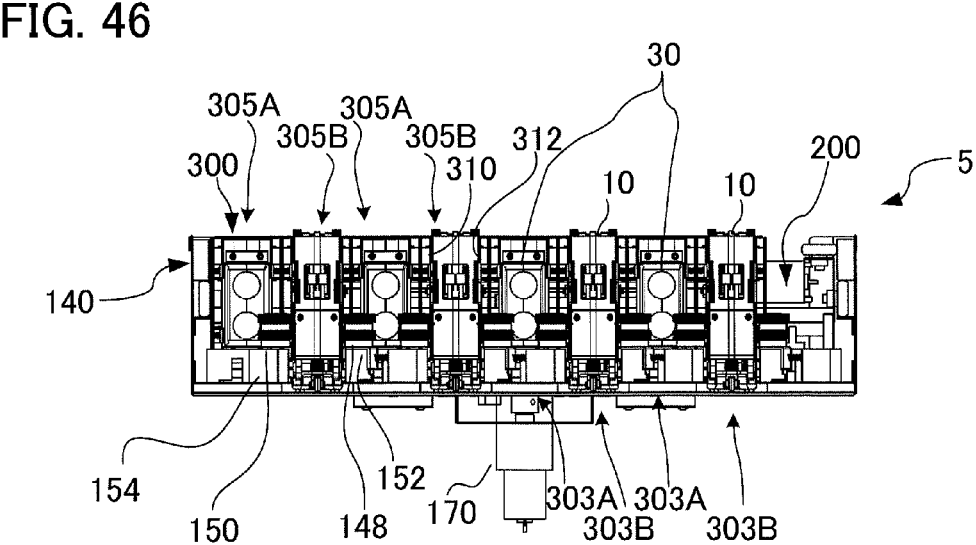
FIG. 46 is a front view showing the electric charging apparatus of the stage of FIG. 45.
Figure 47:
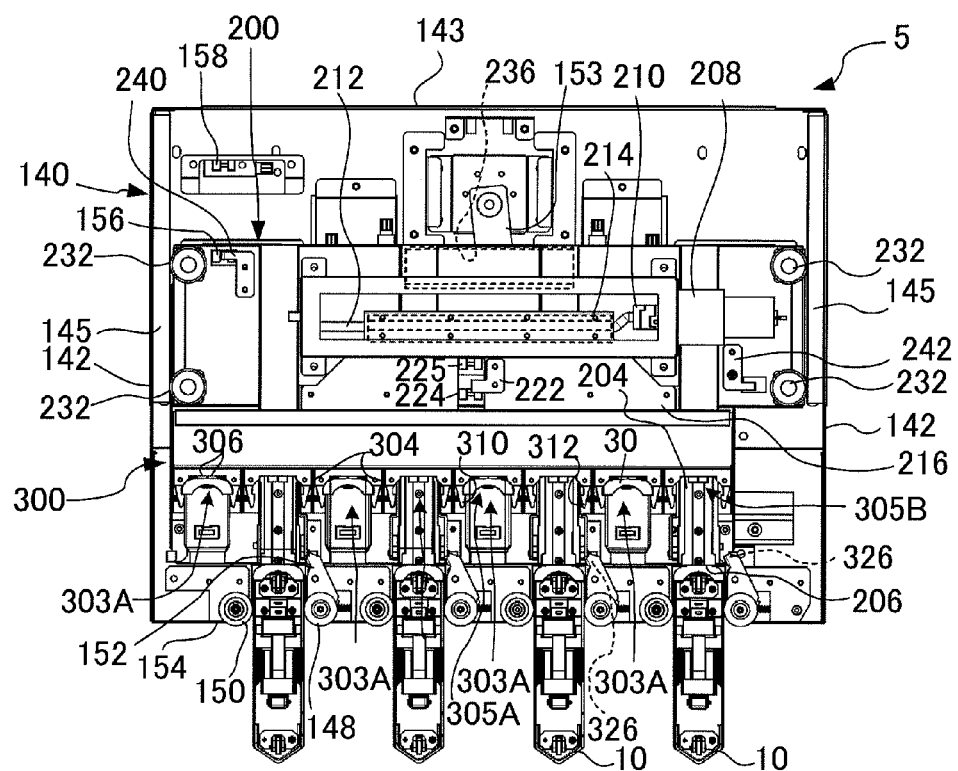
FIG. 47 is a plane view showing the electric charging apparatus of a stage after FIG. 45.

On the other hand, the on signal which sensor 182 outputs by sensor 182 detecting a detected piece shows that electric power source assembly holder 300 is at the position where it is possible to swap electric power source assembly 30 in second port 303B. In other words, as shown in FIGS. 45 to 47, the on signal shows that electric power source assembly adherence unit 206 can access second port 303B through window 309 (FIG. 30). In other words, sensor 182 is a swap detection sensor for detecting whether swapping is possible at the second port.

The on signal which sensor 184 outputs by sensor 184 detecting a detected piece shows that electric power source assembly holder 300 is at the position where it is possible to swap electric power source assembly 30 at first port 303A. In other words, the on signal shows that electric power source assembly adherence unit 206 can access first port 303A through window 309 (FIG. 30) as shown in FIGS. 16, 17, 19 and 20. In other words, sensor 184 is a swap detection sensor for detecting whether swapping is possible at the first port.

Operation of Game Apparatus

Figure 36:
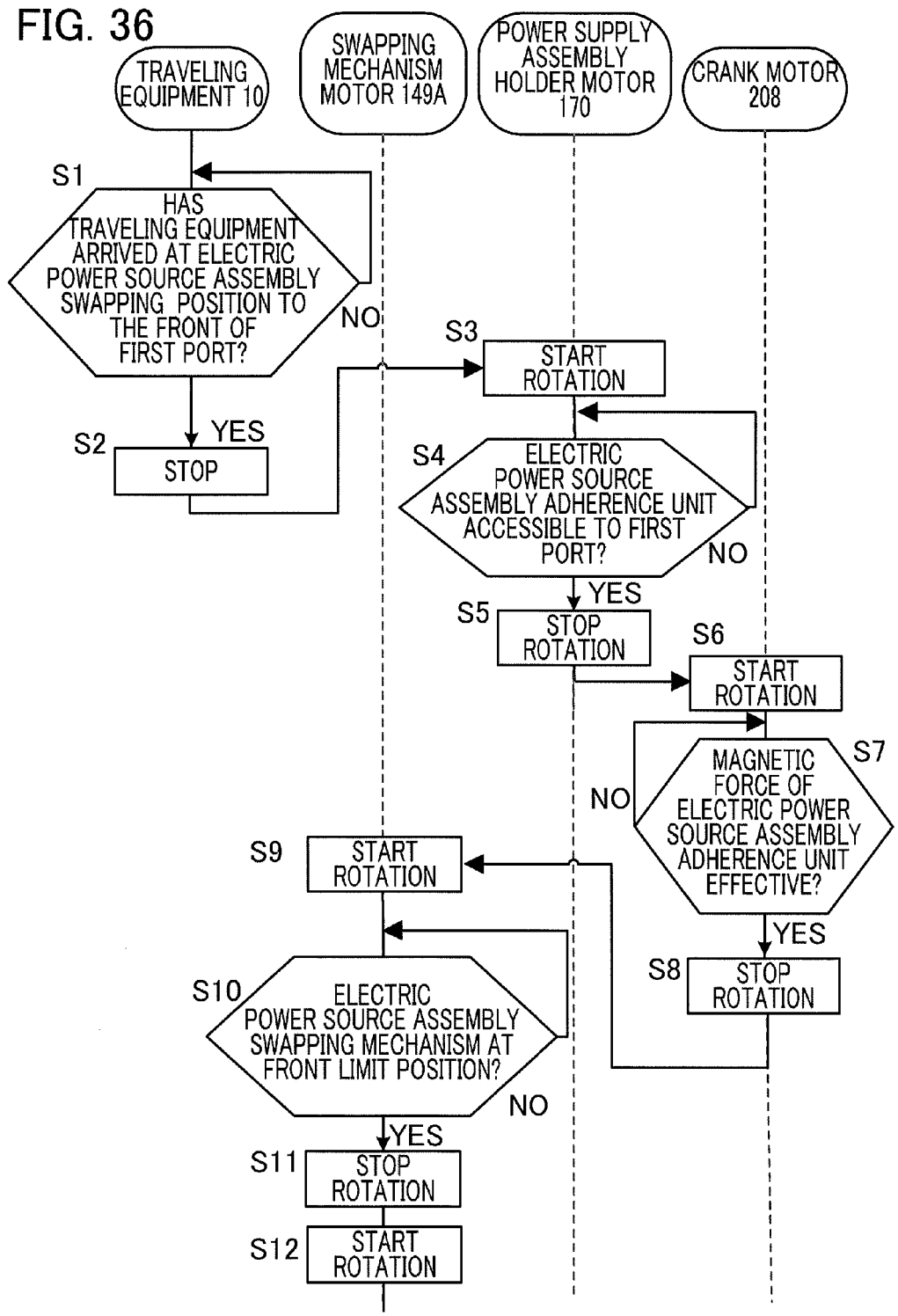
FIG. 36 is a part of a sequence figure showing the operation of the game apparatus.
Figure 37:
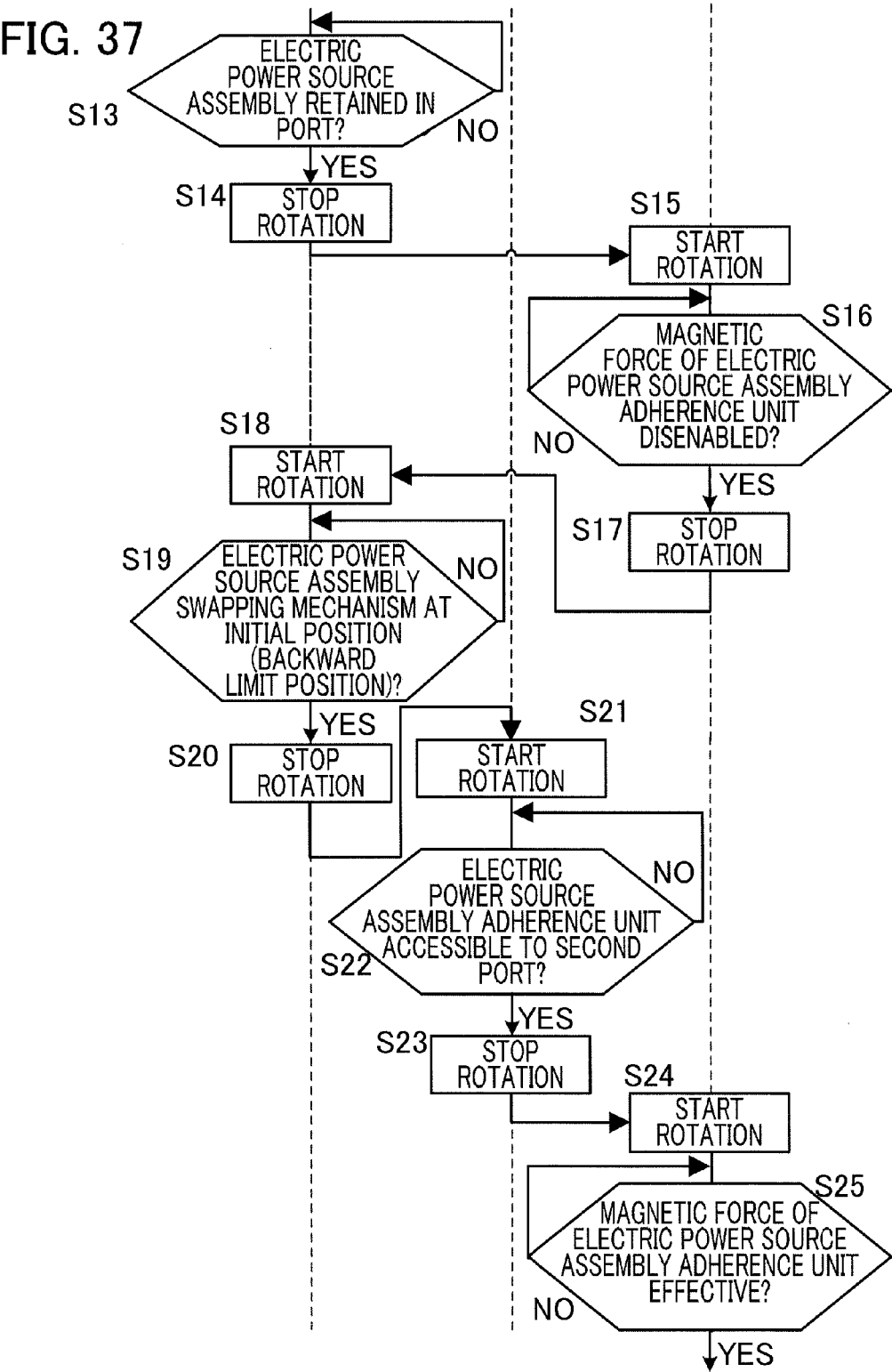
FIG. 37 is a continuation of FIG. 36.
Figure 38:
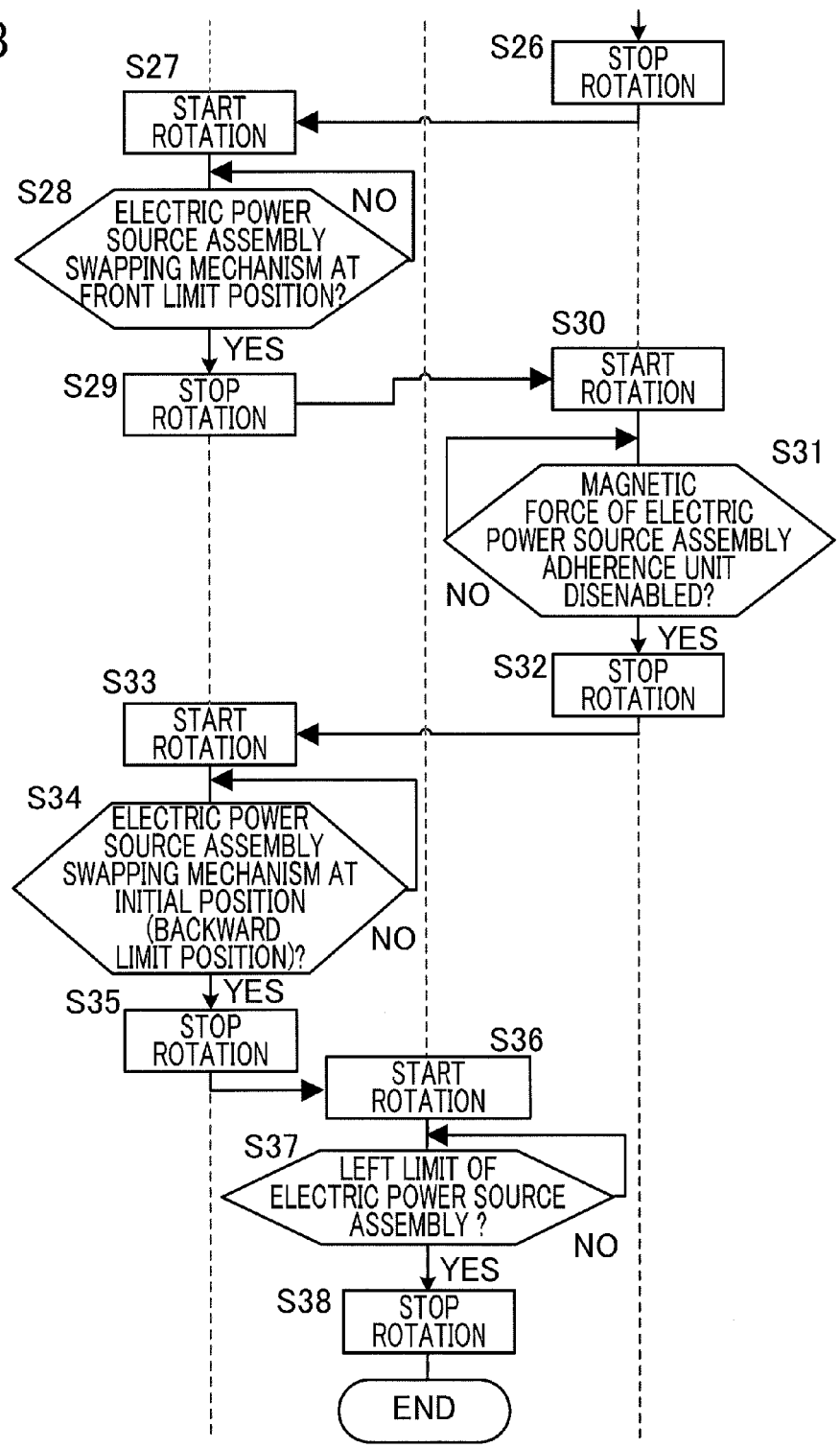
FIG. 38 is a continuation of FIG. 37.

Next, description will given of an operation of the game apparatus while referring to FIGS. 36 to 50. FIGS. 36 to 38 constitute a single sequence figure showing the operation of the game apparatus. This operation is executed according to a computer program by overall control device 100 shown in FIG. 14.

In the operation shown in FIGS. 36 to 38, electric power source assembly swapping mechanism 200 removes electric power source assembly 30 from plural pieces of traveling equipment 10 and moves the electric power source assembly 30 to first port 303A so that power supply device 60 of the electric power source assembly 30 can be charged at first electric charger 305A. Electric power source assembly swapping mechanism 200 then moves another power supply assembly 30 for which power supply device 60 has been charged at second electric charger 305B from second port 303B, to be attached to traveling equipment 10.

Power supply device 60 that is charged by first electric charger 305A at first port 303A is referred to as first power supply device 60 for convenience. Electric power source assembly 30 containing first power supply device 60 and being mounted on first port 303A is referred to as first electric power source assembly 30.

Power supply device 60 that is charged by second electric charger 305B at first port 303B is referred to as second power supply device 60 for convenience. Electric power source assembly 30 containing second power supply device 60 and being mounted on second port 303B is referred to as second electric power source assembly 30.

Figure 39:
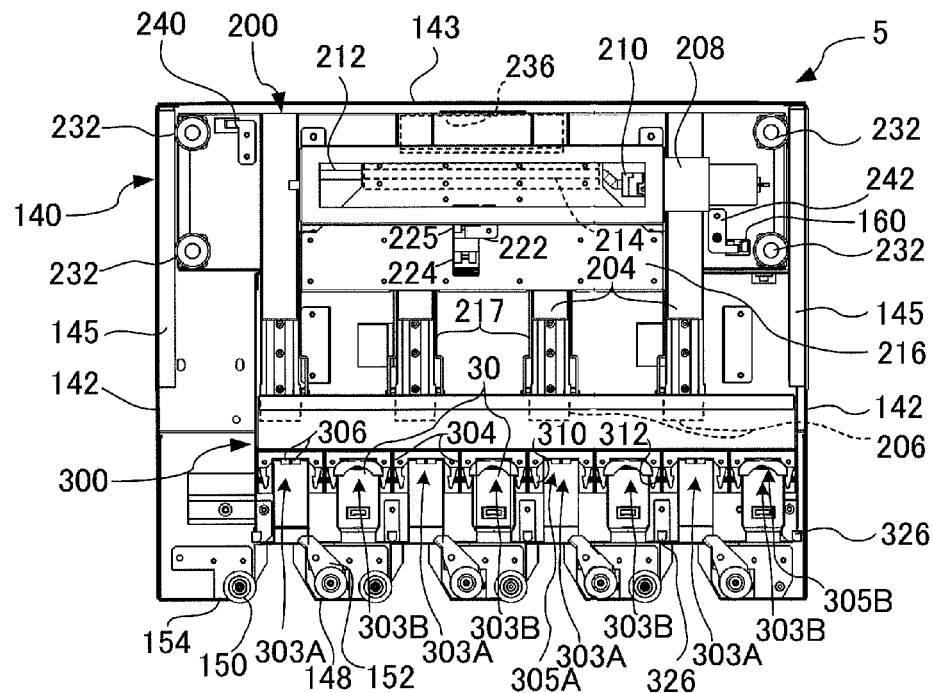
FIG. 39 is a plane view showing the electric charging apparatus of a certain stage.
Figure 40:
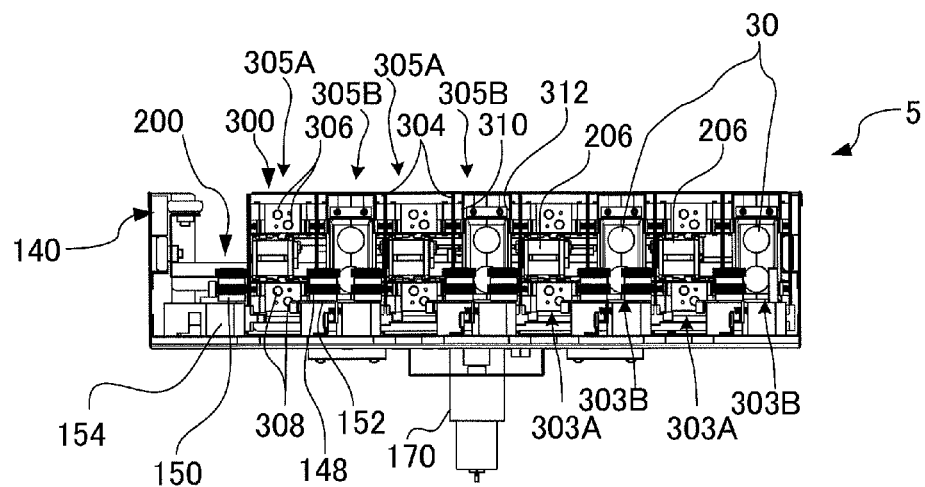
FIG. 40 is a front view of the electric charging apparatus of a stage of FIG. 40.

Before operations shown in FIGS. 36 to 38, electric charging apparatus 5 is in a state shown in FIGS. 39 and 40. This state is a standby state in which first port 303A is vacant, and second electric power source assembly 30 is retained by second port 303B. In this state, base board 202 of electric power source assembly swapping mechanism 200 is sheltered at the backward limit position. In addition, the distance between movable roller 148 and fixed roller 150 is broadened in roller set 146 as described above because electric power source assembly holder 300 is at the right limit position (state of the solid line of FIG. 35). That is, the traveling equipment locking mechanism is in a release state. In addition, the magnetic force of electric power source assembly adherence unit 206 is disenabled.

In addition, before operations shown in FIGS. 36 to 38, a play of at least one horse racing game is completed. In the play, traveling equipment 10 is equipped with first electric power source assembly 30 and runs while receiving electricity from first electric power source assembly 30. On the other hand, second electric charger 305B completes charging power supply device 60 of second electric power source assembly 30 retained by second port 303B.

Figure 41:
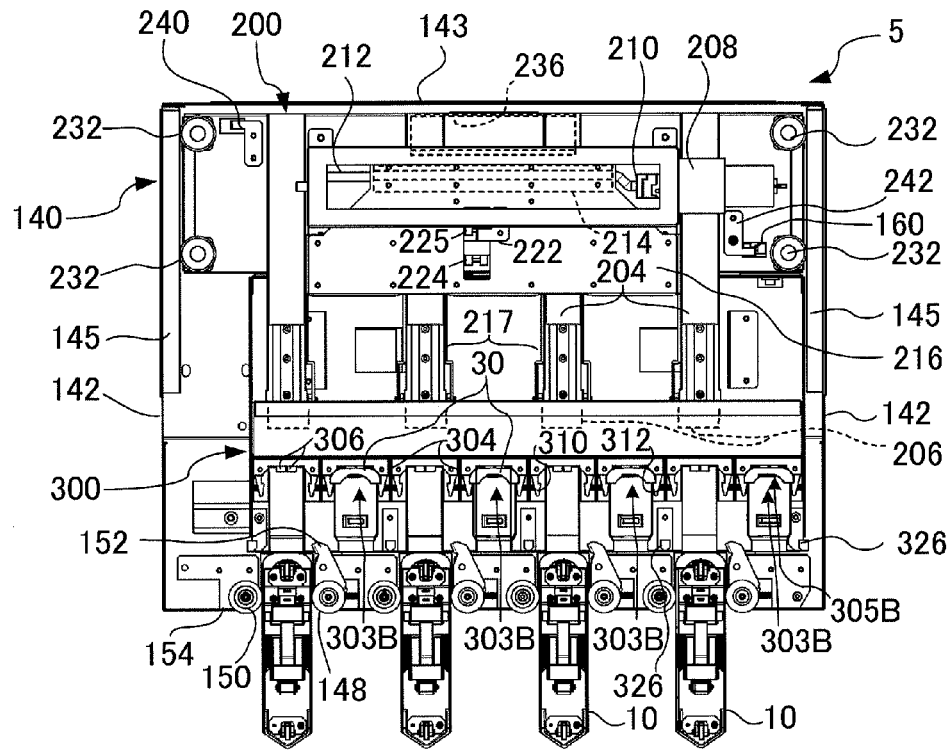
FIG. 41 is a plane view showing the electric charging apparatus of a stage after FIG. 40.
Figure 42:
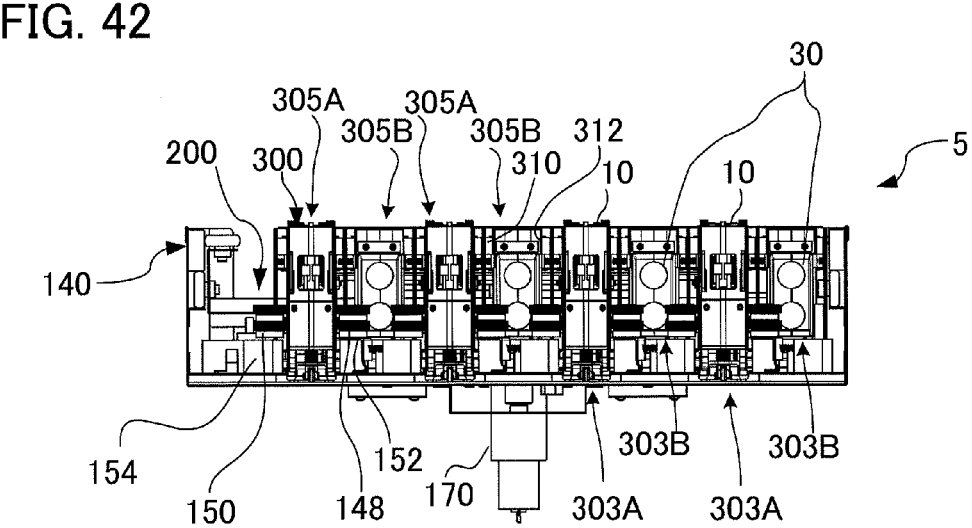
FIG. 42 is a front view of the electric charging apparatus of the stage of FIG. 41.

In operations shown in FIGS. 36 to 38, overall control device 100 first transmits a traveling control signal for guiding traveling equipment 10 to move to an electric power source assembly swapping position to the front of first port 303A of electric charging apparatus 5. Traveling equipment 10 runs, receiving electricity from first electric power source assembly 30. When traveling equipment 10 arrives at the electric power source assembly swapping position as shown in FIGS. 41 and 42 (Step S1), overall control device 100 stops wheel motors 28 of traveling equipment 10 (Step S2).

Next, overall control device 100 starts rotating holder motor 170 for moving electric power source assembly holder 300 transversely (Step S3). Electric power source assembly holder 300 starts moving to the left from a position shown in FIGS. 39 and 40. With this movement, when electric power source assembly adherence unit 206 of electric power source assembly swapping mechanism 200 arrives at the position that is accessible to first port 303A through window 309 (FIG. 30), overall control device 100 receives an on signal from a swap detection sensor 184 (FIG. 22) for detecting whether swapping is possible at the first port (Step S4). Then, overall control device 100 stops the rotation of holder motor 170, and electric power source assembly holder 300 stops at a position shown in FIGS. 41 and 42 (Step S5). In this state, as described above with reference to FIG. 35, the distance between movable roller 148 and fixed roller 150 is narrowed, and traveling equipment 10 is locked therebetween.

Figure 43:
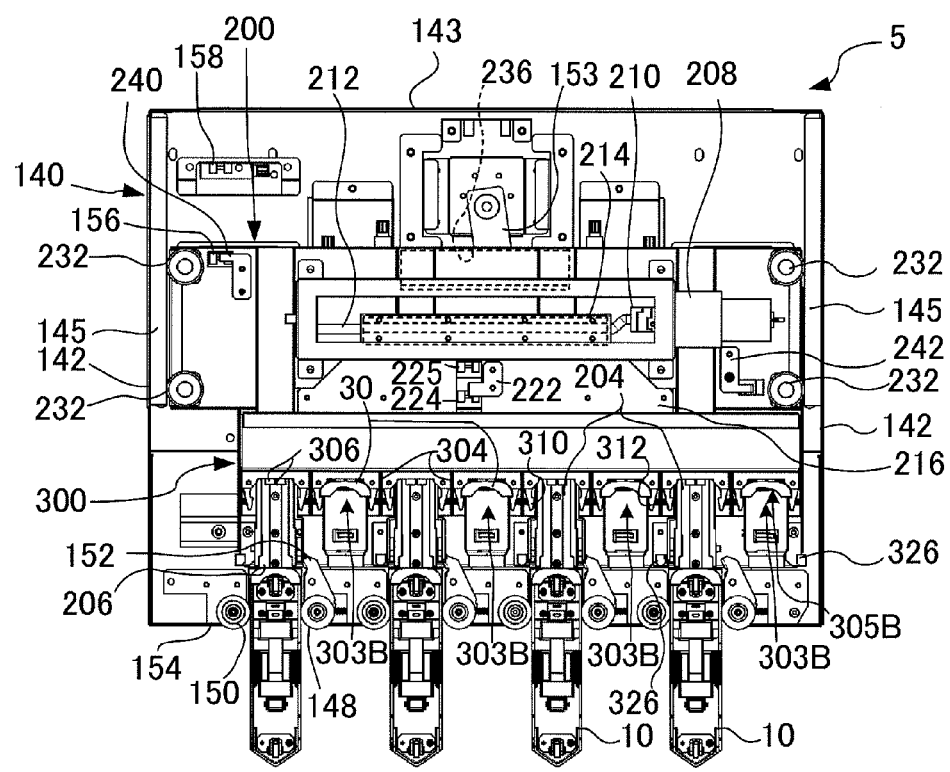
FIG. 43 is a plane view showing the electric charging apparatus of a stage after FIG. 41.

Then, overall control device 100 starts rotating crank motor 208 for switching the magnetic force of electric power source assembly adherence unit 206 (Step S6). Crank 217 moves forward, and the magnetic force of electric power source assembly adherence unit 206 is enabled. When a magnetic force enabled detection sensor 224 for the electric power source assembly adherence unit detects a detected piece 222 as shown in FIG. 43, overall control device 100 receives an on signal from sensor 224 (Step S7). Overall control device 100 then stops the rotation of crank motor 208 (Step S8).

Next, overall control device 100 starts the rotation of swapping mechanism motor 149A for moving electric power source assembly swapping mechanism 200 back and forth (Step S9). When electric power source assembly swapping mechanism 200 advances, and a front limit position detection sensor 156 for the electric power source assembly swapping mechanism detects a detected piece 240, overall control device 100 receives an on signal from sensor 156 (Step S10). Then, overall control device 100 stops the rotation of swapping mechanism motor 149A (Step S11). In this state, bar 204 passes first port 303A, and electric power source assembly adherence unit 206 at the tip of bar 204 accesses first electric power source assembly 30 retained in traveling equipment 10 as shown in FIG. 43. The magnetic force of electric power source assembly adherence unit 206 is effective, and electric power source assembly adherence unit 206 adheres to first electric power source assembly 30.

Next, overall control device 100 starts the rotation of swapping mechanism motor 149A for moving electric power source assembly swapping mechanism 200 back and forth (Step S12). Electric power source assembly swapping mechanism 200 moves backward, and electric power source assembly adherence unit 206 removes first electric power source assembly 30 retained in traveling equipment 10. First electric power source assembly 30 removed from traveling equipment 10 is locked with electric power source assembly lock lever 310, 312 described above with reference to FIGS. 31 and 32. As a result, first electric charger 305A starts charging first electric power source assembly 30. When electric power source assembly chargeable position detection sensor 158 detects a detected piece 240 with the backward movement of electric power source assembly swapping mechanism 200, overall control device 100 receives an on signal from sensor 158 (Step S13 of FIG. 37). As described above, the on signal of sensor 158 as of when sensor 158 passes detected piece 240 on the way that base board 202 of electric power source assembly swapping mechanism 200 moves backward from the front limit position to the backward limit position shows that electric power source assembly 30 adhered to by electric power source assembly adherence unit 206 is now retained in a port for charge. Overall control device 100 then stops the rotation of swapping mechanism motor 149A (Step S14).

Overall control device 100 then starts the rotation of crank motor 208 for switching the magnetic force of electric power source assembly adherence unit 206 (Step S15). Crank 217 moves backward, and the magnetic force of electric power source assembly adherence unit 206 is disenabled. When magnetic force disenabled detection sensor 225 for electric power source assembly adherence units detects a detected piece 222, overall control device 100 receives an on signal from sensor 225 (Step S16). Overall control device 100 then stops the rotation of crank motor 208 (Step S17).

Figure 44:
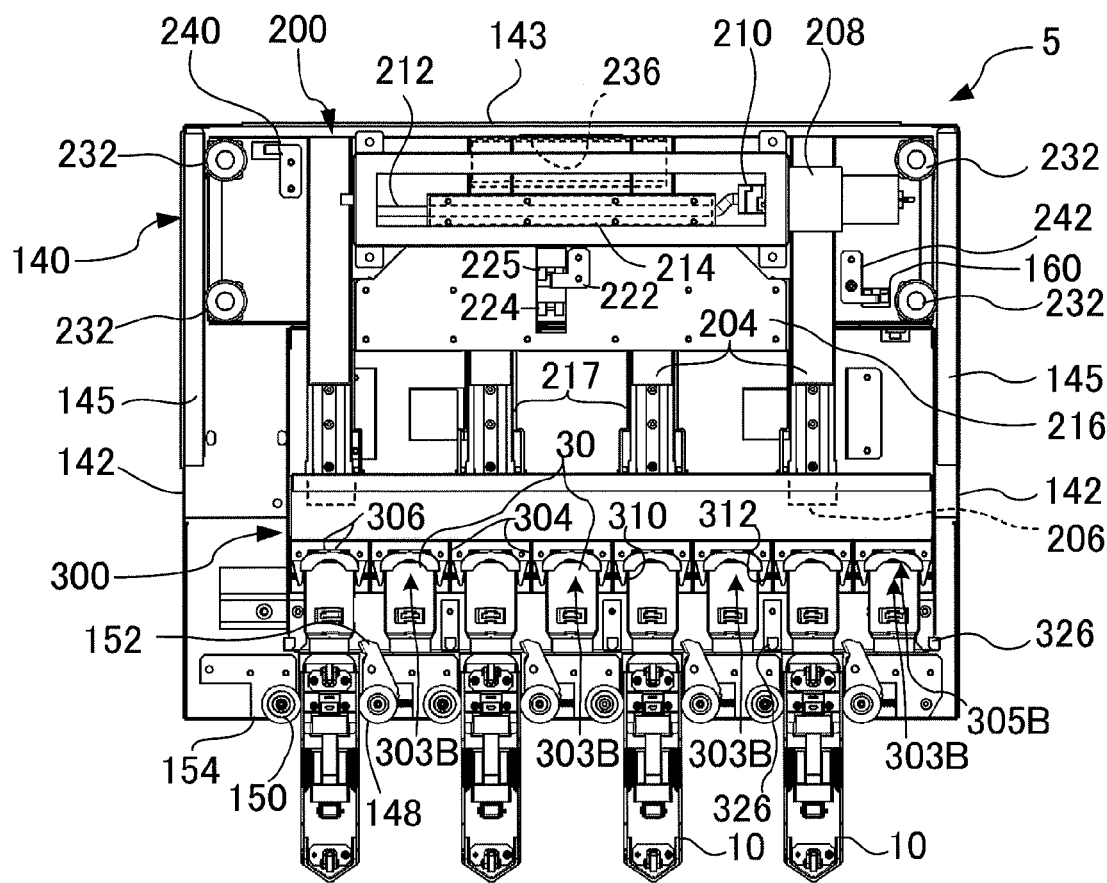
FIG. 44 is a plane view showing the electric charging apparatus of a stage after FIG. 43.

Next, overall control device 100 starts the rotation of swapping mechanism motor 149A for moving electric power source assembly swapping mechanism 200 back and forth (Step S18). When electric power source assembly swapping mechanism 200 moves backward, and a backward limit position detection sensor 160 for electric power source assembly swapping mechanism detects a detected piece 242, overall control device 100 receives an on signal from sensor 160 (Step S19). Then, overall control device 100 stops the rotation of swapping mechanism motor 149A (Step S20). FIG. 44 shows a state in which electric power source assembly swapping mechanism 200 has thus moved backward and is at the backward limit position.

Next, overall control device 100 starts the rotation of holder motor 170 for moving electric power source assembly holder 300 transversely (Step S21). Electric power source assembly holder 300 starts moving from the position as shown in FIG. 44 to the left. When, with this movement, electric power source assembly adherence unit 206 of electric power source assembly swapping mechanism 200 arrives at the position that is accessible to second port 303B through window 309 (FIG. 30), overall control device 100 receives an on signal from a swap detection sensor 182 (FIG. 22) for detecting whether swapping is possible at the second port (Step S22). Then, overall control device 100 stops the rotation of holder motor 170, and electric power source assembly holder 300 comes to halt at a position shown in FIGS. 45 and 46 (Step S23).

Then, overall control device 100 starts the rotation of crank motor 208 for changing the magnetic force of electric power source assembly adherence unit 206 (Step S24). Crank 217 advances, and the magnetic force of electric power source assembly adherence unit 206 is enabled. When magnetic force enabled detection sensor 224 for the electric power source assembly adherence unit detects a detected piece 222 as shown in FIG. 47, overall control device 100 receives an on signal from sensor 224 (Step S25). Then, overall control device 100 stops the rotation of crank motor 208 (Step S26 of FIG. 38).

Next, overall control device 100 starts the rotation of swapping mechanism motor 149A for moving electric power source assembly swapping mechanism 200 back and forth (Step S27). Electric power source assembly swapping mechanism 200 advances. In this state, bar 204 passes second port 303B as shown in FIG. 47. With the forward movement of bar 204, the rock to second electric power source assembly 30 by electric power source assembly lock lever 310,312 is released as described above with reference to FIGS. 31 and 32. The magnetic force of electric power source assembly adherence unit 206 at the tip of bar 204 is effective. Electric power source assembly adherence unit 206 adheres to second electric power source assembly 30 and carries away second electric power source assembly 30 from second port 303B and attaches it to traveling equipment 10 locked with movable roller 148 and fixation roller 150. Second electric power source assembly 30 charged in second electric charger 305B at second port 303B is mounted on traveling equipment 10 in this way. When front limit position detection sensor 156 for electric power source assembly swapping mechanism detects detected piece 240 by the forward movement of electric power source assembly swapping mechanism 200, overall control device 100 receives an on signal from sensor 156 (Step S28). Then, overall control device 100 stops the rotation of swapping mechanism motor 149A (Step S29).

Figure 48:
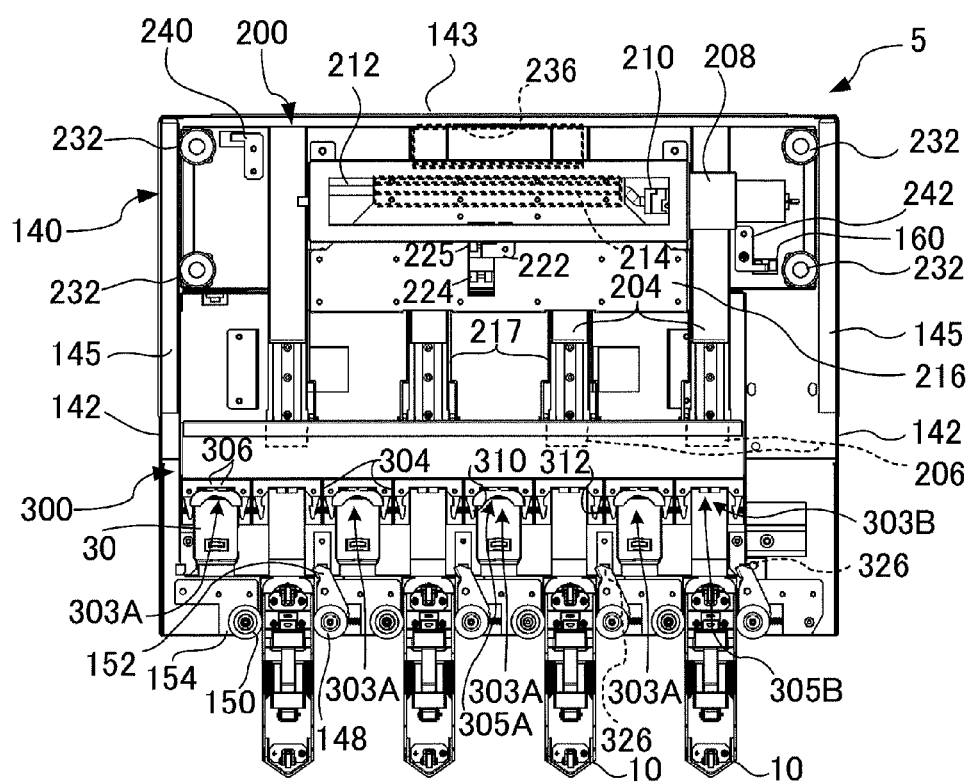
FIG. 48 is a plane view showing the electric charging apparatus of a stage after FIG. 47.

Next, overall control device 100 starts the rotation of crank motor 208 for changing magnetic force of electric power source assembly adherence unit 206 (Step S30). Crank 217 moves backward as shown in FIG. 48, and the magnetic force of electric power source assembly adherence unit 206 is disenabled. When magnetic force disenabled detection sensor 225 for electric power source assembly adherence units detects detected piece 222, overall control device 100 receives an on signal from sensor 225 (Step S31). Then, overall control device 100 stops the rotation of crank motor 208 (Step S32).

Next, overall control device 100 starts the rotation of swapping mechanism motor 149A for moving electric power source assembly swapping mechanism 200 back and forth (Step S33). Electric power source assembly swapping mechanism 200 moves backward, and as shown in FIG. 48, electric power source assembly adherence unit 206 for which the magnetic force has been disenabled becomes apart from first electric power source assembly 30 attached to traveling equipment 10. When backward limit position detection sensor 160 for electric power source assembly swapping mechanism detects detected piece 242, overall control device 100 receives an on signal from sensor 160 (Step S34). Then, overall control device 100 stops the rotation of swapping mechanism motor 149A (Step S35).

Then, overall control device 100 starts the rotation of holder motor 170 for moving electric power source assembly holder 300 transversely (Step S36). Electric power source assembly holder 300 starts moving from the position as shown in FIG. 48 to the left direction. With this movement, overall control device 100 receives an on signal from left limit position detection sensor 186 (FIG. 22) of the electric power source assembly holder (Step S37). Then, overall control device 100 stops the rotation of holder motor 170, and electric power source assembly holder 300 halts at a position shown in FIGS. 49 and 50 (Step S38). Because electric power source assembly holder 300 is at the left limit position (the state of the solid line of FIG. 33), the distance between movable roller 148 and fixed roller 150 broadens in roller set 146, as described above. That is, the traveling equipment locking mechanism is in a released state.

Figures 49, 50:
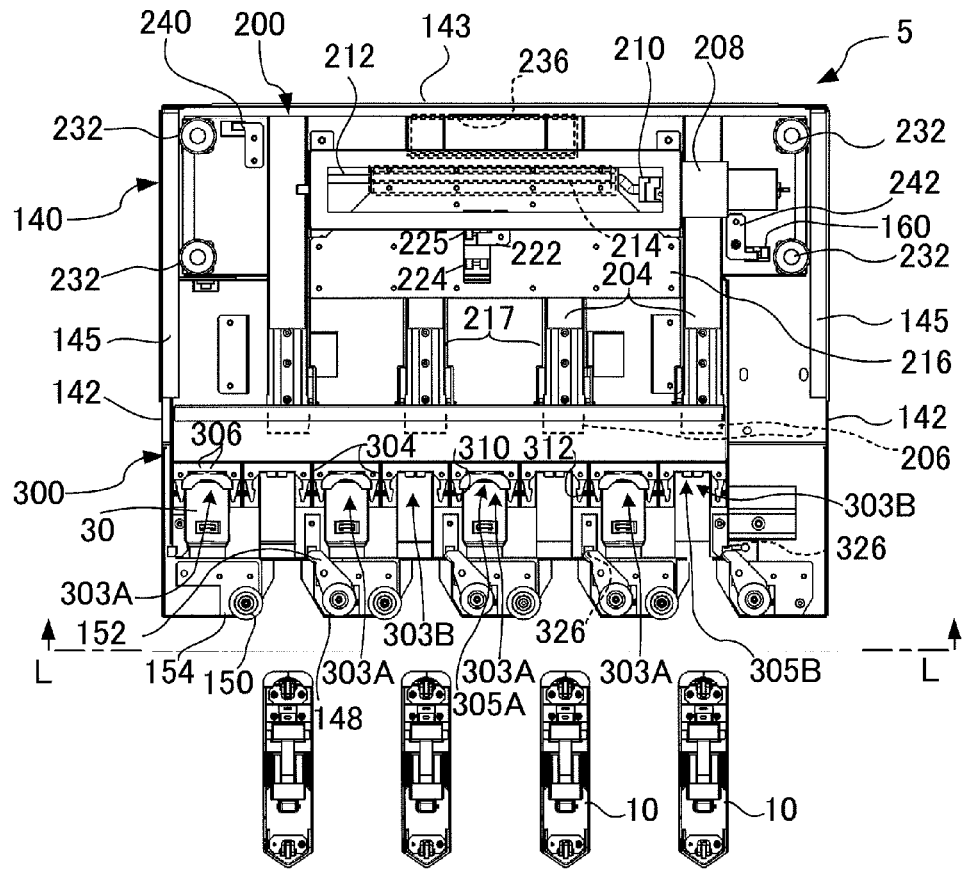
FIG. 49 is a plane view showing the electric charging apparatus of a stage after FIG. 48.
FIG. 50 is a front view showing the electric charging apparatus of the stage of FIG. 49 when viewed along an L-L line of FIG. 49.

Overall control device 100 transmits a traveling control signal for guiding traveling equipment 10 to move apart from the forward electric power source assembly swapping position of first port 303A. As shown in FIG. 49, traveling equipment 10 is equipped with second electric power source assembly 30 and runs by receiving electricity from second electric power source assembly 30. After this, traveling equipment 10 which runs by receiving electricity from second electric power source assembly 30 is used in a horse racing game. Between the plays of at least one horse racing games, first electric charger 305A completes charging to power supply device 60 of first electric power source assembly 30 retained in first port 303A.

The state shown in FIGS. 49 and 50 is a standby state in which second port 303B is vacant and in which first electric power source assembly 30 is retained in first port 303A. In reverse to the operation shown in FIGS. 36 to 38, electric power source assembly swapping mechanism 200 can remove second electric power source assembly 30 from plural pieces of traveling equipment 10, move second electric power source assembly 30 to second port 303B so that second power supply device 60 of second electric power source assembly 30 is chargeable in second electric charger 305B, and thereafter, move first electric power source assembly 30 for which first power supply device 60 has been charged by first electric charger 305A from first port 303A to traveling equipment 10.

In this case, overall control device 100 first transmits a traveling control signal to guide traveling equipment 10 to move to the electric power source assembly swapping position to the front of second port 303A of electric charging apparatus 5. In substitution for Step S1 of FIG. 36, when traveling equipment 10 arrives at the electric power source assembly swapping position shown in FIG. 47, overall control device 100 stops wheel motor 28 for both wheels of traveling equipment 10.

In addition, in this case, the sequence figure shown in FIGS. 36 to 38 is revised as follows. By the start of the rotation of holder motor 170 in Step S3, electric power source assembly holder 300 starts moving to the right direction from the position shown in FIGS. 49 and 50. In substitution for Step S4, when electric power source assembly adherence unit 206 of electric power source assembly swapping mechanism 200 arrives at the position that is accessible to second port 303B through window 309 (FIG. 30), overall control device 100 receives an on signal from swap detection sensor 182 (FIG. 22) for detecting whether swapping is possible at the second port. Then, overall control device 100 stops the rotation of holder motor 170 (Step S5). After this, through the operation from Steps S6 to S20, electric power source assembly adherence unit 206 mounted on the tip of bar 204 of electric charging apparatus 5 advances to adhere to second electric power source assembly 30 mounted on traveling equipment 10, removes second electric power source assembly 30 from traveling equipment 10, carries second electric power source assembly 30 backward to second port 303B, and has second port 303B retain second electric power source assembly 30 to be charged by second electric charger 305B.

In addition, by the start of rotation of holder motor 170 in Step S21, electric power source assembly holder 300 starts moving to the right direction. In substitution for Step S22, when electric power source assembly adherence unit 206 of electric power source assembly swapping mechanism 200 arrives at a position that is accessible to first port 303A through window 309 (FIG. 30), overall control device 100 receives an on signal from swap detection sensor 184 (FIG. 22) for detecting whether swapping is possible at the first port. Then, overall control device 100 stops the rotation of holder motor 170 (Step S23). After this, through the operation from Steps S24 to S35, electric power source assembly adherence unit 206 mounted on the tip of bar 204 of electric charging apparatus 5 advances to adhere to first electric power source assembly 30 charged by first electric charger 305A, releases first electric power source assembly 30 from first port 303A, and mounts first electric power source assembly 30 on traveling equipment 10.

Furthermore, by the start of the rotation of holder motor 170 of S36, electric power source assembly holder 300 starts moving to the right direction. In substitution for Step S37, overall control device 100 receives an on signal from right side limit position detection sensor 180 (FIG. 22) of the electric power source assembly holder. Then, overall control device 100 stops the rotation of holder motor 170 (Step S38). Thus, electric charging apparatus 5 returns to a state shown in FIGS. 39 and 40.

Figure 51:
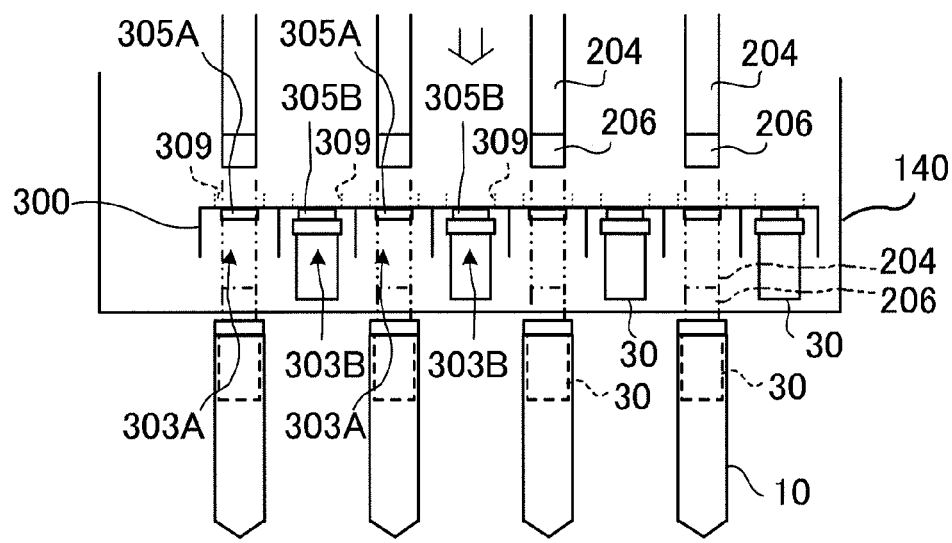
FIG. 51 is a schematic view showing a movement of the electric charging apparatus.

FIGS. 51 to 56 are schematic views showing an operation of electric charging apparatus 5. FIG. 51 is equivalent to FIGS. 41 and 43. When traveling equipment 10 on which first electric power source assembly 30 is mounted returns to the electric power source assembly swapping position of electric charging apparatus 5, each of plural bars 204 advances from the position of the solid line to the position of the virtual line in FIG. 51. Each bar 204 advances with corresponding electric power source assembly adherence unit 206 so as to pass one of first ports 303A, and each of electric power source assembly adherence units 206 adheres to first electric power source assembly 30 mounted on one of plural pieces of traveling equipment 10.

Figure 52:
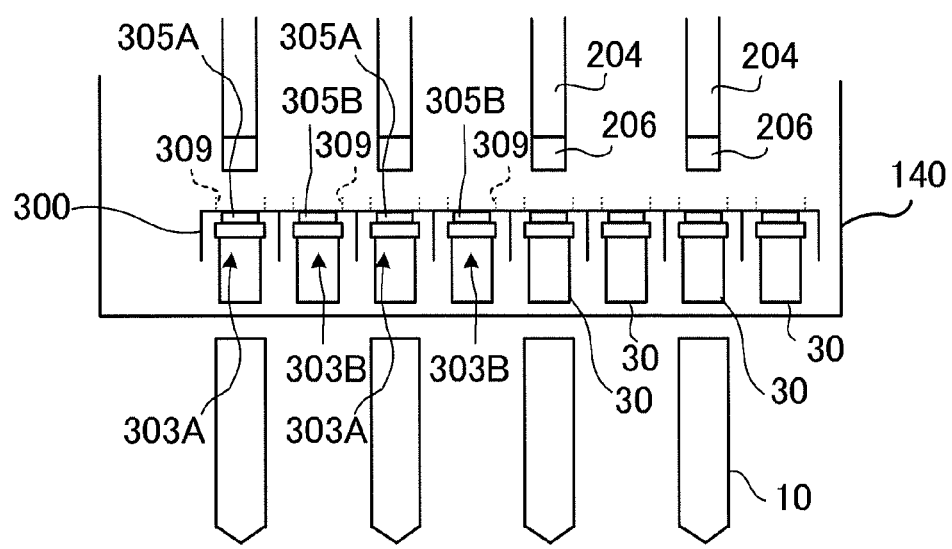
FIG. 52 is a schematic view showing a movement of the electric charging apparatus.

FIG. 52 corresponds to FIG. 44. After the state of FIG. 51, each of electric power source assembly adherence units 206 removes first electric power source assembly 30 from traveling equipment 10 as shown in FIG. 52, and each of bars 204 carries first electric power source assembly 30 which was adhered to by electric power source assembly adherence unit 206 backward to first port 303A so that first power supply device 60 can be charged by first electric charger 305A.

Figure 53:
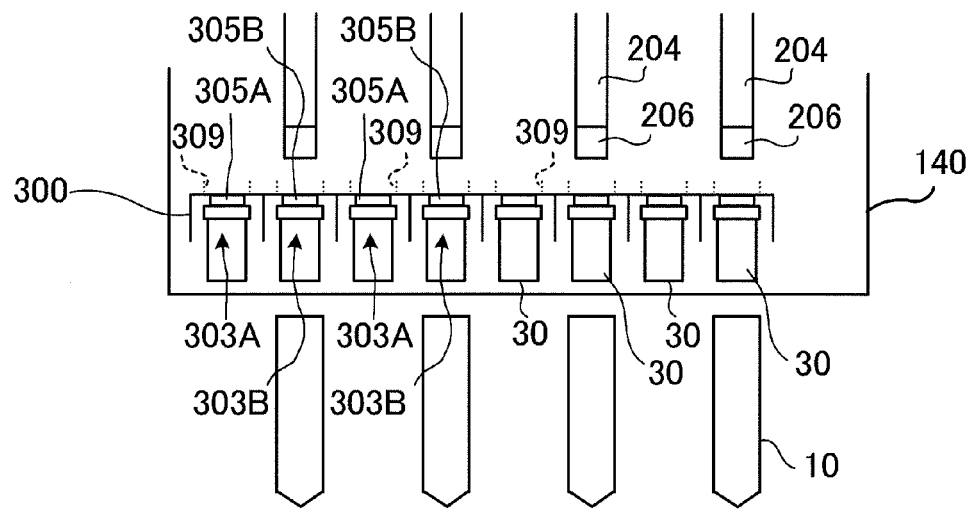
FIG. 53 is a schematic view showing a movement of the electric charging apparatus.

FIG. 53 corresponds to FIG. 45. After the state of FIG. 52, electric power source assembly holder 300 moves to the left direction relative to main base 140 as shown in FIG. 53.

Figure 54:
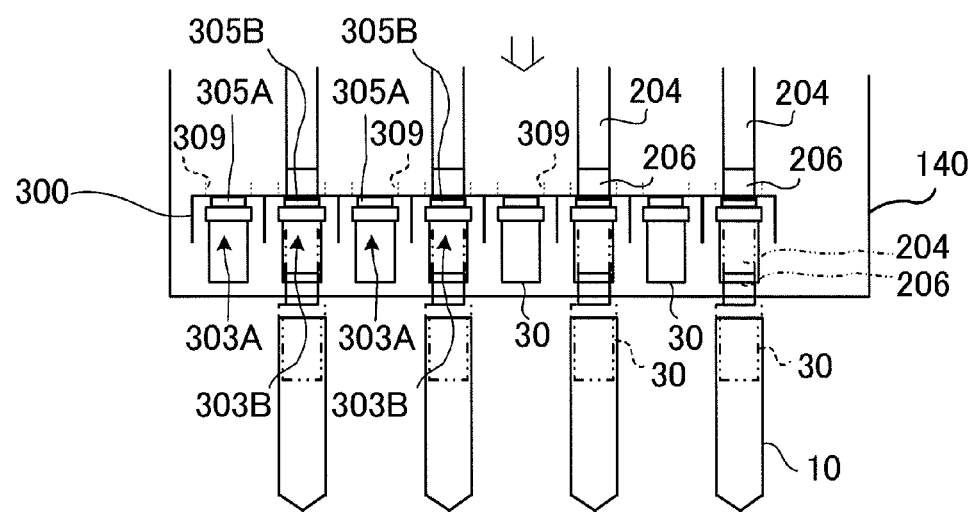
FIG. 54 is a schematic view showing a movement of the electric charging apparatus.

FIG. 54 corresponds to FIGS. 47 and 48. After the state of FIG. 53, as shown by the solid line of FIG. 54, each of plural bars 204 advances to pass one of second ports 303B with corresponding electric power source assembly adherence unit 206, and each of electric power source assembly adherence units 206 adheres to second electric power source assembly 30 for which second power supply device 60 has been charged by second electric charger 305B. Then, each of bars 204, as shown in a virtual line, carries second electric power source assembly 30 adhered to by electric power source assembly adherence unit 206 forward to be mounted on plural pieces of traveling equipment 10 from second port 303B, and then moves backwards. Traveling equipment 10 on which second electric power source assembly 30 has been mounted runs off of electric charging apparatus 5.

Figure 55:
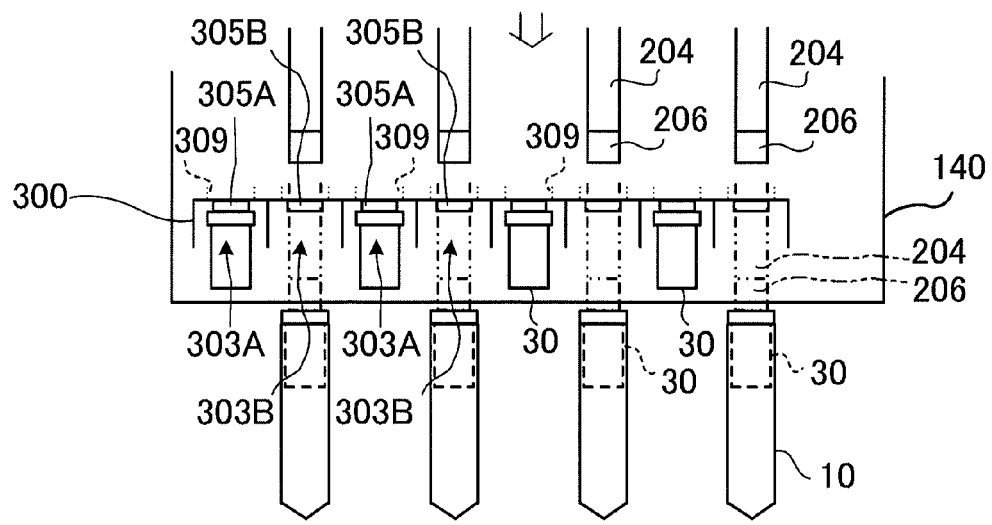
FIG. 55 is a schematic view showing a movement of the electric charging apparatus.

When traveling equipment 10 on which second electric power source assembly 30 has been mounted returns to the electric power source assembly swapping position of electric charging apparatus 5, each of plural bars 204 advances from the position of solid line to the position of the virtual line in FIG. 55. Each bar 204 advances with corresponding electric power source assembly adherence unit 206 to pass one of second ports 303B, and each of electric power source assembly adherence units 206 adheres to second electric power source assembly 30 mounted on one of plural pieces of traveling equipment 10.

After the state of FIG. 55, it becomes a state that is the same as what is shown in FIG. 53. Each of electric power source assembly adherence units 206 removes second electric power source assembly 30 from traveling equipment 10, and each of bars 204 carries second electric power source assembly 30 adhered to by electric power source assembly adherence unit 206 backward to second port 303B so that second power supply device 60 can be charged by second electric charger 305B.

After this, it becomes a state that is the same as what is shown in FIG. 52. Electric power source assembly holder 300 moves to the right direction relative to main base 140.

Figure 56:
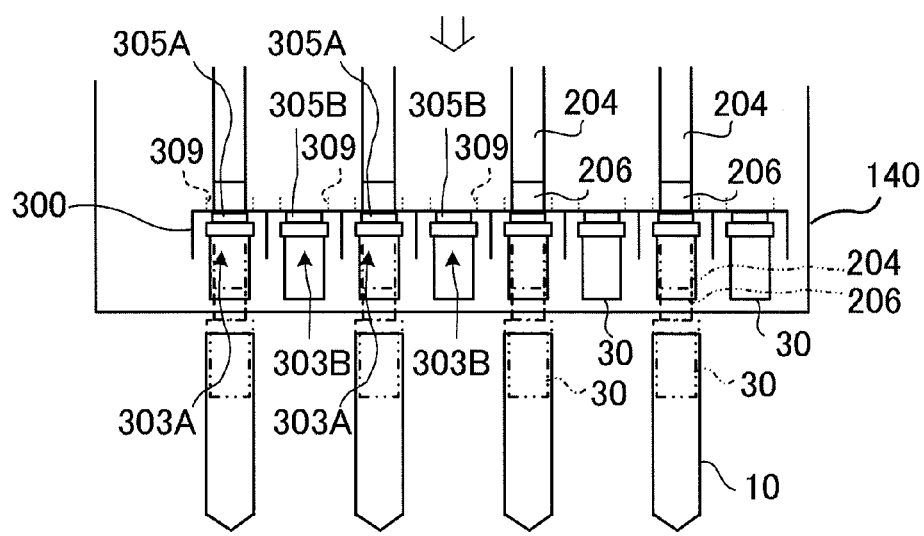
FIG. 56 is a schematic view showing a movement of the electric charging apparatus.
Figure 57:
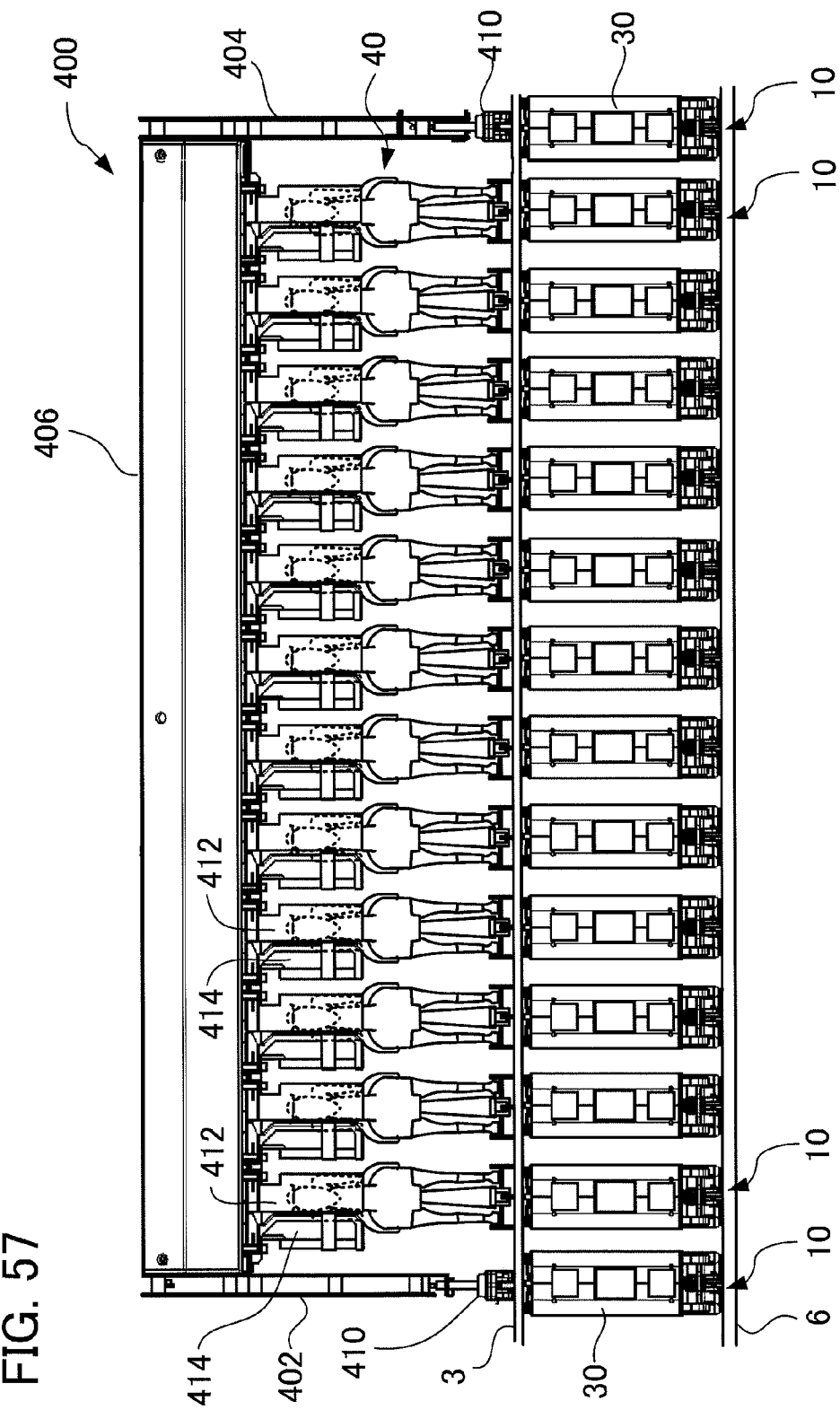
FIG. 57 is a front view showing a start gate model used in the game apparatus.
Figure 58:
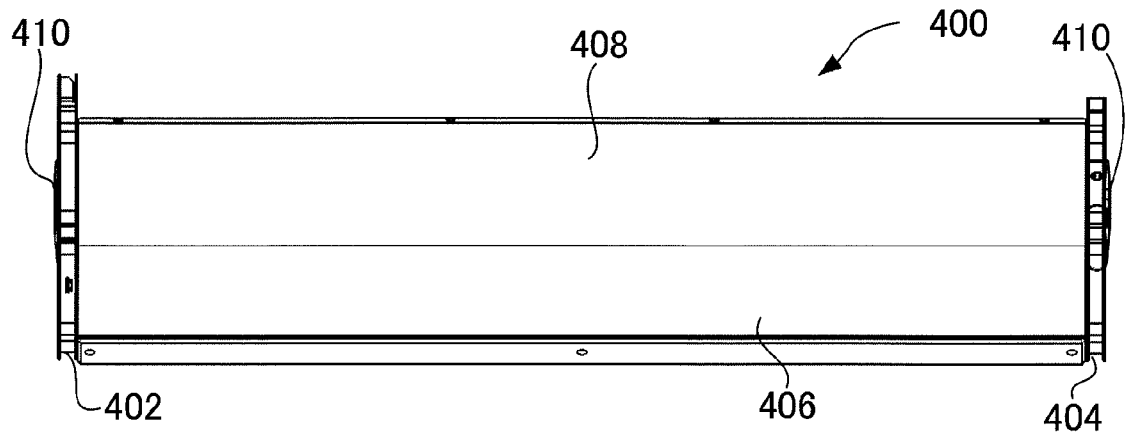
FIG. 58 is a plane view showing the start gate model.

Thereafter, as shown in the solid line in FIG. 56, each of plural bars 204 advances with corresponding electric power source assembly adherence unit 206 so as to pass one of first ports 303A, and each of electric power source assembly adherence units 206 adheres to first electric power source assembly 30 for which first power supply device 60 has been charged by first electric charger 305A. Then, each of bars 204, as shown in the virtual line, carries first electric power source assembly 30 adhered to by electric power source assembly adherence unit 206 forward from first port 303A to be attached to plural pieces of traveling equipment 10, and then moves backward. Traveling equipment 10 on which first electric power source assembly 30 has been mounted runs off of electric charging apparatus 5.

In this embodiment, traveling equipment 10 can run with second power supply device 60 while charging first power supply device 60 in first electric charger 305A when first electric power source assembly 30 is placed in first port 303A, and traveling equipment 10 can run with first power supply device 60 while charging second power supply device 60 at second electric charger 305B when second electric power source assembly 30 is placed in second port 303B. Therefore, a time period for which traveling equipment 10 cannot run for the charging of power supply device 60 can be minimized.

In addition, according to this embodiment, each bar 204 and each electric power source assembly adherence unit 206 are used for both mounting or dismounting of first electric power source assembly 30 and second electric power source assembly 30. Therefore, the number of parts can be reduced in comparison with providing a bar and an electric power source assembly adherence unit for the first power supply assemblies and a bar and an electric power source assembly adherence unit for the second power supply assemblies.

Driving Start Gate Model

In the game apparatus of the horse racing game as described above, traveling equipment 10 can have the start gate model run.

As shown in FIGS. 57 to 60, a start gate model 400 has a left sidewall 402, a right sidewall 404, and a front top 406 and a rear top 408 for connecting sidewalls 402 and 404. Each bottom end of sidewall 402,404 is coupled with a carriage 410.

Plural doors 412 (12 doors in the embodiment of the figure) are arranged in start gate model 400. Door 412 is supported by a bracket 414 in an openable and closable manner. Door 412 is opened and closed by a drive source (not shown). Specifically, horse model assembly 40 waits behind each door 412 closed before the start of the game. Start gate model 400 can surround a position (i.e., a position waiting before a run start) at which model assembly 40 starts running, and model assembly 40 moves to the position where model assembly 40 starts running in start gate model 400 before the start of the game. At the time of the start of the game, each door 412 opens, and model assembly 40 starts competition.

Figure 59:
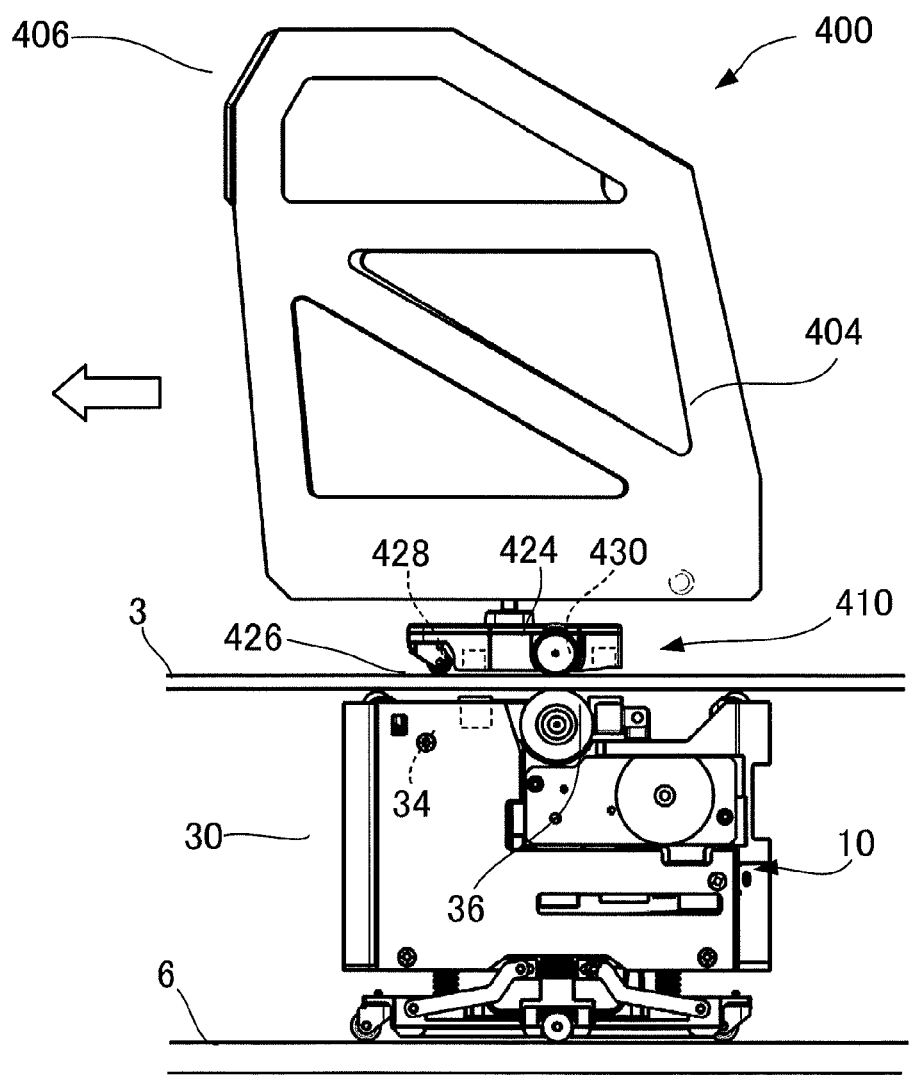
FIG. 59 is a side view showing the start gate model traveling on the first floor panel, being attracted to the traveling equipment.

As best shown in FIG. 59, a pair of wheels 424 is attached to carriage 410 rotatably. A caster 426 is also attached to carriage 410 rotatably. Like carriage 42 of model assembly 40, two pulled sections 428 and 430 are placed inside of carriage 410. Pulled sections 428 and 430 are ferromagnets or magnets, and are preferably permanent magnets.

Floor panel 3 (first floor panel) on which carriage 410 runs is formed of a non-magnetic material, and model puller 34 of traveling equipment 10 and pulled section 428 of start gate model 400 attract each other by magnetic force, and model puller 36 of traveling equipment 10 and pulled section 430 of start gate model 400 attract each other by magnetic force. Therefore, when traveling equipment 10 right under carriage 410 runs on second floor panel 6, model pullers 34 and 36 attract carriage 410 so that carriage 410 and additionally start gate model 400 run with traveling equipment 10. Thus, one start gate model 400 can be moved by pulling two carriages 410 of the start gate model 400 with two pieces of traveling equipment 10 respectively. In a preferred embodiment, model puller 34,36 and pulled section 428,430 are permanent magnets, but other choices can be adopted.

Figure 60:
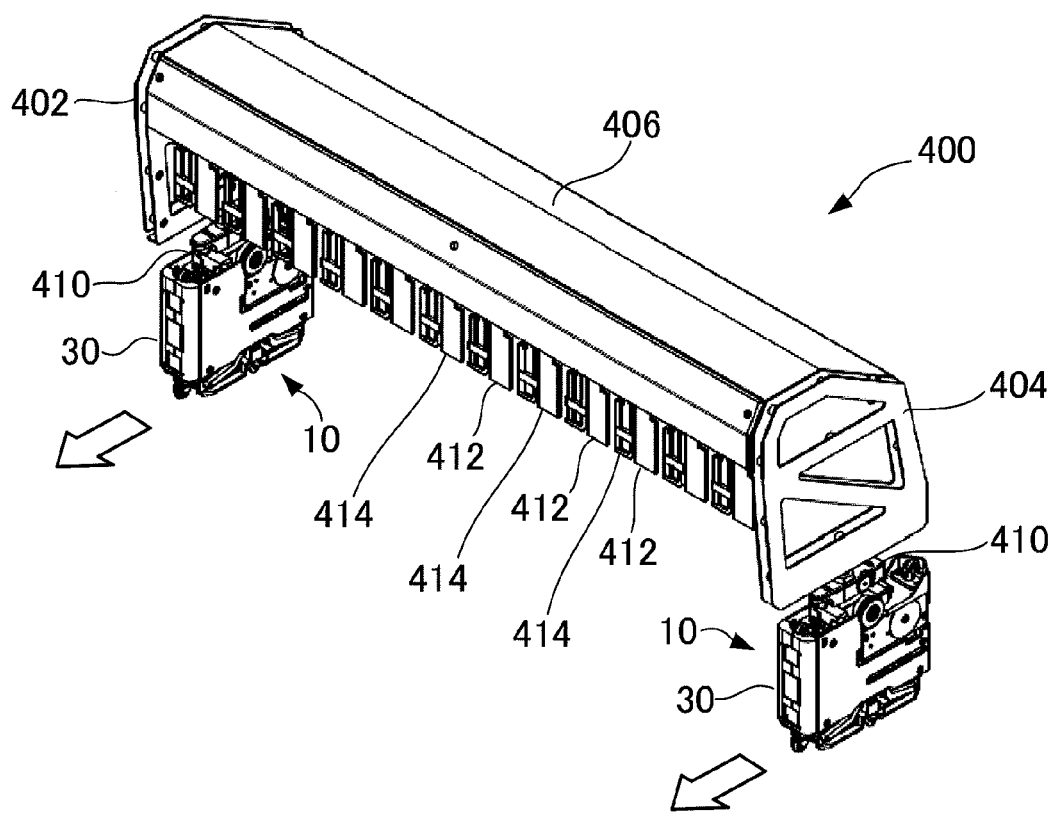
FIG. 60 is a perspective view showing a start gate model 400 traveling, being attracted to the traveling equipment, from which view the first floor panel has been omitted.

As described above, traveling equipment 10 runs underneath floor panel 3 and above second floor panel 6, and carriage 410 corresponding to the traveling equipment 10 is pulled by the traveling equipment 10, and start gate model 400 runs on floor panel 3 as shown by an arrow in FIGS. 59 and 60. With this configuration, plural model assemblies 40 can be pulled with some pieces of traveling equipment 10, and start gate model 400 can be pulled with other plural pieces of traveling equipment 10 of the same type. Therefore, no drive mechanism of an exclusive type for moving a large-sized start gate model 400 which can surround plural model assemblies 40 is required.

Traveling equipment 10 pulling start gate model 400 runs, controlled by overall control device 100 shown in FIG. 14. For example, start gate model 400 can be caused to move to the predetermined position (position surrounding a position where each model assembly 40 starts running) only when it is necessary, and otherwise can remove start gate model 400 from a course where model assembly 40 runs in a horse racing game.

The electric power source assembly locking mechanism locks electric power source assembly 30 when carriage 410 of start gate model 400 is separated from model puller 34,36 for the same reason as described above with reference to FIG. 13. For example, in a case in which a person carries traveling equipment 10 separated from start gate model 400 for repair, electric power source assembly 30 does not come off electric power source assembly compartment 70 accidentally, so that electric power source assembly 30 does not fall off main body 12, nor does main body 12 fall off electric power source assembly 30.

Structure of First Floor Panel

Figure 61:
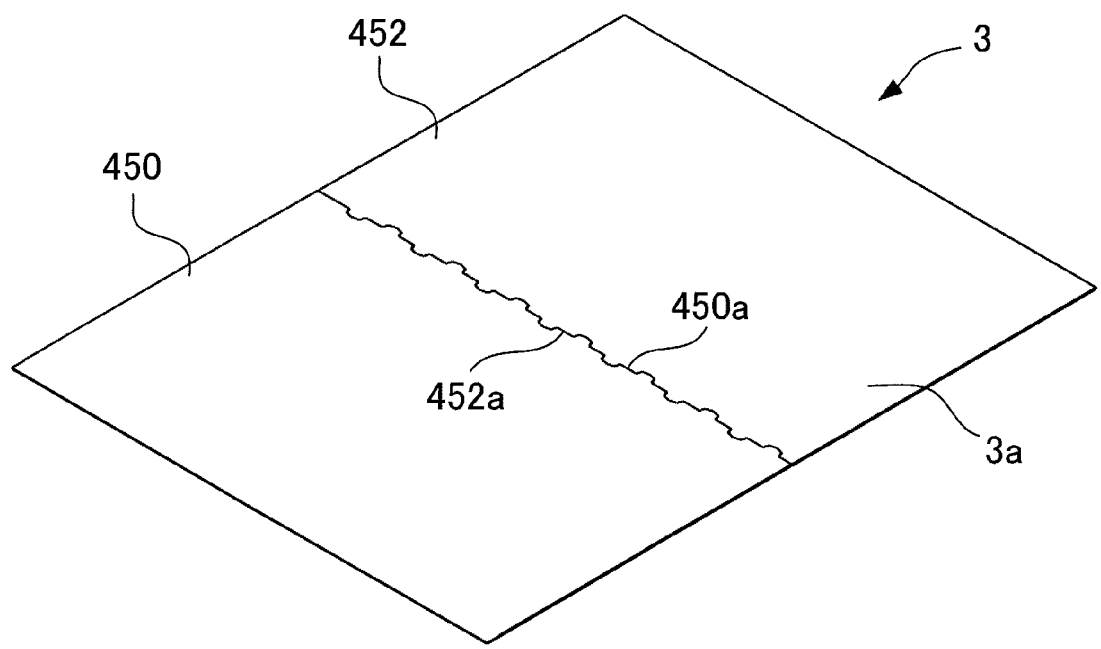
FIG. 61 is a perspective view showing the first floor panel when viewed from the top.
Figure 62:
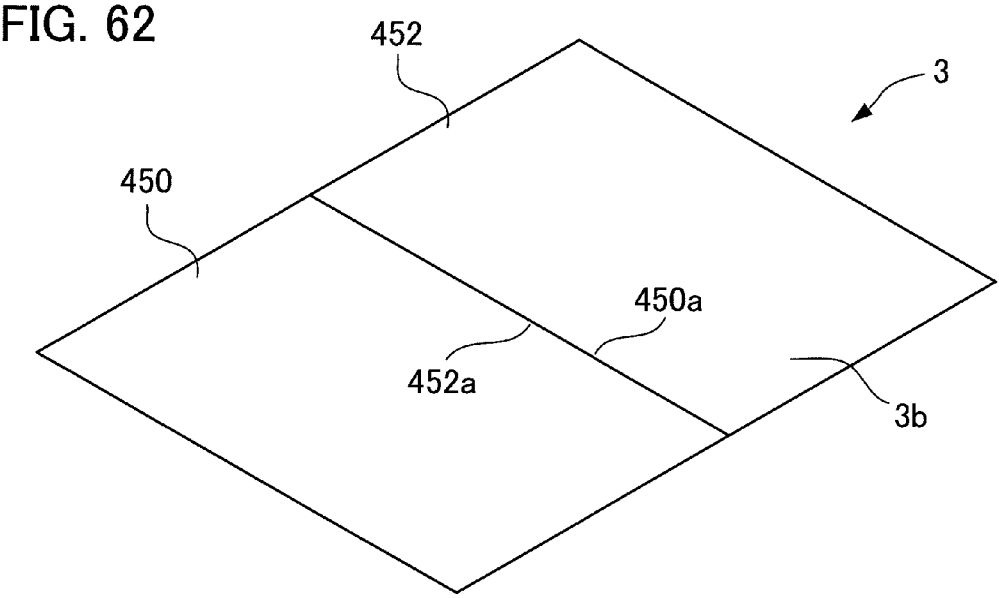
FIG. 62 is a perspective view showing the first floor panel when viewed from the bottom.

Referring to FIGS. 61 to 65, description will be given of the details of the structure of first floor panel 3. Floor panel 3 has plural (two in the embodiment of the figure) floor panel members 450 and 452 that can be assembled adjacent to each other. As shown in FIG. 61, in top surface 3a of floor panel 3, the mutual joints of floor panel members 450 and 452 form an approximately zigzag line, whereas in lower part 3b of floor panel 3, the mutual joints of floor panel members 450 an 452 form a straight line as shown in FIG. 62.

Figure 63:
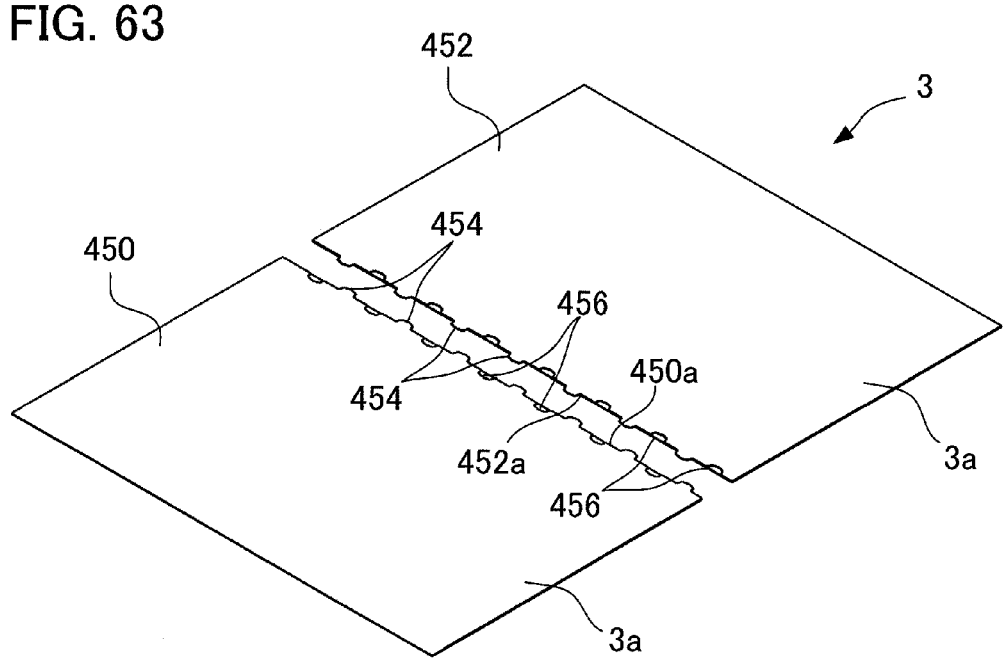
FIG. 63 is a perspective view showing the first floor panel that is disassembled, when viewed from the top.
Figure 64:
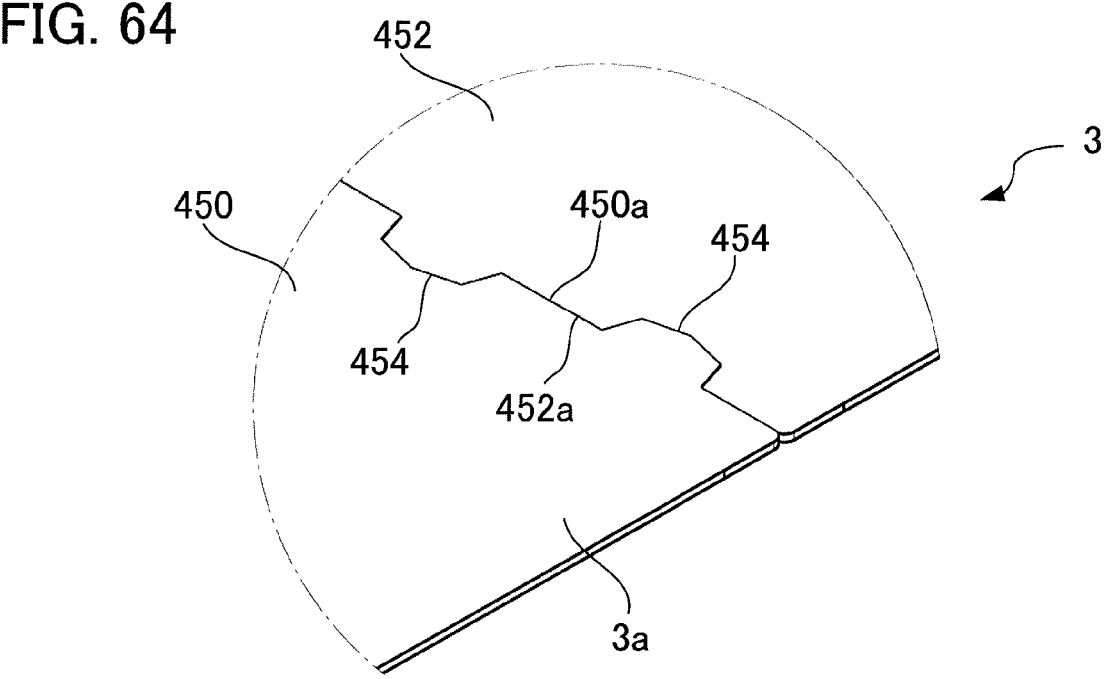
FIG. 64 is an enlarged view of a portion of FIG. 61.
Figure 65:
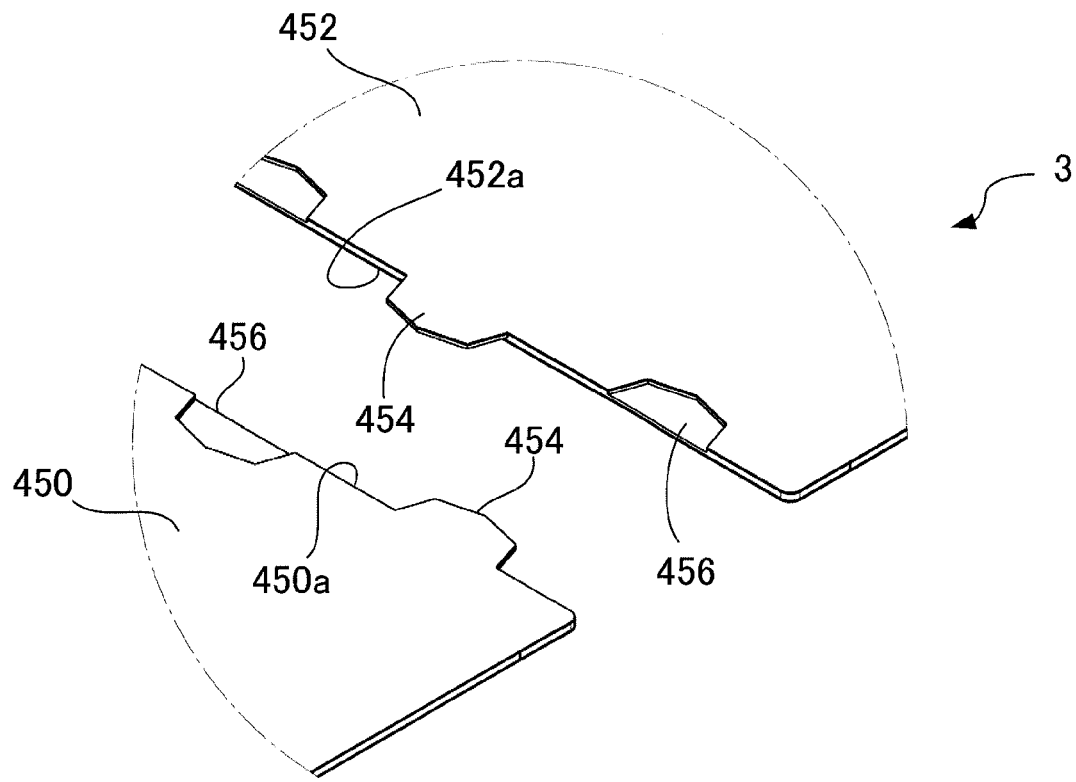
FIG. 65 is an enlarged view of a portion of FIG. 63.

As shown in FIG. 63, which is an exploded view, plural convex portions 454 are formed regularly in edges 450a and 452a adjacent to the other of each of floor panel members 450,452, the convex portions projecting along the identical plane as top surface 3a. Furthermore, concave portions 456 are formed regularly in top surface 3a of edges 450a and 452a. As shown in enlarged views of FIGS. 64 and 65, convex portions 454 of one floor panel member 450 are fitted in concave portions 456 of the other floor panel member 452 without protruding from top surface 3a. Convex portions 454 of floor panel members 452 are fitted in concave portions 456 of floor panel member 450 without projecting from top surface 3a. Even if convex portions 454 of the floor panel member are fitted in concave portions 456 of the other floor panel member, convex portions 454 do not protrude from top surface 3a of the floor panel member.

With this structure, because first floor panel 3 can be disassembled into plural floor panel members 450 and 452, it is convenient, for example, when transporting the game apparatus or first floor panel 3. In addition, it is easy to remove floor panel member 450 or 452 from the game apparatus, to check the condition underneath. In addition, when floor panel member 450 or 452 is damaged, it is not necessary to change the whole first floor panel 3 but can replace only the damaged floor panel member 450 or 452. Furthermore, when floor panel member 450 or 452 is assembled with an adjacent other floor panel member 450 or 452, top surface 3*a* of plural floor panel members 450 and 452 forms a plane and lower surface 3*b* also forms a plane. In other words, the top surface of the joints between floor panel members 450 and 452 forms a plane, and the lower surface also forms a plane. Therefore, the movements of model assembly 40 and start gate model 400 traveling on first floor panel 3 are not obstructed. In addition, the movement of traveling equipment 10 traveling underneath first floor panel 3 is also not obstructed.

In addition, with this structure, after one of floor panel members 450 or 452 is installed at a position where it should be arranged, it is possible to easily install the other floor panel member 450 or 452 at a position where it should be arranged. Especially, mutual positioning of plural floor panel members 450 and 452 is easy by fitting plural convex portions 454 and plural concave portions 456. In addition, it is easy to disassemble first floor panel 3 by separating one of floor panel members 450 or 452 from the other.

Modifications and Corrections

In the foregoing, an embodiment of the present invention has been described, but the present invention is not limited to the embodiment. For example, modifications and corrections such as those that follow are also within the scope of the present invention.

The present invention is applicable to a game apparatus for executing other games than the horse racing game. For example, these games can include a race game in which traveling equipment carries a model of a car, a bicycle, a motorcycle, a person or animal other than a horse. In addition, these games can include football, baseball, or other ball games in which traveling equipment carries models of athletes. During the play of the game, overall control device 100 may execute a control of giving priority to operation of the traveling equipment by a player, so that the operation of the traveling equipment by the player is actualized.

In the above embodiment, traveling equipment 10 runs by drive wheel 26 friction-contacting floor panel 3 to the top thereof. However, as another embodiment, traveling equipment 10 may run in a way in which a drive wheel, a caterpillar, or a leg comes in contact with second floor panel 6 underneath. However, if drive wheels of traveling equipment 10 rotate in contact with the top surface of second floor panel 6 underneath traveling equipment 10 and if debris or other materials are adhered or accumulated on the top surface of second floor panel 6, the traveling motion of traveling equipment 10 might be obstructed for reasons such as the mutual friction between drive wheels of traveling equipment 10 and second floor panel 6 being reduced. However, the debris or other materials are unlikely to be adhered or accumulated in the bottom surface of first floor panel 3 that is above traveling equipment 10. Drive wheels 26 of traveling equipment 10 rotate in contact with the bottom surface of first floor panel 3 that is on traveling equipment 10 like the above embodiment, whereby it is possible to reduce the possibility of the traveling motion of traveling equipment 10 being obstructed.

Figure 66:
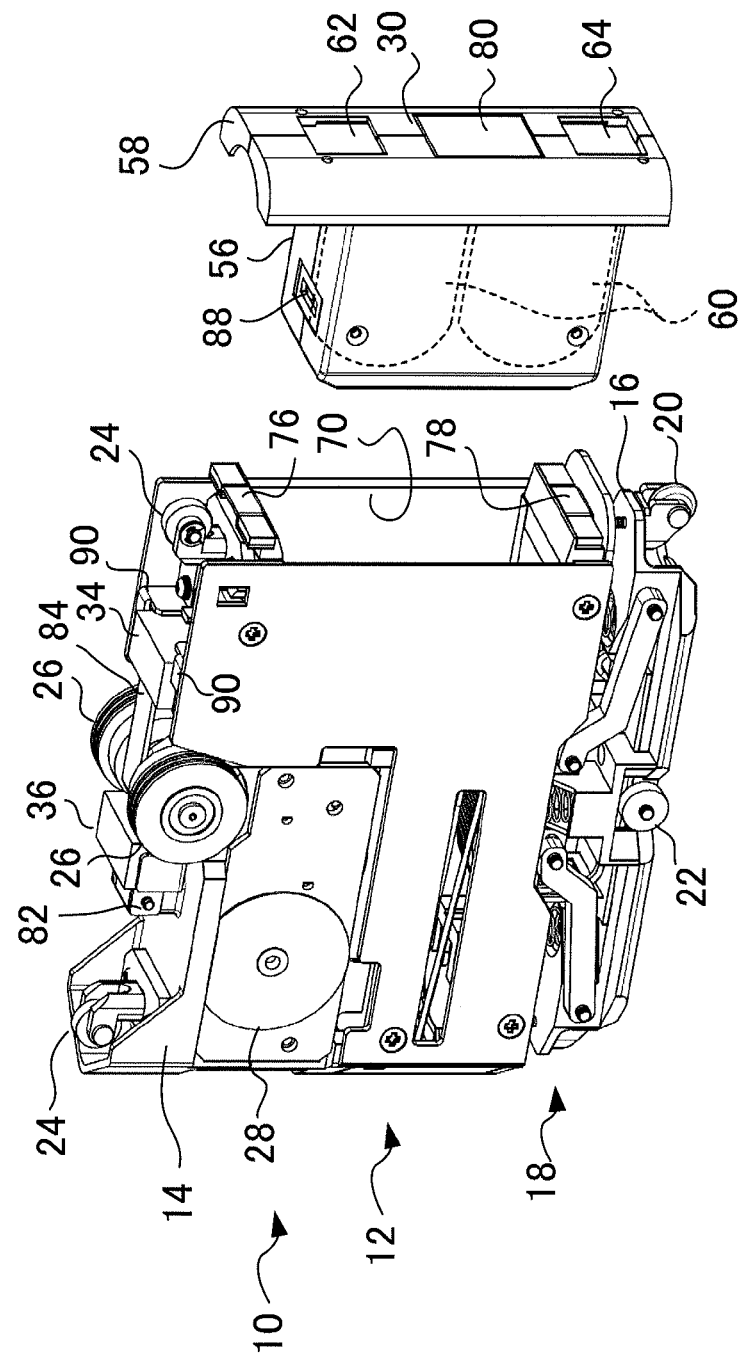
FIG. 66 is a perspective view showing traveling equipment according to a modification and an electric power source assembly retained therein.

In the above embodiment, power supply electrode 66,68 (FIG. 11) of electric power source assembly 30, serves as a second adherence unit adhered to main body 12 of traveling equipment 10. Alternatively or additionally, power supplied electrode 76,78 (FIG. 5) of main body 12 of traveling equipment 10 may serve as a first adherence unit for adhering the second adherence unit. This modification is shown in FIG. 66. In this modification, first adherence unit 72,74, which is a ferromagnet or a magnet, can be eliminated in comparison with FIG. 5. In this modification, because power supplied electrode 76,78 serves as the first adherence unit, the number of the parts can be reduced in comparison with a case in which the first adherence unit is provided separately from power supplied electrode 76,78. In addition, the possibility of having poor contact of the electrode can be reduced because an electrode is provided in the adherence unit.

Figure 67:
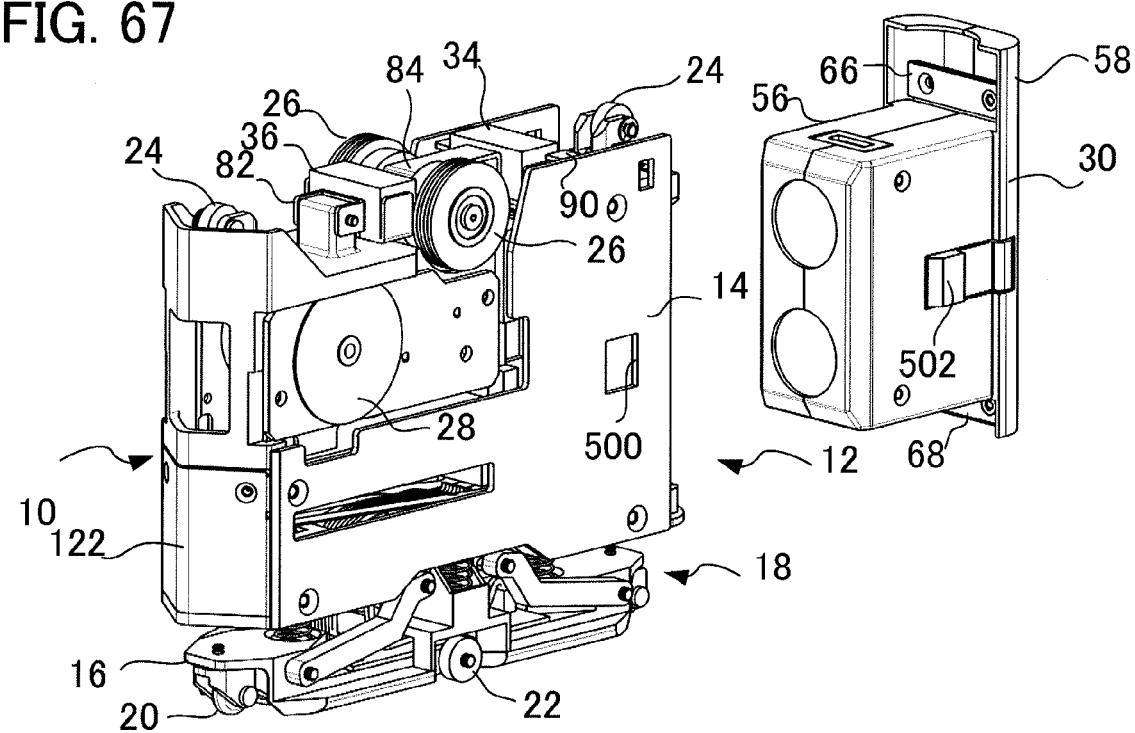
FIG. 67 is a perspective view showing traveling equipment according to another modification and an electric power source assembly retained therein.

In the above embodiment, electric power source assembly 30 is adhered to main body 12 of traveling equipment 10 by magnetic force. However, in another embodiment, electric power source assembly 30 may be engaged to adhere to main body 12 of traveling equipment 10. This modification is shown in FIG. 67. In this modification, an aperture 500 is formed in both sidewalls of upper part 14 of main body 12, and a lock piece 502 to be fitted in aperture 500 is provided to housing 56 of electric power source assembly 30.

Figure 68:
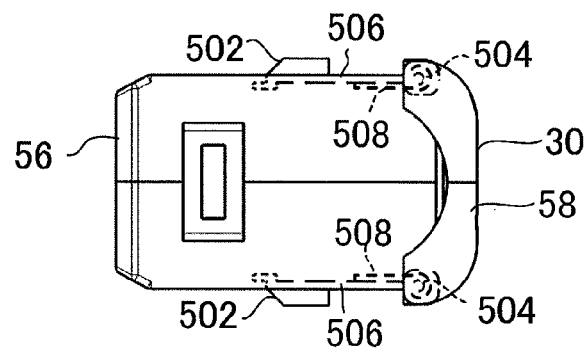
FIG. 68 is a plane view showing an electric power source assembly of FIG. 58.
Figure 69:
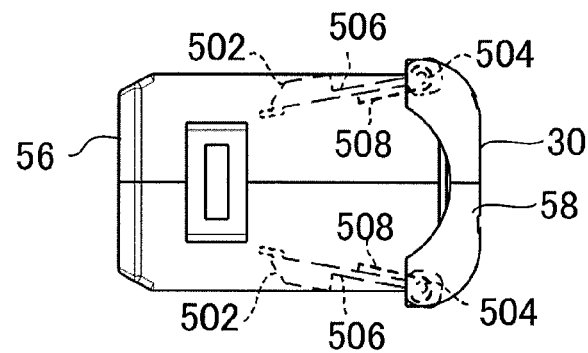
FIG. 69 is a plane view showing the electric power source assembly of FIG. 58 in another state.

Each lock piece 502 is formed as a plate 506 which can rotate around axis 504 as shown in FIG. 68. To each plate 506, a force is given to a torsion spring 508, and lock piece 502 protrudes from the side of housing 56 by this force. In mounting housing 56 of electric power source assembly 30 on upper part 14 of main body 12, lock piece 502 rotates against the force of torsion spring 508 by the sidewall of upper part 14 of main body 12 as shown in FIG. 69. Then, when lock piece 502 arrives at aperture 500, lock piece 502 protrudes outside of housing 56 by the force of torsion spring 508, to be fitted in aperture 500. Because a barb is formed on lock piece 502, electric power source assembly 30 does not easily slip out from main body 12 of traveling equipment 10.

However, by pushing lock piece 502 from the outside of main body 12, lock piece 502 rotates against the force of torsion spring 508 as shown in FIG. 69, and it is possible to pull out electric power source assembly 30 from main body 12 of traveling equipment 10. For example, roller set 146 (traveling equipment locking mechanism) described above with reference to FIGS. 33 to 35 may push lock piece 502.

In another embodiment, electric power source assembly 30 may be adhered to main body 12 of traveling equipment 10 by a sucker. Furthermore, in still another embodiment, electric power source assembly 30 may be adhered to main body 12 of traveling equipment 10 with a hook-and-loop fastener.

In the above embodiment, electric power source assembly 30 is replaced for the main body of traveling equipment 10 by electric power source assembly swapping mechanism 200 with magnetic force. However, in another embodiment, electric power source assembly 30 may be replaced by a mechanism for mechanically seizing electric power source assembly 30 described, for example, in Japanese Patent Publication No. 3448273. Furthermore, in another embodiment, electric power source assembly 30 may be replaced by a mechanism using one of a sucker, a vacuum aspirator, or a hook-and-loop fastener for adhering to electric power source assembly 30.

In the above embodiment, traveling equipment 10 has an electric power source assembly locking mechanism and a release mechanism using lever 84. However, other electric power source assembly locking mechanisms and release mechanisms having, for example, a spring, or another appropriate element may be used.

In the above embodiment, electric power source assembly holder 300 of electric charging apparatus 5 has electric power source assembly lock lever 310,312 for locking electric power source assembly 30 in port 303A or 303B. However, another locking mechanism may be used. For example, an adherence unit for locking electric power source assembly 30 by magnetic force may be provided near port 303A or 303B, preferably near charge electrode 306,308.

In the above embodiment, electric charging apparatus 5 has first electric charger 305A for charging first power supply device 60 placed in first port 303A and second electric charger 305B for charging second power supply device 60 placed in second port 303B. However, a single electric charger may charge the first and second power supply devices.

In the above embodiment, the transversal movement mechanism moves electric power source assembly holder 300 (first group) in which first port 303A and second port 303B are arranged transversely. However, the transversal movement mechanism may move electric power source assembly swapping mechanism 200 (second group) having bar 204 transversely relative to electric power source assembly holder 300.

In the above embodiment, roller set 146 is used as the traveling equipment locking mechanism for locking traveling equipment 10 at an electric power source assembly swapping position (refer to FIGS. 33 to 35). However, traveling equipment 10 may be locked with an adherence unit by the magnetic force, or another traveling equipment locking mechanism. Such a traveling equipment locking mechanism may lock or release traveling equipment 10 in conjunction with the transversal movement of first port 303A and second port 303B.

In the above embodiment, electric power source assembly 30 contains chargeable power supply device 60, but it may contain a non-chargeable battery.

In the above embodiment, a single start gate model 400 is caused to move with two pieces of traveling equipment 10, but the number of pieces of traveling equipment for moving start gate model 400 may be one, or three or more.

In the above embodiment, start gate model 400 has plural doors 412 behind which respective plural model assemblies 40 wait before a run, but it may have plural bars or plural tapes in substitution for doors 412. In addition, the start gate model does not need to have a door, a bar, or a tape.

In the above embodiment, start gate model 400 has top 406,408 connecting plural sidewalls 402 and 404, but does not need to have a connection part for connecting sidewalls 402 and 404.

Figure 70:
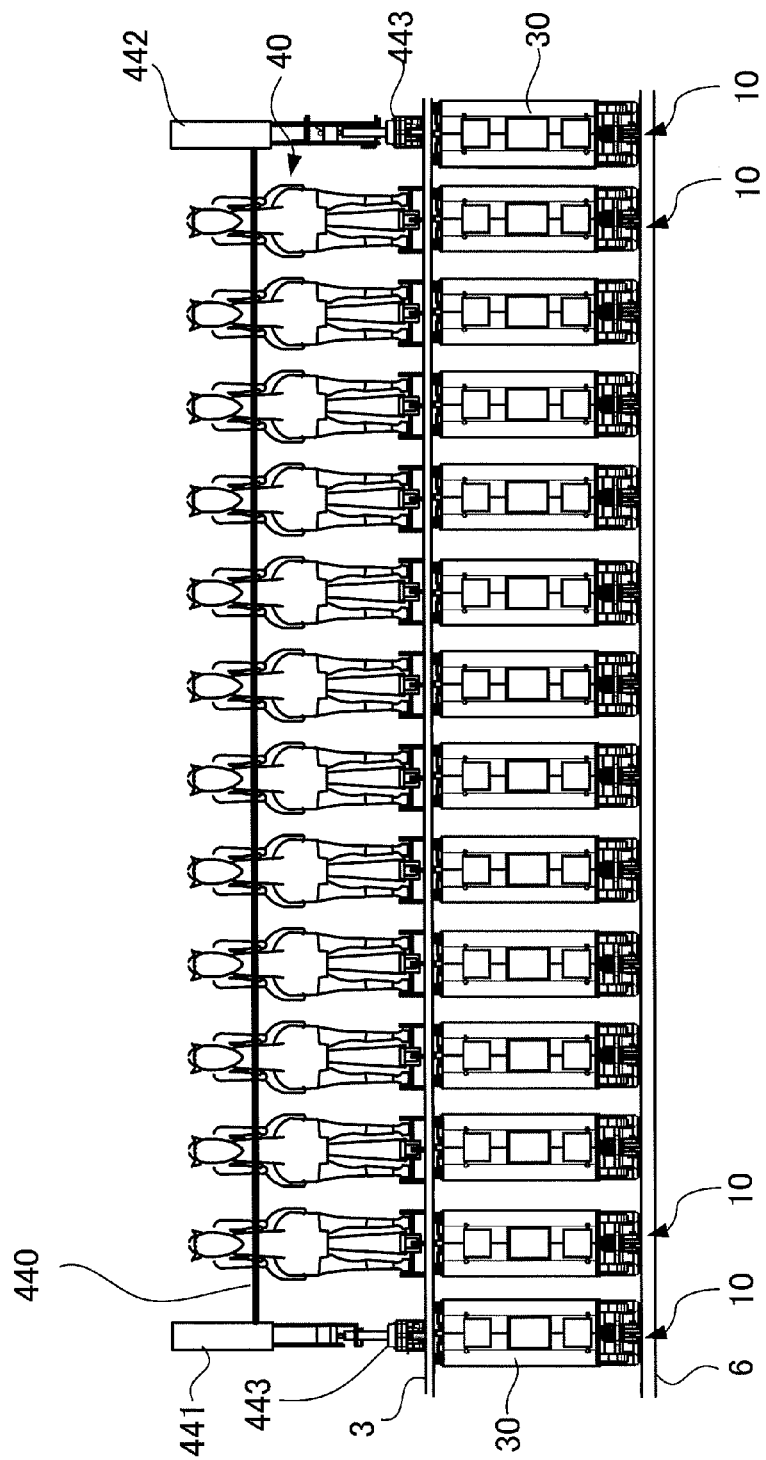
FIG. 70 is a front view showing a mark representing a running starting position used in the game apparatus according to a modification.

In the above embodiment, traveling equipment 10 carries start gate model 400 on first floor panel 3. However, as shown in FIG. 70, a part supporting a mark representing a position where plural model assemblies 40 start running may be caused to move on first floor panel 3 by traveling equipment 10. In FIG. 70, "a mark representing a running start position" is at least one bar 440 at which all of plural model assemblies 40 wait to run at a position behind, and "a part supporting a mark" is two towers or pillars 441 and 442. A carriage 443, which is the same as the above-mentioned carriage 410, is attached to the lower part of pillar 441,442. Here, bar 440 moves upward at the time of the start of the game, and model assemblies 40 start competition. A tape may be used in substitution for bar 440. The number of bars or tapes may be two or more. The number of parts supporting a mark may be two or more.

The number of floor panel members constituting first floor panel 3 is not limited to two, and may be three or more.

Figure 71:
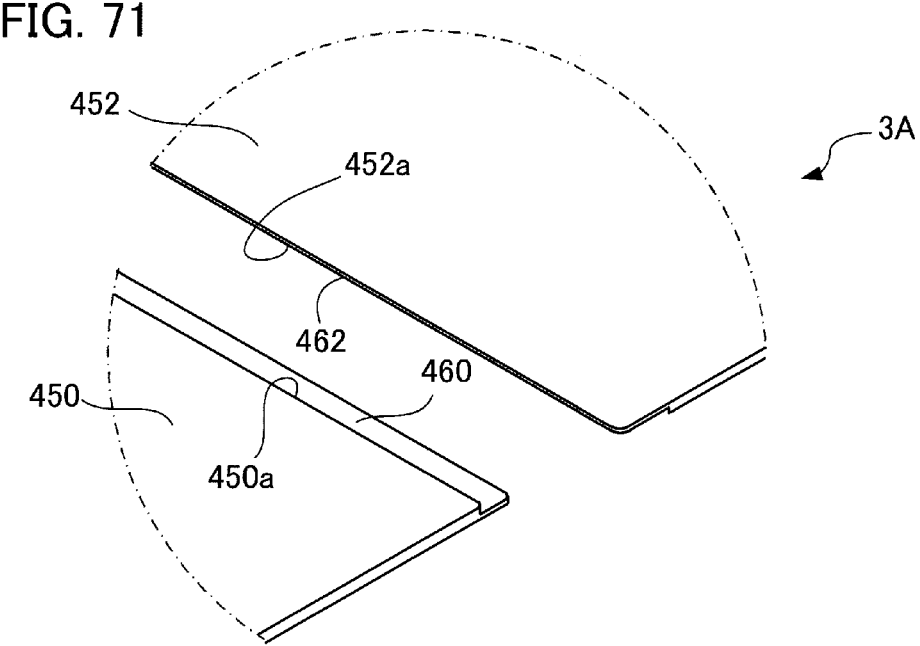
FIG. 71 is a perspective view showing the first floor panel that has been disassembled, according to a modification.

Description is given of a modification of a first floor panel that can be disassembled. In first floor panel 3A shown in FIG. 71, a convex portion 460 projecting along the same plane as the bottom surface of the floor panel is formed at edge 450a of floor panel member 450. A convex portion 462 projecting along the same plane as the top surface of the floor panel is formed at edge 452a of floor panel member 452. When floor panel members 450 and 452 are combined with each other, convex portions 460 and 462 are overlaid, a convex portion 460 of one floor panel member 450 does not protrude from the bottom surface of the other floor panel member 452, and a convex portion 462 of floor panel member 452 does not protrude from the top surface of floor panel member 450.

Figure 72:
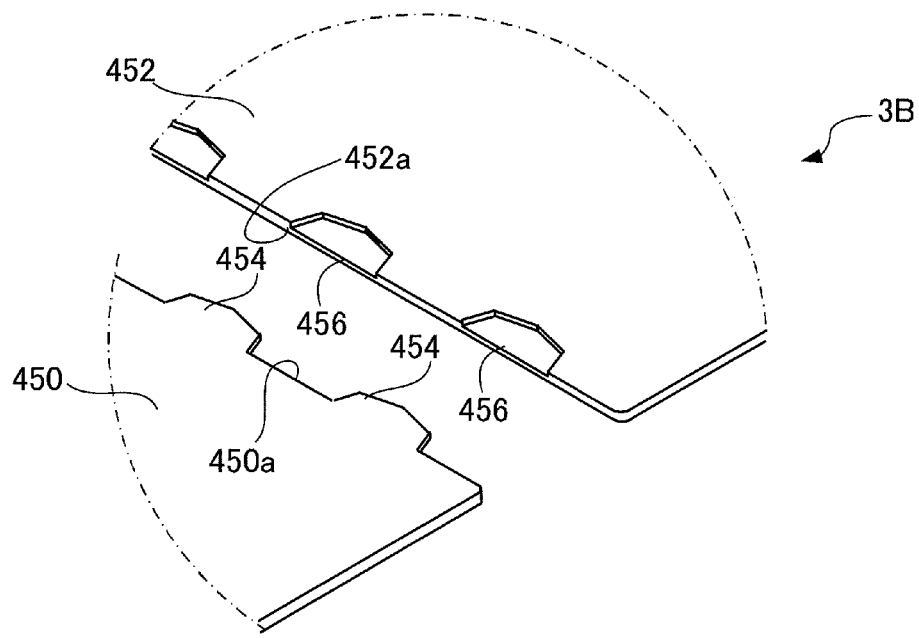
FIG. 72 is a perspective view showing the first floor panel that has been disassembled, according to another modification.

In first floor panel 3B shown in FIG. 72, plural convex portions 454 projecting along the same plane as the top surface are formed regularly at edge 450a of floor panel member 450. Concave portions 456 are formed regularly on top surface 3 of edge 452a of floor panel member 452. When floor panel members 450 and 452 are assembled with each other, convex portions 454 of floor panel member 450 are fitted in concave portions 456 without projecting from the top surface of floor panel member 452.

Figure 73:
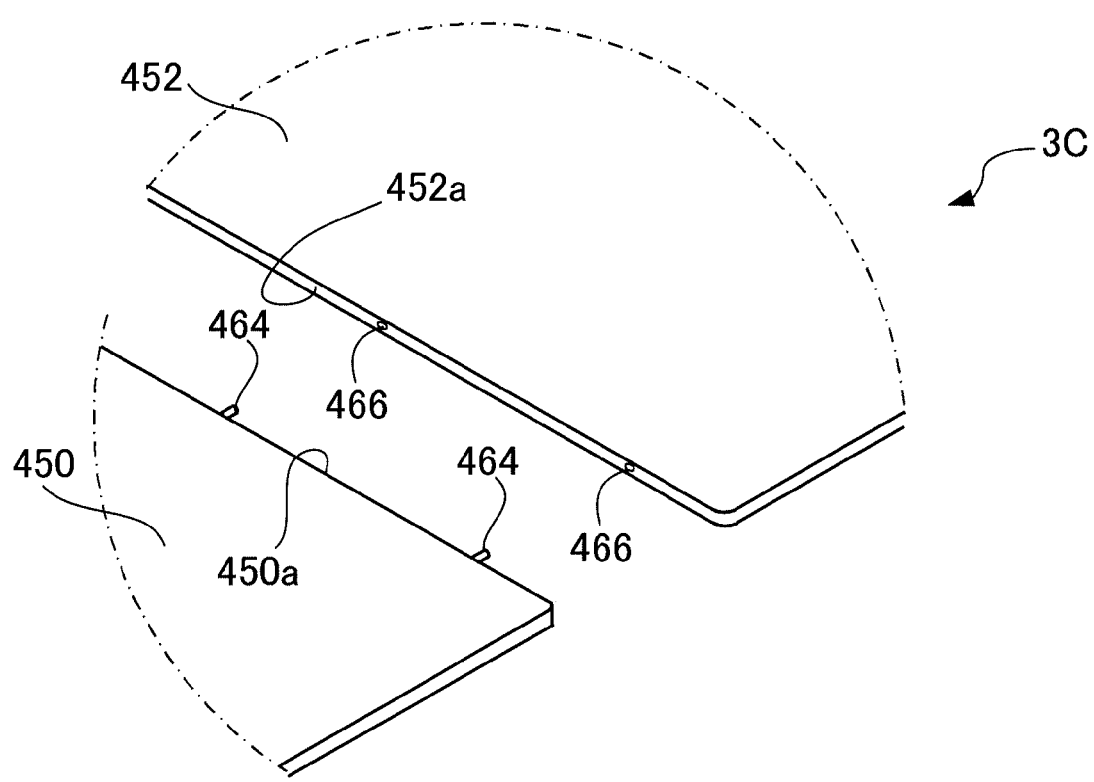
FIG. 73 is a perspective view showing the first floor panel that is disassembled, according to another modification.

In the first floor panel 3C shown in FIG. 73, plural pins 464 are formed regularly at edge 450a of floor panel member 450. Holes 466 are formed regularly at edge 452a of floor panel member 452. When floor panel members 450 and 452 are assembled with each other, pins 464 of floor panel member 450 are fitted in holes 466 of floor panel member 452.

DESCRIPTION OF REFERENCE NUMERALS

1 game apparatus,
2 pillar,
3, 3A, 3B, 3C floor panel (first floor panel),
4 horse model,
5 electric charging apparatus,
6 second floor panel,
7 block,
8 bracket,
10 traveling equipment,
12 main body,
14 upper part,
16 lower part,
18 suspension,
20 caster,
22 wheel,
24 caster,
26 drive wheel,
28 wheel motor,
26 drive wheel (traveling mechanism),
28 wheel motor (traveling mechanism),
30 power source assembly,
32 drive circuit board,
34,36 model puller (electric power source assembly locking mechanism),
40 model assembly,
42 carriage,
44 wheel,
46 caster,
48 mast,
50 model jockey,
52,54 pulled section,
56 housing,
58 cover panel,
60 power supply device,
61 through-hole,
62,64 charged electrode,
66,68 power supply electrode (second adherence unit),
70 electric power source assembly compartment,
72,74 first adherence unit (electric power source assembly retaining mechanism),
76,78 power supplied electrode,
80 third adherence unit,
82 pin (electric power source assembly locking mechanism),
84 lever (electric power source assembly locking mechanism, release mechanism),
86 lock piece (electric power source assembly locking mechanism), 88 lock hole,
90 rotation stopper,
100 overall control unit,
102 position signal supply device
104 first light emitting device
106 second light emitting device
108 detected piece,
110 first optical sensor,
112 second optical sensor,
114 CPU,
116 electricity supply control circuit,
118 coin battery,
120 electricity supply control circuit board,
122 panel,
130 first loop conducting wire,
132 second loop conducting wire,
140 main base,
141 bottom wall,
142 sidewall,
143 rear wall,
144,145 guide rail,
146 roller set (traveling equipment locking mechanism),
148 movable roller (first roller),
150 fixation roller (second roller),
149 motor base,
149A swapping mechanism motor,
152 lever,
153 rotor,
153A roller,
154 roller stage,
156,158,160 sensor,
170 holder motor (transversal movement mechanism),
172 rotor,
180,182,184,186 sensors,
190 central axis
192 first bent-up piece
194 second bent-up piece,
196 spring,
200 electric power source assembly swapping mechanism,
202 base board,
204 bar,
206 electric power source assembly adherence unit,
206A magnet,
206B yoke,
208 crank motor,
207 motor base,
210 coupling,
212 crankshaft,
214 bearing,
216 crank connector bracket,
217 crank
218 first link,
220 second link,
222 detected piece,
224,225 sensor,
226 side plate,
228 top board,
230,232 roller,
236 bracket,
240,242 detected piece,
248 long board,
249 groove,
250,252 both ends,
300 electric power source assembly holder (charge mechanism),
302 base frame,
303A first port,
303B second port,
304 wall,
305A first electric charger,
305B second electric charger,
306,308 charge electrode,
307 electrode supporting member,
309 window,
310,312 electric power source assembly lock lever,
310A, 312A pawl,
311 spring,
314,316 projection,
318,320 rotation axe,
326 projection,
328 board,
330 projection,
400 start gate model,
402 left sidewall,
404 right sidewall,
406 front top,
408 rear top,
410 carriage,
412 door,
414 bracket,
424 wheel,
410 carriage,
426 caster,
428,430 pulled section,
440 bar (mark representing a running start position),
441,442 pillar (part supporting a mark)
443 carriage,
450,452 floor panel member,
450a, 452a edge,
454 convex portion,
456 concave portion,
460,462 convex portion,
464 pin,
466 hole,
500 aperture,
502 lock piece,
504 axis,
506 plate,
508 torsion spring

The invention claimed is:

1. An electric charging apparatus comprising:
a charge mechanism for charging a first power supply device inside a first electric power source assembly mounted on traveling equipment and for charging a second power supply device inside a second electric power source assembly mounted on the traveling equipment; and
an electric power source assembly swapping mechanism that dismounts and moves the first electric power source assembly from the traveling equipment to the charge mechanism, that moves the second electric power source assembly from the charge mechanism, to be mounted on the traveling equipment, wherein the charge mechanism comprises:
a first port for accommodating the first electric power source assembly;
a second port for accommodating the second electric power source assembly;
charge means for charging a first power supply device inside the first electric power source assembly accommodated in the first port and a second power supply device inside the second electric power source assembly accommodated in the second port, and wherein the electric power source assembly swapping mechanism dismounts the first electric power source assembly from traveling equipment and moves the first electric power source assembly to the first port, so that the first power supply device is chargeable by the charge means, and moves, from the second port, the second electric power source assembly for which the second power supply device has been charged by the charge means, to be mounted on the traveling equipment.

2. An electric charging apparatus according to claim 1, wherein the electric power source assembly swapping mechanism dismounts and moves the second electric power source assembly from the traveling equipment to the charge mechanism, and that moves the first electric power source assembly from the charge mechanism, to be mounted on the traveling equipment, dismounting and moving the second electric power source assembly from the traveling equipment to the charge mechanism, including dismounting the second electric power source assembly from the traveling equipment and moving the second electric power source assembly to the second port, so that the second power supply device is chargeable by the charge means, and moving the first electric power source assembly from the charge mechanism including moving, from the first port, the first electric power source assembly for which the first power supply device has been charged by the charge means.

3. An electric charging apparatus according to claim 2, the charge mechanism comprising:

plural first ports for accommodating plural first power supply assemblies respectively;

plural first electric chargers for charging first power supply devices inside plural first power supply assemblies accommodated in the plural first ports;

plural second ports for accommodating plural second power supply assemblies respectively; and plural second electric chargers for charging second power supply devices inside plural first power supply assemblies accommodated in the plural second ports, and the electric power source assembly swapping mechanism comprising plural bars movable back-and-forth in back-and-forth directions parallel to one another and plural electric power source assembly adherence units respectively mounted on each of the plural bars, wherein each of the plural bars carries a corresponding one of the electric power source assembly adherence units forward so as to pass one of the first ports, and each of the electric power source assembly adherence units adheres to the first electric power source assembly mounted on one of plural pieces of traveling equipment, to dismount the first electric power source assembly from the traveling equipment, and each of the bars carries the first electric power source assembly adhered to by the electric power source assembly adherence unit backward to the first port so that the first power supply device is chargeable by the first electric charger;

wherein each of the plural bars carries a corresponding one of the electric power source assembly adherence units forward so as to pass one of the second ports, and each of the electric power source assembly adherence units adheres to the second electric power source assembly for which the second power supply device has been charged by the second electric charger, and each of the bars carries the second electric power source assembly adhered to by the electric power source assembly adherence unit forward so that the second first electric power source assembly is mounted on the plural pieces of traveling equipment from the second port;

wherein each of the plural bars carries a corresponding one of the electric power source assembly adherence units forward so as to pass one of the second ports, and each of the electric power source assembly adherence units adheres to the second electric power source assembly mounted on one of the plural pieces of traveling equipment, to dismount the second electric power source assembly from the traveling equipment, and each of the bars carries the second electric power source assembly adhered to by the electric power source assembly adherence unit backward to the second port so that the second power supply device is chargeable by the second electric charger; and wherein each of the plural bars carries a corresponding one of the electric power source assembly adherence units forward so as to pass one of the first ports, and each of the electric power source assembly adherence units adheres to the first electric power source assembly for which the first power supply device has been charged by the first electric charger, and each of the bars carries the first electric power source assembly adhered to by the electric power source assembly adherence unit forward so that the first electric power source assembly is mounted on the plural pieces of traveling equipment from the first port.

4. An electric charging apparatus according to claim 3, wherein the plural first ports and the plural second ports are arranged in a transverse direction perpendicular to the back-and-forth direction of the plural bars, the electric charging apparatus further comprising:

a transverse direction carrying mechanism for carrying, in the transverse direction, a first set having the plural first ports and the plural second ports and a second set having the plural bars so that the first set and the second set move relatively in the transverse direction, so that each of the plural bars carry a corresponding one of the electric power source assembly adherence units into one of the first ports and one of the second ports.

5. An electric charging apparatus according to claim 3, wherein each of the electric power source assembly adherence units is an adherence unit that adheres to, by magnetic force, a ferromagnet or a magnet provided in the first electric power source assembly and a ferromagnet or a magnet provided in the second electric power source assembly.

6. An electric charging apparatus according to claim 5, wherein each of the electric power source assembly adherence units is a magnet chuck having a magnet and a yoke containing the magnet in a turnable manner, wherein the electric power source assembly swapping mechanism has plural cranks respectively rotating the magnet of the magnetic chuck, and wherein the crank has a first link extending parallel to the bar and moving relatively to the bar and a second link connected to the magnet and rotating the magnet with the movement of the first link.

7. An electric charging apparatus according to claim 1, comprising a traveling equipment locking mechanism that locks the traveling equipment when the electric charging apparatus mounts and dismounts the first electric power source assembly to and from the traveling equipment and when the electric charging apparatus mounts and dismounts the second electric power source assembly to and from the traveling equipment.

8. An electric charging apparatus according to claim 6, comprising a traveling equipment locking mechanism which locks each of the plural pieces of traveling equipment when the electric charging apparatus mounts and dismounts the plural first electric power source assemblies to and from the plural pieces of traveling equipment and when the electric charging apparatus mounts and dismounts the plural second electric power source assemblies to and from the plural pieces of traveling equipment, wherein the traveling equipment locking mechanism locks and releases the plural pieces of traveling equipment, when the transverse direction carrying mechanism moves the plural first ports and the plural second ports in the transverse direction, in conjunction with the transverse movement of the first port and the second port.

9. An electric charging apparatus according to claim 8, wherein the traveling equipment locking mechanism has plural pairs of a first roller and a second roller, and each pair of the first roller and the second roller sandwiches one of the plural pieces of the traveling equipment, and the first and the second roller rotate when the traveling equipment moves in a direction in which the bar moves backward and do not rotate when the traveling equipment moves in a direction in which the bar moves forward.

10. A game apparatus comprising the electric charging apparatus according to claim 1 and plural pieces of the traveling equipment.

11. A game apparatus comprising:
traveling equipment;
a first floor panel underneath which the traveling equipment runs;
a second floor panel on top of which the traveling equipment runs, the second floor panel being placed beneath the first floor panel;
a model attracted to the traveling equipment and running on the first floor panel,
the traveling equipment comprising:
a power supply device placed inside the traveling equipment;
a traveling mechanism that runs with the power supply device; and
an electric charging apparatus for charging the power supply device of the traveling equipment,
wherein the traveling equipment comprises:
an electric power source assembly retaining mechanism for retaining, in a detachable manner, an electric power source assembly containing the power supply device, and
the electric charging apparatus comprises:
a charge mechanism for, while the electric power source assembly is retained by the traveling equipment, charging another electric power source assembly; and
a swapping mechanism for swapping the electric power source assembly for the another electric power source assembly.

12. A game apparatus according to claim 11, wherein the power supply device is chargeable.

13. A game apparatus according to claim 11, comprising:
plural pieces of the traveling equipment running on the second floor panel; and
plural pieces of the models attracted to the traveling equipment and running on the first floor panel,
wherein the charge mechanism charges first power supply devices inside plural first power supply assemblies respectively mounted on the plural pieces of traveling equipment and charges second power supply devices inside plural second power supply assemblies respectively mounted on the plural pieces of traveling equipment,
wherein the swapping mechanism dismounts and moves the plural first power supply assemblies from the plural pieces of traveling equipment to the charge mechanism, moves the plural second power supply assemblies from the charge mechanism, to be mounted on the plural pieces of traveling equipment, dismounts and moves the plural second power supply assemblies from the plural pieces of traveling equipment to the charge mechanism, and moves the plural first power supply assemblies from the charge mechanism, to be mounted on the plural pieces of traveling equipment.

14. A game apparatus according to claim 11, comprising:
plural pieces of the traveling equipment running on the second floor panel;
plural pieces of the models attracted to some of the plural pieces of traveling equipment and running on the first floor panel; and
a start gate model or a part attracted to one of other pieces of the plural pieces of traveling equipment and running on the first floor panel, the start gate model surrounding a position where the plural pieces of models start running, and the part supporting a mark representing the running start position.

15. A game apparatus according to claim 11,
wherein the first floor panel has plural floor panel members combinable adjacent to one another;
wherein each of the floor panel members has an edge that is adjacent to another floor panel member;
wherein, when the floor panel member is assembled with another adjacent floor panel member, the top surface of the floor panel member and the top surface of the another adjacent floor panel member become flush, and the bottom surface of the floor panel member and the bottom surface of the another adjacent floor panel member become flush.

16. A game apparatus according to claim 15,
wherein on a top surface of an edge of the floor part panel, plural convex portions projecting along a surface identical to the upper surface and plural concave portions are formed; and
wherein the convex portions of one of the floor panel members are fit into the concave portions of the other floor panel member without protruding from the top surface, and the convex portions of the other floor panel member are fit into the concave portions of the one of the floor panel members without protruding from the top surface.

17. A game apparatus according to claim 11,
wherein the traveling mechanism of the traveling equipment has a drive wheel rotating in contact with the bottom surface of the first floor panel, thereby causing the traveling equipment to run.

* * * * *